US009186578B2

(12) United States Patent
Sato et al.

(10) Patent No.: US 9,186,578 B2
(45) Date of Patent: *Nov. 17, 2015

(54) GAME SYSTEM, GAME APPARATUS, STORAGE MEDIUM HAVING GAME PROGRAM STORED THEREIN, AND GAME PROCESS METHOD

(75) Inventors: Kenta Sato, Kyoto (JP); Keizo Ohta, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/279,791

(22) Filed: Oct. 24, 2011

(65) Prior Publication Data
US 2012/0165095 A1 Jun. 28, 2012

(30) Foreign Application Priority Data
Dec. 24, 2010 (JP) .................. 2010-287685

(51) Int. Cl.
A63F 13/00 (2014.01)
A63F 9/24 (2006.01)
A63F 13/40 (2014.01)

(52) U.S. Cl.
CPC ........... *A63F 13/10* (2013.01); *A63F 2300/301* (2013.01); *A63F 2300/303* (2013.01); *A63F 2300/6661* (2013.01); *A63F 2300/8076* (2013.01)

(58) Field of Classification Search
CPC ........................ G06F 13/00; G06F 17/30061
USPC .......................................................... 463/31
See application file for complete search history.

(56) References Cited

U.S. PATENT DOCUMENTS 7,326,117 B1 2/2008 Best
7,371,163 B1 * 5/2008 Best ................................ 463/1
(Continued)

FOREIGN PATENT DOCUMENTS

JP 2001-34247 A 2/2001
JP 2002-325963 A 11/2002
(Continued)

OTHER PUBLICATIONS

Office Action dated Oct. 4, 2013, issued in corresponding U.S. Appl. No. 13/279,692.
(Continued)

*Primary Examiner* — Kang Hu
*Assistant Examiner* — Marcus Jones
(74) *Attorney, Agent, or Firm* — Nixon & Vanderhye P.C.

(57) ABSTRACT

An example game system includes a plurality of operating devices for outputting first operation data, a transportable display device for outputting second operation data, and a game apparatus. The game apparatus controls a plurality of first operation targets based on the first operation data, and a second operation target based on the second operation data. In addition, the game apparatus generates a first game image including a plurality of images representing a virtual space as viewed from first virtual cameras each corresponding to one of the first operation targets. The game apparatus generates a second game image including an image representing the virtual space as viewed from a second virtual camera corresponding to the second operation target. The first game image is outputted to a predetermined display device. The second game image is displayed on the transportable display device.

37 Claims, 21 Drawing Sheets

(56) References Cited

U.S. PATENT DOCUMENTS

| | | | |
|---|---|---|---|
| 2002/0065135 A1* | 5/2002 | Chatani | 463/40 |
| 2002/0165028 A1 | 11/2002 | Miyamoto et al. | |
| 2004/0092309 A1 | 5/2004 | Suzuki | |
| 2004/0219980 A1* | 11/2004 | Bassett et al. | 463/33 |
| 2009/0244064 A1* | 10/2009 | Inokuchi et al. | 345/420 |
| 2011/0169866 A1* | 7/2011 | Yoshikawa et al. | 345/660 |

FOREIGN PATENT DOCUMENTS

| | | |
|---|---|---|
| JP | 2004-313252 A | 11/2004 |
| JP | 2005-245927 A | 9/2005 |
| JP | 2006-081753 | 3/2006 |
| JP | 2009-536058 A | 10/2009 |
| JP | 4473688 | 3/2010 |
| WO | 2007/128949 A1 | 11/2007 |

OTHER PUBLICATIONS

United States Office Action issued for U.S. Appl. No. 13/279,692, dated Oct. 12, 2012.

Office Action dated Feb. 3, 2015, issued in related U.S. Appl. No. 13/279,692.

Office Action dated Apr. 16, 2015, issued in corresponding Japanese Patent Application No. 2010-287685.

Reference URL [http://www.21010.net/club/bn/ngc/gzlj/pdf/p022_023.pdf] with its English translation, 4 pages.

"The Legend of Zelda: The Wind Waker", V Jump Books [Game Series] Game Cube Version, Shueisha Inc., vol. 1, No. 19, pp. 19 and 43, 2003.01.29 with its English translation, 10 pages.

Notice of Reasons for Refusal mailed on Aug. 28, 2015, issued in Japanese Patent Application No. 2011-115100.

* cited by examiner

GAME SYSTEM, GAME APPARATUS, STORAGE MEDIUM HAVING GAME PROGRAM STORED THEREIN, AND GAME PROCESS METHOD

CROSS REFERENCE TO RELATED APPLICATION

The disclosure of Japanese Patent Application No. 2010-287685, filed Dec. 24, 2010, is incorporated herein by reference.

FIELD

This application describes a game system, a game apparatus, a storage medium having a game program stored therein, and a game process method, which are intended for playing a game between a plurality of players using a plurality of operating devices and a plurality of display devices.

BACKGROUND AND SUMMARY

Conventionally, there are game systems in which a plurality of players can play a game at the same time. For example, there is a conventional game system for executing a competitive game to be played by a plurality of players. In this game system, game images including operation targets to be controlled by the players are generated for their respective players, and displayed on their respective sections on a screen area of a display device.

In the case where game images for their respective players are displayed on one display device as described above, a game image for one player can be viewed by the other player. As a result, for example, the position of one player's operation target (in a game space) or a position aimed at by one player's operation target in a shooting game or such like can be inconveniently revealed to the other player, impairing a strategic aspect of the game.

Therefore, the present specification discloses a game system, a game apparatus, a storage medium having a game program stored therein, and a game process method, which are capable of enhancing the strategic aspect of a multiplayer game, thereby rendering the game highly enjoyable.

(1) An example game system described herein includes a plurality of operating devices for outputting first operation data, a transportable display device for outputting second operation data, and a game apparatus.

The game apparatus includes an operation data acquisition section, an action control section, a first camera setting section, a first image generation section, a second camera setting section, a second image generation section, a first image output section, and a second image output section. The operation data acquisition section acquires the first operation data from the operating devices and the second operation data from the transportable display device. The action control section controls individual actions of a plurality of first operation targets in a virtual space based on the first operation data, and an action of a second operation target in the virtual space based on the second operation data. The first camera setting section sets a plurality of first virtual cameras in the virtual space, each camera corresponding to one of the first operation targets. The first image generation section generates a first game image including a plurality of images representing the virtual space as viewed from the first virtual cameras. The second camera setting section sets a second virtual camera in the virtual space, the camera corresponding to the second operation target and having a different viewpoint from the first virtual cameras. The second image generation section generates a second game image including an image representing the virtual space as viewed from the second virtual camera. The first image output section outputs the first game image to a predetermined display device different from the transportable display device. The second image output section wirelessly transmits the second game image to the transportable display device.

The transportable display device includes an image reception section and a display section. The image reception section receives the second game image. The display section displays the second game image.

The "operating device" may be any device which can be manipulated by the player and outputs operation data. The "operating device" may include operating means, such as operation buttons, and various sensors, such as an acceleration sensor and a gyroscope, as in a controller 5 to be described later, or may include either one or the other. Alternatively, the "operating device" may include other input means such as a touch panel.

The "transportable display device" may be any device which can be manipulated by the player, outputs operation data, and includes a display section for displaying game images, as in the case of a terminal device 7 in an example embodiment to be described later. Note that the term "transportable" is intended to mean a size that allows the player to hold and move the device or arbitrarily change the position of the device.

The "game apparatus" may be any information processing apparatus which performs game processes and generates game images based on the game processes. The game apparatus may be an information processing apparatus for game use or a multipurpose information processing apparatus such as a general personal computer.

The "game system" includes a game apparatus, an operating device, and a transportable display device, and may or may not include a predetermined display device for displaying first game images. That is, the game system may or may not be provided in the form which includes the predetermined display device.

The "operation target" may be any object, such as an object arranged in a game space, so long as its action can be controlled by the player's operation.

The wording "virtual cameras corresponding to operation targets", as a concept, encompasses virtual cameras being set so as to include operation targets in game images generated using the virtual cameras or virtual cameras being set at positions corresponding to operation targets.

According to the above configuration (1), the predetermined display device displays a game space image (first game image) generated by the first virtual cameras, and the transportable display device displays a game space image (second game image) generated by the second virtual camera being set at a position different from the first virtual cameras. Accordingly, the first game image to be viewed by players using operating devices (referred to as "first players") and the second game image to be viewed by a player using a transportable display device (referred to as a "second player") have different viewpoints from each other.

Here, the content of the second game image is displayed on the transportable display device manipulated by the second player, and cannot be viewed by the first players, so that only the second player can know the game situation represented by the second game image. In this manner, by allowing only the second player to know certain information (game situation), it is rendered possible to provide a highly strategic game. Specifically, the second player can successfully utilize the information only he/she can know to proceed with the game, thereby strategically playing the game. On the other hand, each first player can view the first game image displayed on a predetermined display device, and therefore can view game images for other first players. Thus, each first player can view game images for other first players, or exchange information among first players, thereby estimating information only the second player knows, so that the first players can strategically play the game. As described above, according to the above configuration (1), game images to be displayed on two display devices are different in terms of their areas of a displayed game space, and both game images can be viewed by only selected players, which makes it possible to enhance the strategic aspect of a multiplayer game and render the game highly enjoyable. Moreover, for example, in the case of a game for a plurality of first players to play against one second player, the game can be rendered highly enjoyable without excessive disadvantage to the second player even in the one-to-many situation.

(2) The action control section may control a plurality of first objects arranged in the virtual space to move based on the first operation data as the first operation targets. In this case, the first cameras setting section sets the first virtual cameras such that each of the first objects is included within a field-of-view range of its corresponding one of the first virtual cameras.

According to the above configuration (2), the first game image includes a plurality of game images including the first objects being manipulated by the players. Thus, each first player can readily perform a game operation by viewing a game image including his/her own operation target.

(3) The action control section may control a second object arranged in the virtual space to move based on the second operation data as the second operation target. In this case, the second camera setting section sets the second virtual camera such that the second object is included within a field-of-view range of the second virtual camera.

According to the above configuration (3), the second game image includes a plurality of game images including the second object being manipulated by the second player. Thus, the second player can readily perform a game operation by viewing a game image including his/her own operation target.

(4) The second camera setting section may set the second virtual camera so as to have a greater angle of depression than the first virtual cameras with respect to a predetermined plane of the virtual space on which the first operation targets are movable.

The "predetermined plane" may be a plane of, for example, a field object (terrain object), if any, arranged in the game space, but the field object is not always arranged.

The term "angle of depression of a virtual camera" refers to an angle between the line-of-sight direction of the virtual camera and a predetermined plane.

According to the above configuration (4), the angle of depression of the second virtual camera is set to be greater than the angle of depression of any first virtual camera, and therefore the second game image represents the positions of first operation targets within a wider range of the predetermined plane when compared to each image included in the first game image. Thus, according to the above configuration (4), by viewing the second game image, the second player can recognize the positions of the first operation targets more readily than the first players viewing the first game image. As a result, the second player can strategically play the game by taking advantage of only he/she knowing the position of each first operation target. That is, the second player can more reliably be provided with a game image which makes it easy to recognize the situation of the game space.

(5) The first camera setting section may set each of the first virtual cameras such that a direction of that first virtual camera changes in accordance with a direction of the first operation target that corresponds to the first virtual camera. In this case, the second camera setting section sets the second virtual camera in a direction approximately perpendicular to the predetermined plane.

According to the above configuration (5), the first virtual cameras are directed in accordance with the directions of the first operation targets, and therefore the first game image represents the game space as viewed from predetermined positions toward directions corresponding to the directions of the first operation targets. As a result, the first players can confirm the situation of the game space only with respect to the directions corresponding to the directions of the first operation targets. On the other hand, the second virtual camera is directed perpendicularly to the predetermined plane, so that the second game image can represent a wide range of the predetermined plane with the position of each operation target being viewed from above. Accordingly, the second player can readily recognize the position of each operation target. Thus, according to the above configuration (5), the second player can more reliably be provided with a game image which makes it easy to recognize the situation of the game space.

(6) The second camera setting section may set the second virtual camera so as to be higher than the first virtual cameras with respect to a predetermined plane of the virtual space on which the first operation targets are movable.

According to the above configuration (6), the second virtual camera is set to be higher than the first virtual cameras, and therefore the second game image represents the positions of first operation targets within a wider range of the predetermined plane when compared to each image included in the first game image. Thus, according to the above configuration (6), by viewing the second game image, the second player can recognize the positions of the first operation targets more readily than the first players viewing the first game image. As a result, the second player can strategically play the game by taking advantage of only he/she knowing the position of each first operation target. That is, the second player can more reliably be provided with a game image which makes it easy to recognize the situation of the game space.

(7) The first camera setting section may set each of the first virtual cameras at a lower position than an obstacle object having a predetermined range of height with respect to the predetermined plane. In this case, the second camera setting section sets the second virtual camera at a higher position than the obstacle object.

According to the above configuration (7), each first virtual camera is set at a lower position than the obstacle object, and therefore the field of view of the first game image is blocked by the obstacle. On the other hand, the second virtual camera is set at a higher position than the obstacle object, the second game image displays the predetermined plane without the obstacle object blocking the field of view. As a result, while the first players can recognize the situation of only a narrow range of the game space limited by the obstacle object, the second player can recognize the situation of a wider range of the game space. Accordingly, the second player can recognize the positions of the first operation targets more readily than the first players. Thus, according to the above configuration (7), the second player can more reliably be provided with a game image which makes it easy to recognize the situation of the game space.

(8) The first image generation section may generate as the first game image a game image in which a plurality of images representing the virtual space as viewed from the first virtual cameras are arranged in a plurality of areas into which an entire area of the first game image is divided.

According to the above configuration (8), the predetermined display device has game images for the first players displayed on their respective screen areas, and therefore each first player can readily distinguish his/her own game image (a game image corresponding to the operation target being manipulated by that first player) from game images for other first players.

(9) The transportable display device may include an inertial sensor. In this case, the action control section sets the second virtual camera based on an output from the inertial sensor.

According to the above configuration (9), the second player can control the second virtual camera by moving the transportable display device, and can move the second virtual camera by an intuitive and easy operation of moving the transportable display device.

(10) Another example game system described herein includes a plurality of operating devices for outputting first operation data, a transportable display device for outputting second operation data, and a game apparatus.

The game apparatus includes an operation data acquisition section, an action control section, a first image generation section, a second image generation section, a first image output section, and a second image output section. The operation data acquisition section acquires the first operation data from the operating devices and the second operation data from the transportable display device. The action control section controls individual actions of a plurality of first operation targets in a virtual space based on the first operation data, and an action of a second operation target in the virtual space based on the second operation data. The first image generation section generates a first game image representing an area within a predetermined range of the virtual space that is determined in accordance with positions of the first operation targets. The second image generation section generates a second game image representing an area of the virtual space, the area including the second operation target and being wider than the range represented by the first game image. The first image output section outputs the first game image to a predetermined display device different from the transportable display device. The second image output section wirelessly transmits the second game image to the transportable display device.

The transportable display device includes an image reception section and a display section. The image reception section receives the second game image. The display section displays the second game image.

The wording "representing a wider area than the range represented by the first game image" is intended to mean that the second game image is wider than the first game image in terms of the range (of the game space) that is represented thereby, and the entire range represented by the first game image is not always included in the range represented by the second game image. For example, as in the example embodiment or a first variant to be described later, when any obstacle object is set on a predetermined plane of the game space, or when any field object being set on the predetermined plane has an uneven surface, if the second game image is set to have a higher viewpoint or a wider angle of depression in the line-of-sight direction than the first game image, the second game image can represent a wider range of area than the first game image.

According to the above configuration (10), the first game image displayed on the predetermined display device represents a predetermined range of area that is determined in accordance with the positions of the first operation targets, and the second game image displayed on the transportable display device represents a wider range of area than the first game image. Consequently, as in the case of the above configuration (1), game images to be displayed on two display devices are different in terms of their areas of a displayed game space, and both game images can be viewed by only selected players, which makes it possible to enhance the strategic aspect of a multiplayer game and render the game highly enjoyable. Moreover, for example, in the case of a game for a plurality of first players to play against one second player, the game can be rendered highly enjoyable without excessive disadvantage to the second player even in the one-to-many situation.

(11) The first image generation section may generate the first game image by generating for each of the first operation targets an image representing the virtual space in a line-of-sight direction corresponding to a direction of that first operation target. In this case, the second image generation section generates as the second game image a game image with a predetermined plane on which the first operation targets are movable being viewed in a line-of-sight direction approximately perpendicular to the predetermined plane.

According to the above configuration (11), the first game image represents the game space as viewed from predetermined positions toward directions corresponding to the directions of the first operation targets. As a result, the first players can confirm the situation of the game space only with respect to the directions corresponding to the directions of the first operation targets. On the other hand, the second game image can represent a wide range of the predetermined plane with the position of each operation target being viewed from above. Accordingly, the second player can readily recognize the position of each operation target. Thus, according to the above configuration (11), the second player can more reliably be provided with a game image which makes it easy to recognize the situation of the game space.

(12) The virtual space may have set therein an obstacle object having a predetermined range of height with respect to a predetermined plane on which the first operation targets are movable. In this case, the first image generation section generates the first game image as viewed from a viewpoint lower than the obstacle object. The second image generation section generates the second game image as viewed from a viewpoint higher than the obstacle object.

According to the above configuration (12), the field of view of the first game image is blocked by the obstacle, whereas the second game image displays the predetermined plane without the obstacle object blocking the field of view. As a result, while the first players can recognize the situation of only a narrow range of the game space limited by the obstacle object, the second player can recognize the situation of a wider range of the game space. Accordingly, the second player can recognize the positions of the first operation targets more readily than the first players. Thus, according to the above configuration (12), the second player can more reliably be provided with a game image which makes it easy to recognize the situation of the game space.

(13) The first image generation section may generate the first game image such that only some portions within a predetermined range of the virtual space that are determined in accordance with positions of the first operation targets are visually recognizable. In this case, the second image generation section generates the second game image so as to represent the predetermined range of the virtual space.

The wording "only some portions are visually recognizable", as a concept, encompasses only some portions being displayed on the display screen and a predetermined range of area, excluding some portions, being displayed as black (or translucent or blurred).

According to the above configuration (13), the first game image has only some visually recognizable portions within a predetermined range of area, whereas the second game image has the entire predetermined range of area become visually recognizable. As a result, while the first players can recognize the situation of only a narrow range of the game space, the second player can recognize the situation of a wider range of the game space. Accordingly, the second player can recognize the positions of the first operation targets more readily than the first players. Thus, according to the above configuration (13), the second player can more reliably be provided with a game image which makes it easy to recognize the situation of the game space.

(14) The first image generation section may set a virtual camera in the virtual space to generate as the first game image an image representing the virtual space as viewed from the virtual camera. In this case, the second image generation section generates the second game image as an image representing the virtual space using image data that is prestored in a storage accessible by the game apparatus.

According to the above configuration (14), prepared image data is used to generate the second game image, and therefore the second game image can be readily generated by a simplified process.

(15) The second image generation section may generate the second game image so as to include images rendered on a game image representing the virtual space, the images representing positions of the first operation targets and the second operation target and directions of the operation targets or virtual cameras.

According to the above configuration (15), by the second game image, the second player can know the position of each operation target and the direction of each operation target or its corresponding virtual camera, and therefore the second player can more reliably be provided with a game image which makes it easy to recognize the situation of the game space.

(16) The transportable display device may further include a touch panel provided on a screen of the display section. In this case, the action control section moves the second operation target based on an input to the touch panel.

According to the above configuration (16), the second player can move the operation target by an operation using the touch panel, and therefore can perform a game operation by an intuitive and easy operation method.

(17) The transportable display device may further include a direction input section which allows inputs to be made in at least four directions, including up, down, right, and left. In this case, the action control section moves the second operation target in accordance with a direction inputted with the direction input section.

According to the above configuration (17), the second player can move the operation target by an operation using the direction input section, and therefore can perform a game operation by an easy operation method.

(18) The action control section may move the first operation targets and the second operation target on a predetermined plane being set in the virtual space. In this case, the game apparatus further includes an effect addition section for adding a predetermined game effect in response to the second operation target contacting any of the first operation targets.

The "game effect" is a concept encompassing any arbitrary effect to be added to the game, including, for example, addition of points, and display of a predetermined effect image.

According to the above configuration (18), it is possible to realize a game in which the first operation targets attempt to catch the second operation target or vice versa, as in the example embodiment to be described later. In such a game, it is advantageous to know the positions of other players' operation targets, and therefore in the case of the above configuration (18), the second player, who can recognize the positions of other operation targets from the second game image, can be put in a more advantageous position than the first players. Thus, in the case of a game for a plurality of first players to play against one second player, the game can be rendered highly enjoyable without excessive disadvantage to the second player even in the one-to-many situation.

(19) The action control section may cause the first operation targets to perform moving and shooting actions on a predetermined plane being set in the virtual space, and may also cause the second operation target to perform moving and shooting actions in a space above the predetermined plane.

According to the above configuration (19), it is possible to realize a shooting game in which the first operation targets and the second operation target shoot each other. In such a game, it is advantageous to know the positions of other players' operation targets, and therefore in the case of the above configuration (19), the second player, who can recognize the positions of other operation targets from the second game image, can be put in a more advantageous position than the first players. Thus, in the case of a game for a plurality of first players to play against one second player, the game can be rendered highly enjoyable without excessive disadvantage to the second player even in the one-to-many situation.

(20) The game apparatus may further include an image compression section for compressing the second game image. In this case, the second image output section wirelessly transmits the compressed second game image. The transportable display device further includes an image decompression section for decompressing the compressed second game image received by the image reception section. The display section displays the second game image decompressed by the image decompression section.

According to the above configuration (20), the second game image is compressed and then transmitted from the game apparatus to the transportable display device, which makes it possible to wirelessly transmit game images at high speed and thereby reduce any delay in displaying a game image when a game process is performed.

The present specification discloses example game apparatuses as included in the game systems described in (1) to (20) above. Moreover, the present specification discloses example non-transitory computer-readable storage media each having stored therein a game program for causing computers of the game apparatuses to function as means equivalent to elements for game processes as described above (which may exclude the first image output section and the second image output section). Furthermore, the present specification discloses example game process methods as performed in the game systems described in (1) to (20) above.

In the game systems, the game apparatuses, the storage media each having a game program stored therein, and the game process methods as mentioned above, game images to be displayed on two display devices are different in terms of their ranges of a displayed game space, and both game images can be viewed by only selected players, which makes it possible to enhance the strategic aspect of a multiplayer game and render the game highly enjoyable.

These and other objects, features, aspects and advantages will become more apparent from the following detailed description when taken in conjunction with the accompanying drawings.

DETAILED DESCRIPTION OF NON-LIMITING EXAMPLE EMBODIMENTS

[1. Overall Configuration of the Game System]

Figure 1:
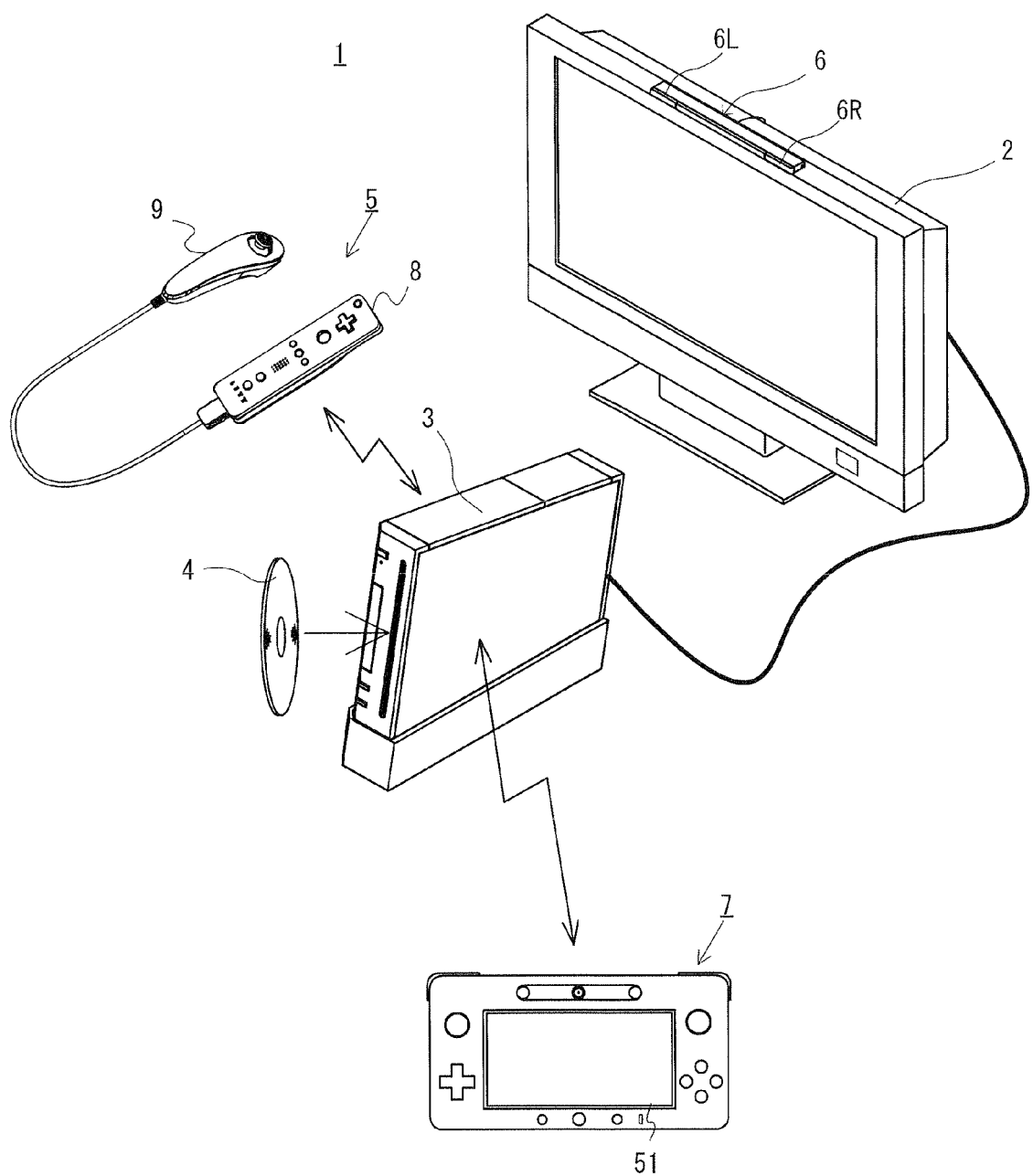
FIG. 1 is an external view of an example non-limiting game system 1.

An example game system 1 according to an example embodiment will now be described with reference to the drawings. FIG. 1 is an external view of the game system 1. In FIG. 1, the game system 1 includes a stationary display device (hereinafter referred to as a "television") 2 such as a television receiver, a stationary game apparatus 3, an optical disc 4, a controller 5, a marker device 6, and a terminal device 7. In the game system 1, the game apparatus 3 performs game processes based on game operations performed using the controller 5 and the terminal device 7, and game images acquired through the game processes are displayed on the television 2 and/or the terminal device 7.

In the game apparatus 3, the optical disc 4 typifying an information storage medium used for the game apparatus 3 in a replaceable manner is removably inserted. An information processing program (a game program, for example) to be executed by the game apparatus 3 is stored in the optical disc 4. The game apparatus 3 has, on the front surface thereof, an insertion opening for the optical disc 4. The game apparatus 3 reads and executes the information processing program stored on the optical disc 4 which is inserted into the insertion opening, to perform the game process.

The television 2 is connected to the game apparatus 3 by a connecting cord. Game images acquired as a result of the game processes performed by the game apparatus 3 are displayed on the television 2. The television 2 includes a speaker 2a (see FIG. 2), and the speaker 2a outputs game sounds acquired as a result of the game process. In alternative example embodiments, the game apparatus 3 and the stationary display device may be an integral unit. Also, the communication between the game apparatus 3 and the television 2 may be wireless communication.

The marker device 6 is provided along the periphery of the screen (on the upper side of the screen in FIG. 1) of the television 2. The user (player) can perform game operations by moving the controller 5, the details of which will be described later, and the marker device 6 is used by the game apparatus 3 for calculating the movement, position, attitude, etc., of the controller 5. The marker device 6 includes two markers 6R and 6L on opposite ends thereof. Specifically, the marker 6R (as well as the marker 6L) includes one or more infrared LEDs (Light Emitting Diodes), and emits an infrared light in a forward direction from the television 2. The marker device 6 is connected to the game apparatus 3, and the game apparatus 3 is able to control the lighting of each infrared LED of the marker device 6. Note that the marker device 6 is of a transportable type so that the user can install the marker device 6 in any desired position. While FIG. 1 shows an example embodiment in which the marker device 6 is arranged on top of the television 2, the position and the direction of arranging the marker device 6 are not limited to this particular arrangement.

The controller 5 provides the game apparatus 3 with operation data representing the content of operations performed on the controller itself. In the present example embodiment, the controller 5 includes a main controller 8 and a sub-controller 9, and the sub-controller 9 is detachably attached to the main controller 8. The controller 5 and the game apparatus 3 can wirelessly communicate with each other. In the present example embodiment, the wireless communication between the controller 5 and the game apparatus 3 uses, for example, Bluetooth (Registered Trademark) technology. In other example embodiments, the controller 5 and the game apparatus 3 may be connected by a wired connection. Furthermore, in FIG. 1, the game system 1 includes only one controller 5, but in the present example embodiment, the game system 1 includes a plurality (four) of controllers 5. The game apparatus 3 is capable of communicating with a plurality of controllers, so that by using a predetermined number of controllers at the same time, a plurality of people can play the game. The configuration of the controller 5 will be described in detail later.

The terminal device 7 is of a size that can be held by the user, so that the user can hold and move the terminal device 7 or can place the terminal device 7 in any desired position. As will be described in detail later, the terminal device 7 includes a liquid crystal display (LCD) 51, and input means (e.g., a touch panel 52 and a gyroscope 64 to be described later). The terminal device 7 can communicate with the game apparatus 3 wirelessly (or wired). The terminal device 7 receives data for images generated by the game apparatus 3 (e.g., game images) from the game apparatus 3, and displays the images on the LCD 51. Note that in the present example embodiment, the LCD is used as the display of the terminal device 7, but the terminal device 7 may include any other display device, e.g., a display device utilizing electro luminescence (EL). Furthermore, the terminal device 7 transmits operation data representing the content of operations performed thereon to the game apparatus 3.

[2. Internal Configuration of the Game Apparatus 3]

Figure 2:
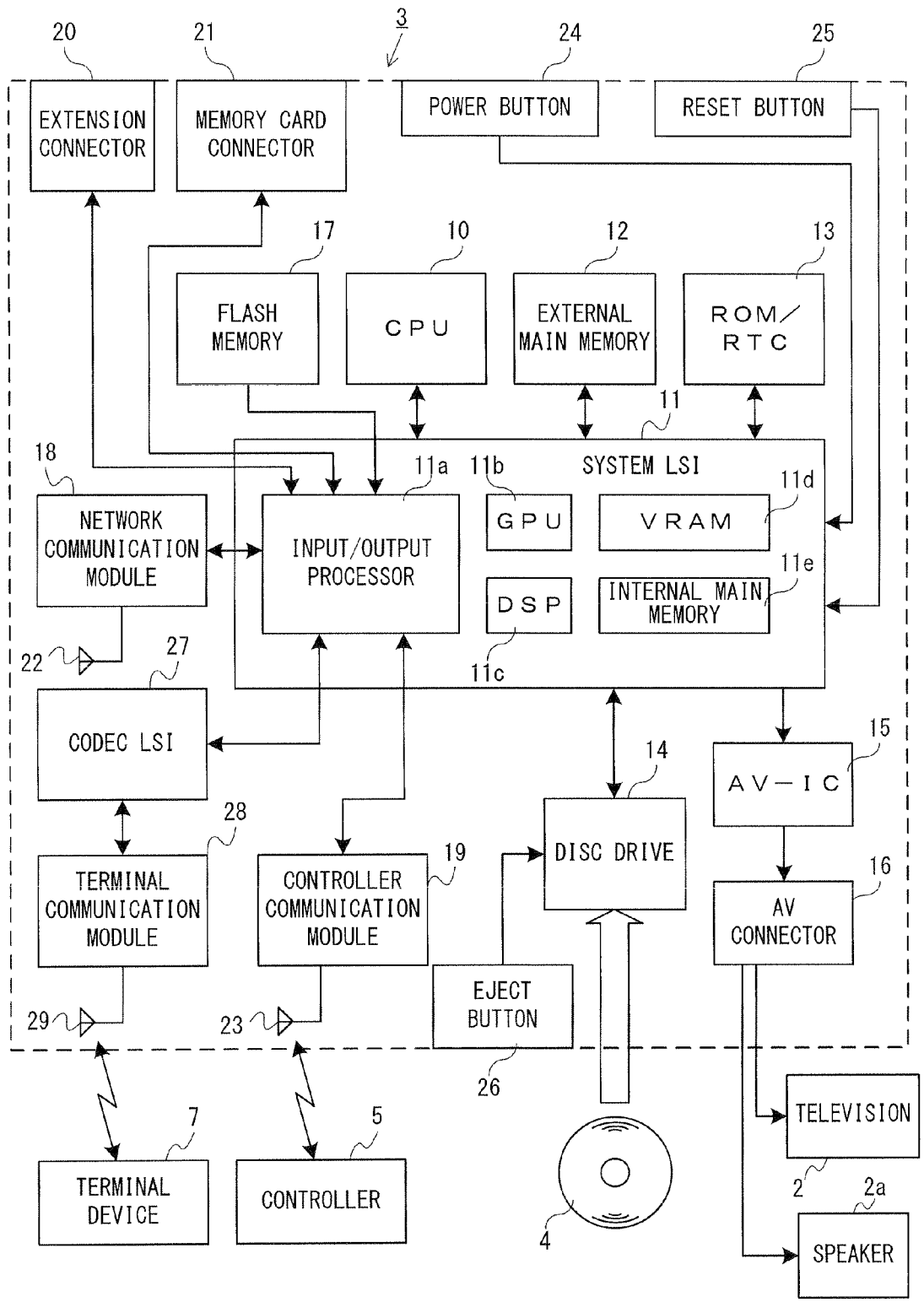
FIG. 2 is a block diagram illustrating an internal configuration of an example non-limiting game apparatus 3.

An internal configuration of the game apparatus 3 will be described with reference to FIG. 2. FIG. 2 is a block diagram illustrating an internal configuration of the game apparatus 3. The game apparatus 3 includes a CPU (Central Processing Unit) 10, a system LSI 11, external main memory 12, a ROM/RTC 13, a disc drive 14, and an AV-IC 15.

The CPU 10 performs game processes by executing a game program stored, for example, on the optical disc 4, and functions as a game processor. The CPU 10 is connected to the system LSI 11. The external main memory 12, the ROM/RTC 13, the disc drive 14, and the AV-IC 15, as well as the CPU 10, are connected to the system LSI 11. The system LSI 11 performs processes for controlling data transmission between the respective components connected thereto, generating images to be displayed, acquiring data from an external device(s), and the like. The internal configuration of the system LSI 11 will be described below. The external main memory 12 is of a volatile type and stores a program such as a game program read from the optical disc 4, a game program read from flash memory 17, and various data. The external main memory 12 is used as a work area and a buffer area for the CPU 10. The ROM/RTC 13 includes a ROM (a so-called boot ROM) incorporating a boot program for the game apparatus 3, and a clock circuit (RTC: Real Time Clock) for counting time. The disc drive 14 reads program data, texture data, and the like from the optical disc 4, and writes the read data into internal main memory 11e (to be described below) or the external main memory 12.

The system LSI 11 includes an input/output processor (I/O processor) 11a, a GPU (Graphics Processor Unit) lib, a DSP (Digital Signal Processor) 11c, VRAM (Video RAM) 11d, and the internal main memory 11e. Although not shown in the figures, these components 11a to 11e are connected with each other through an internal bus.

The GPU 11b, acting as a part of a rendering mechanism, generates images in accordance with graphics commands (rendering commands) from the CPU 10. The VRAM 11d stores data (data such as polygon data and texture data) to be used by the GPU lib to execute the graphics commands. When images are generated, the GPU 11b generates image data using data stored in the VRAM 11d. Note that in the present example embodiment, the game apparatus 3 generates both game images to be displayed on the television 2 and game images to be displayed on the terminal device 7. Hereinafter, the game images to be displayed on the television 2 are referred to as the "television game images" and the game images to be displayed on the terminal device 7 are referred to as the "terminal game images".

The DSP 11c, functioning as an audio processor, generates sound data using sound data and sound waveform (e.g., tone quality) data stored in one or both of the internal main memory 11e and the external main memory 12. Note that in the present example embodiment, game sounds to be generated are classified into two types as in the case of the game images, one being outputted by the speaker of the television 2, the other being outputted by speakers of the terminal device 7. Hereinafter, in some cases, the game sounds to be outputted by the television 2 are referred to as "television game sounds", and the game sounds to be outputted by the terminal device 7 are referred to as "terminal game sounds".

Among the images and sounds generated by the game apparatus 3 as described above, both image data and sound data to be outputted by the television 2 are read out by the AV-IC 15. The AV-IC 15 outputs the read-out image data to the television 2 via an AV connector 16, and outputs the read-out sound data to the speaker 2a provided in the television 2. Thus, images are displayed on the television 2, and sounds are outputted by the speaker 2a.

Furthermore, among the images and sounds generated by the game apparatus 3, both image data and sound data to be outputted by the terminal device 7 are transmitted to the terminal device 7 by the input/output processor 11a, etc. The data transmission to the terminal device 7 by the input/output processor 11a, etc., will be described later.

The input/output processor 11a exchanges data with components connected thereto, and downloads data from an external device(s). The input/output processor 11a is connected to the flash memory 17, a network communication module 18, a controller communication module 19, an expansion connector 20, a memory card connector 21, and a codec LSI 27. Furthermore, an antenna 22 is connected to the network communication module 18. An antenna 23 is connected to the controller communication module 19. The codec LSI 27 is connected to a terminal communication module 28, and an antenna 29 is connected to the terminal communication module 28.

The game apparatus 3 is capable of connecting to a network such as the Internet to communicate with external information processing apparatuses (e.g., other game apparatuses and various servers). Specifically, the input/output processor 11a can be connected to a network such as the Internet via the network communication module 18 and the antenna 22 to communicate with external information processing apparatuses connected to the network. The input/output processor 11a regularly accesses the flash memory 17, and detects the presence or absence of any data which needs to be transmitted to the network, and when detected, transmits the data to the network via the network communication module 18 and the antenna 22. Further, the input/output processor 11a receives data transmitted from the external information processing apparatuses and data downloaded from a download server via the network, the antenna 22 and the network communication module 18, and stores the received data in the flash memory 17. The CPU 10 executes a game program so as to read data stored in the flash memory 17 and use the data, as appropriate, in the game program. The flash memory 17 may store game save data (e.g., game result data or unfinished game data) of a game played using the game apparatus 3 in addition to data exchanged between the game apparatus 3 and the external information processing apparatuses. Moreover, the flash memory 17 may have a game program stored therein.

Furthermore, the game apparatus 3 is capable of receiving operation data from the controller 5. Specifically, the input/ output processor 11a receives operation data transmitted from the controller 5 via the antenna 23 and the controller communication module 19, and stores it (temporarily) in a buffer area of the internal main memory 11e or the external main memory 12.

Furthermore, the game apparatus 3 is capable of exchanging data, for images, sound, etc., with the terminal device 7. When transmitting game images (terminal game images) to the terminal device 7, the input/output processor 11a outputs game image data generated by the GPU 11b to the codec LSI 27. The codec LSI 27 performs a predetermined compression process on the image data from the input/output processor 11a. The terminal communication module 28 wirelessly communicates with the terminal device 7. Accordingly, the image data compressed by the codec LSI 27 is transmitted by the terminal communication module 28 to the terminal device 7 via the antenna 29. In the present example embodiment, the image data transmitted from the game apparatus 3 to the terminal device 7 is image data used in a game, and the playability of a game can be adversely influenced if there is a delay in the images displayed in the game. Therefore, delay may be avoided as much as possible in transmitting image data from the game apparatus 3 to the terminal device 7. Therefore, in the present example embodiment, the codec LSI 27 compresses image data using a compression technique with high efficiency such as the H.264 standard, for example. Other compression techniques may be used, and image data may be transmitted uncompressed if the communication speed is sufficient. The terminal communication module 28 is, for example, a Wi-Fi certified communication module, and may perform wireless communication at high speed with the terminal device 7 using a MIMO (Multiple Input Multiple Output) technique employed in the IEEE 802.11n standard, for example, or may use other communication schemes.

Furthermore, in addition to the image data, the game apparatus 3 also transmits sound data to the terminal device 7. Specifically, the input/output processor 11a outputs sound data generated by the DSP 11c to the terminal communication module 28 via the codec LSI 27. The codec LSI 27 performs a compression process on the sound data as it does on the image data. Any method can be employed for compressing the sound data, and such a method may use a high compression rate but may cause less sound degradation. Also, in another example embodiment, the sound data may be transmitted without compression. The terminal communication module 28 transmits compressed image and sound data to the terminal device 7 via the antenna 29.

Furthermore, in addition to the image and sound data, the game apparatus 3 transmits various control data to the terminal device 7 where appropriate. The control data is data representing an instruction to control a component included in the terminal device 7, e.g., an instruction to control lighting of a marker section (a marker section 55 shown in FIG. 10) or an instruction to control shooting by a camera (a camera 56 shown in FIG. 10). The input/output processor 11a transmits the control data to the terminal device 7 in accordance with an instruction from the CPU 10. Note that in the present example embodiment, the codec LSI 27 does not perform a compression process on the control data, but in another example embodiment, a compression process may be performed. Note that the data to be transmitted from the game apparatus 3 to the terminal device 7 may or may not be coded depending on the situation.

Furthermore, the game apparatus 3 is capable of receiving various data from the terminal device 7. As will be described in detail later, in the present example embodiment, the terminal device 7 transmits operation data, image data, and sound data. The data transmitted by the terminal device 7 is received by the terminal communication module 28 via the antenna 29. Here, the image data and the sound data from the terminal device 7 have been subjected to the same compression process as performed on the image data and the sound data from the game apparatus 3 to the terminal device 7. Accordingly, the image data and the sound data are transferred from the terminal communication module 28 to the codec LSI 27, and subjected to a decompression process by the codec LSI 27 before output to the input/output processor 11a. On the other hand, the operation data from the terminal device 7 is smaller in size than the image data or the sound data and therefore is not always subjected to a compression process. Moreover, the operation data may or may not be coded depending on the situation. Accordingly, after being received by the terminal communication module 28, the operation data is outputted to the input/output processor 11a via the codec LSI 27. The input/output processor 11a stores the data received from the terminal device 7 (temporarily) in a buffer area of the internal main memory 11e or the external main memory 12.

Furthermore, the game apparatus 3 can be connected to other devices or external storage media. Specifically, the input/output processor 11a is connected to the expansion connector 20 and the memory card connector 21. The expansion connector 20 is a connector for an interface, such as a USB or SCSI interface. The expansion connector 20 can receive a medium such as an external storage medium, a peripheral device such as another controller, or a wired communication connector which enables communication with a network in place of the network communication module 18. The memory card connector 21 is a connector for connecting thereto an external storage medium such as a memory card (which may be of a proprietary or standard format, such as SD, miniSD, microSD, Compact Flash, etc.). For example, the input/output processor 11a can access an external storage medium via the expansion connector 20 or the memory card connector 21 to store data in the external storage medium or read data from the external storage medium.

The game apparatus 3 includes a power button 24, a reset button 25, and an eject button 26. The power button 24 and the reset button 25 are connected to the system LSI 11. When the power button 24 is on, power is supplied from an external power source to the components of the game apparatus 3 via an AC adaptor (not shown). When the reset button 25 is pressed, the system LSI 11 reboots a boot program of the game apparatus 3. The eject button 26 is connected to the disc drive 14. When the eject button 26 is pressed, the optical disc 4 is ejected from the disc drive 14.

In other example embodiments, some of the components of the game apparatus 3 may be provided as extension devices separate from the game apparatus 3. In this case, an extension device may be connected to the game apparatus 3 via the expansion connector 20, for example. Specifically, an extension device may include components as described above, e.g., a codec LSI 27, a terminal communication module 28, and an antenna 29, and can be attached to/detached from the expansion connector 20. Thus, by connecting the extension device to a game apparatus which does not include the above components, the game apparatus can communicate with the terminal device 7.

[3. Configuration of the Controller 5]

Figure 3:
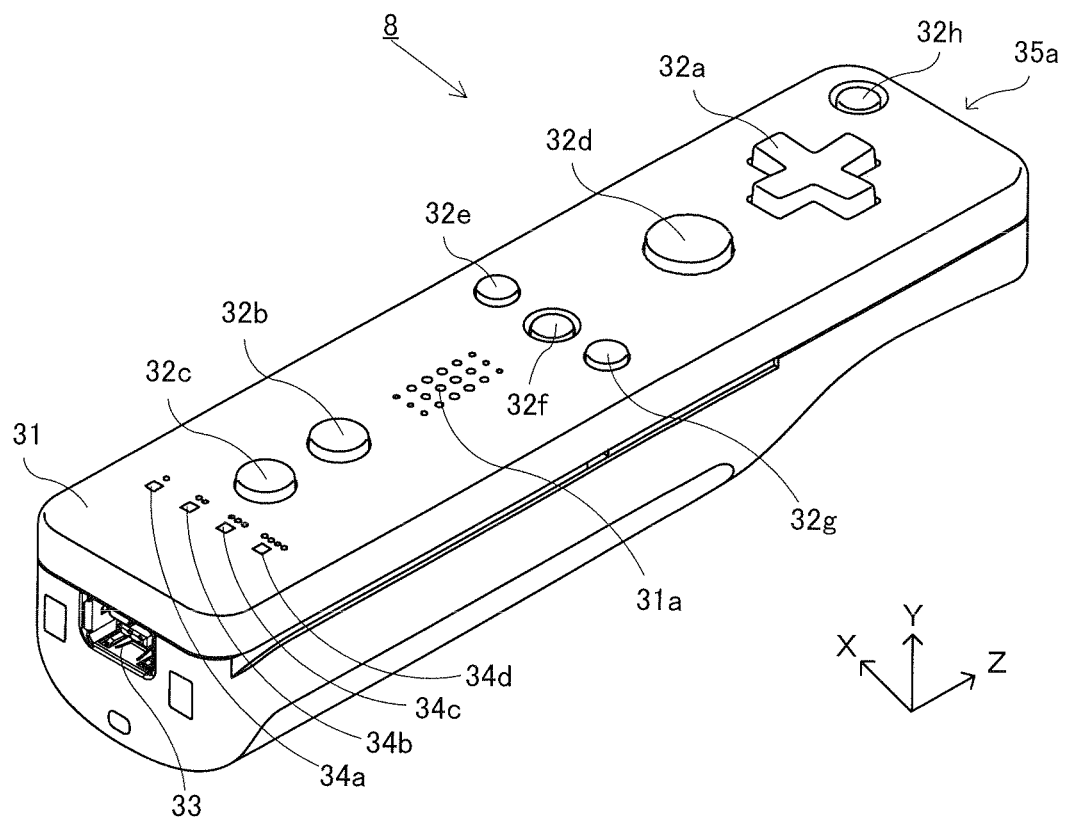
FIG. 3 is a perspective view illustrating an external configuration of an example non-limiting main controller 8.
Figure 4:
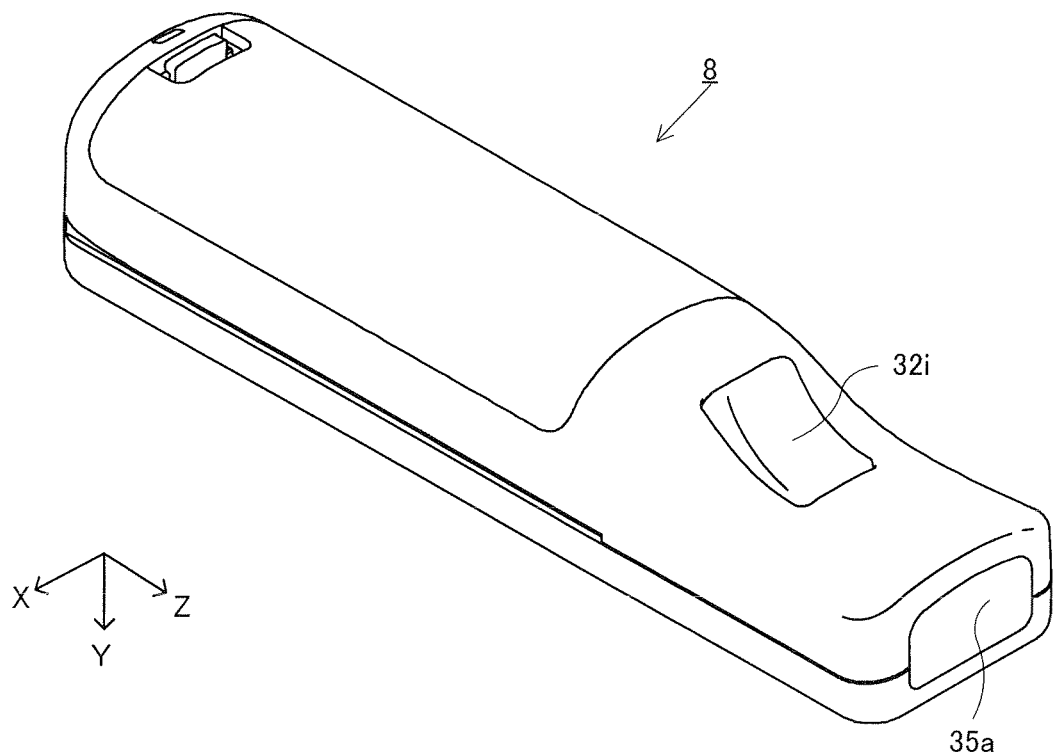
FIG. 4 is another perspective view illustrating an external configuration of the example non-limiting main controller 8.

Next, with reference to FIGS. 3 to 7, the controller 5 will be described. As described above, the controller 5 includes the main controller 8 and the sub-controller 9. FIG. 3 is a perspective view illustrating an external configuration of the main controller 8. FIG. 4 is a perspective view illustrating an external configuration of the main controller 8. The perspective view of FIG. 3 shows the main controller 8 as viewed from the top rear side thereof, and the perspective view of FIG. 4 shows the main controller 8 as viewed from the bottom front side thereof.

As shown in FIG. 3 and FIG. 4, the main controller 8 has a housing 31 formed by, for example, plastic molding. The housing 31 has a generally parallelepiped shape extending in a longitudinal direction from front to rear (Z-axis direction shown in FIG. 3), and as a whole is sized to be held by one hand of an adult or even a child. The user can perform game operations by pressing buttons provided on the main controller 8, and moving the main controller 8 to change the position and the attitude (tilt) thereof.

The housing 31 has a plurality of operation buttons. As shown in FIG. 3, on the top surface of the housing 31, a cross button 32a, a first button 32b, a second button 32c, an A button 32d, a minus button 32e, a home button 32f, a plus button 32g, and a power button 32h are provided. In the present example embodiment, the top surface of the housing 31 on which the buttons 32a to 32h are provided may be referred to as a "button surface". On the other hand, as shown in FIG. 4, a recessed portion is formed on the bottom surface of the housing 31, and a B button 32i is provided on a rear slope surface of the recessed portion. The operation buttons 32a to 32i are appropriately assigned their respective functions in accordance with the information processing program executed by the game apparatus 3. Further, the power button 32h is intended to remotely turn ON/OFF the game apparatus 3. The home button 32f and the power button 32h each have the top surface thereof recessed below the top surface of the housing 31. Therefore, the home button 32f and the power button 32h are prevented from being inadvertently pressed by the user.

On the rear surface of the housing 31, the connector 33 is provided. The connector 33 is used for connecting the main controller 8 to another device (e.g., the sub-controller 9 or another sensor unit). Both sides of the connector 33 on the rear surface of the housing 31 have a fastening hole 33a for preventing easy inadvertent disengagement of another device as described above.

In the rear-side portion of the top surface of the housing 31, a plurality (four in FIG. 3) of LEDs 34a, 34b, 34c, and 34d are provided. The controller 5 (the main controller 8) is assigned a controller type (number) so as to be distinguishable from another controller. The LEDs 34a, 34b, 34c, and 34d are each used for informing the user of the controller type which is currently being set for the controller 5 being used, and for informing the user of remaining battery power of the controller 5, for example. Specifically, when a game operation is performed using the controller 5, one of the LEDs 34a, 34b, 34c, and 34d corresponding to the controller type is lit up.

The main controller 8 has an imaging information calculation section 35 (FIG. 6), and a light incident surface 35a through which a light is incident on the imaging information calculation section 35 is provided on the front surface of the housing 31, as shown in FIG. 4. The light incident surface 35a is made of a material transmitting therethrough at least infrared light outputted by the markers 6R and 6L.

On the top surface of the housing 31, sound holes 31a for externally outputting a sound from a speaker 47 (shown in FIG. 5) incorporated in the main controller 8 is provided between the first button 32b and the home button 32f.

Figure 5:
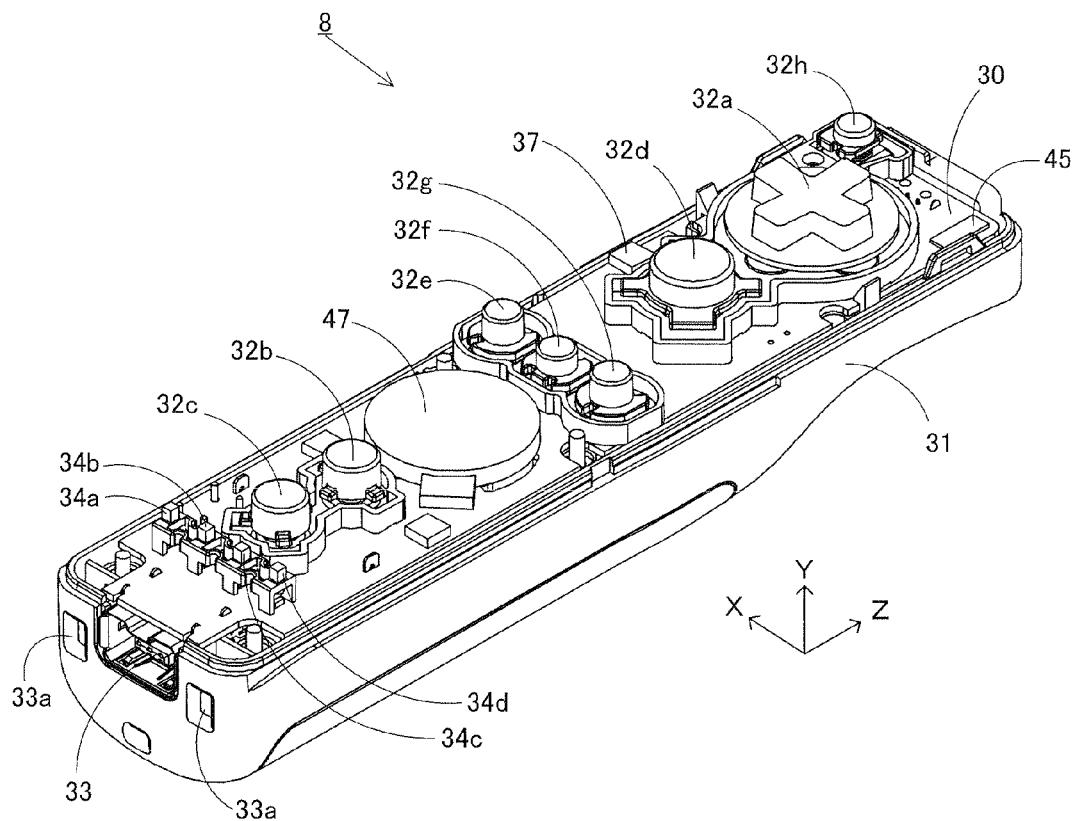
FIG. 5 is a diagram illustrating an internal configuration of the example non-limiting main controller 8.
Figure 6:
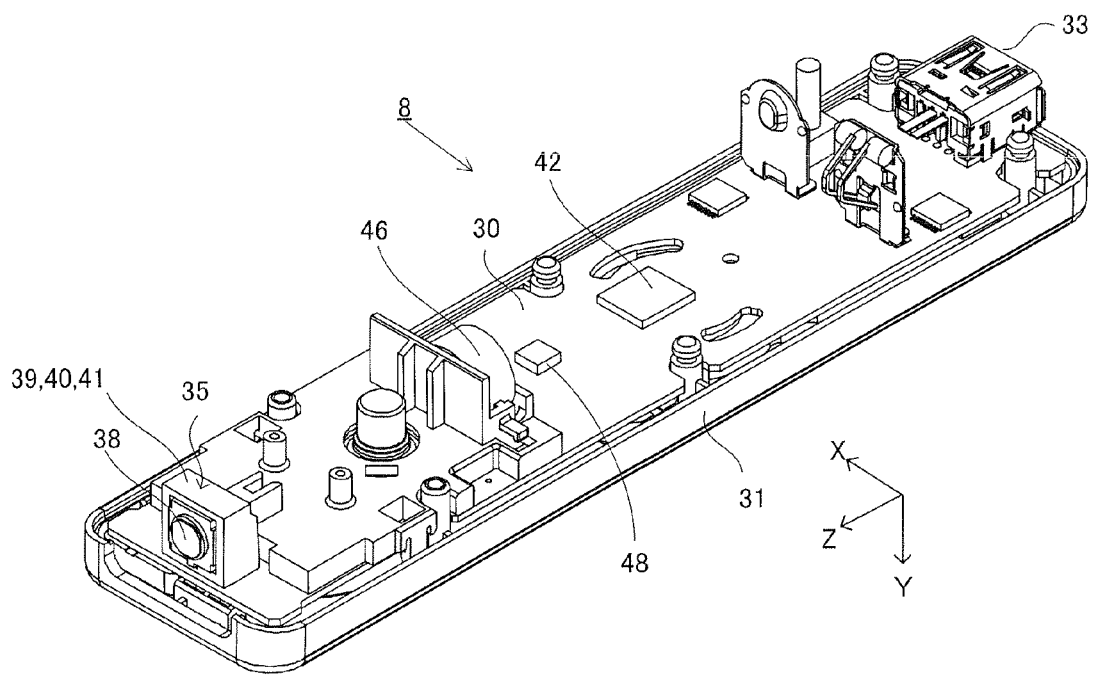
FIG. 6 is another diagram illustrating an internal configuration of the example non-limiting main controller 8.

Next, with reference to FIGS. 5 and 6, an internal configuration of the main controller 8 will be described. FIGS. 5 and 6 are diagrams illustrating the internal configuration of the main controller 8. FIG. 5 is a perspective view illustrating a state where an upper casing (a part of the housing 31) of the main controller 8 is removed. FIG. 6 is a perspective view illustrating a state where a lower casing (a part of the housing 31) of the main controller 8 is removed. The perspective view of FIG. 6 shows a substrate 30 of FIG. 5 as viewed from the reverse side.

As shown in FIG. 5, the substrate 30 is fixed inside the housing 31, and on a top main surface of the substrate 30, the operation buttons 32a to 32h, the LEDs 34a, 34b, 34c, and 34d, an acceleration sensor 37, an antenna 45, the speaker 47, and the like are provided. These elements are connected to a microcomputer 42 (see FIG. 6) via lines (not shown) formed on the substrate 30 and the like. In the present example embodiment, the acceleration sensor 37 is provided on a position offset from the center of the main controller 8 with respect to the X-axis direction. Thus, calculation of the movement of the main controller 8 being rotated about the Z-axis may be facilitated. Further, the acceleration sensor 37 is provided anterior to the center of the main controller 8 with respect to the longitudinal direction (Z-axis direction). Further, a wireless module 44 (see FIG. 6) and the antenna 45 allow the controller 5 (the main controller 8) to act as a wireless controller.

On the other hand, as shown in FIG. 6, at a front edge of a bottom main surface of the substrate 30, the imaging information calculation section 35 is provided. The imaging information calculation section 35 includes an infrared filter 38, a lens 39, an image pickup element 40 and an image processing circuit 41 located in order, respectively, from the front of the main controller 8. These components 38 to 41 are attached on the bottom main surface of the substrate 30.

On the bottom main surface of the substrate 30, the microcomputer 42 and a vibrator 46 are provided. The vibrator 46 is, for example, a vibration motor or a solenoid, and is connected to the microcomputer 42 via lines formed on the substrate 30 or the like. The main controller 8 is vibrated by actuation of the vibrator 46 based on a command from the microcomputer 42. Therefore, the vibration is conveyed to the user's hand holding the main controller 8, and thus a so-called vibration-feedback game is realized. In the present example embodiment, the vibrator 46 is disposed slightly toward the front of the housing 31. That is, the vibrator 46 is positioned offset from the center toward the end of the main controller 8, and therefore the vibration of the vibrator 46 can lead to enhancement of the vibration of the entire main controller 8. Further, the connector 33 is provided at the rear edge of the bottom main surface of the substrate 30. In addition to the components shown in FIGS. 5 and 6, the main controller 8 includes a quartz oscillator for generating a reference clock of the microcomputer 42, an amplifier for outputting a sound signal to the speaker 47, and the like.

Figure 7:
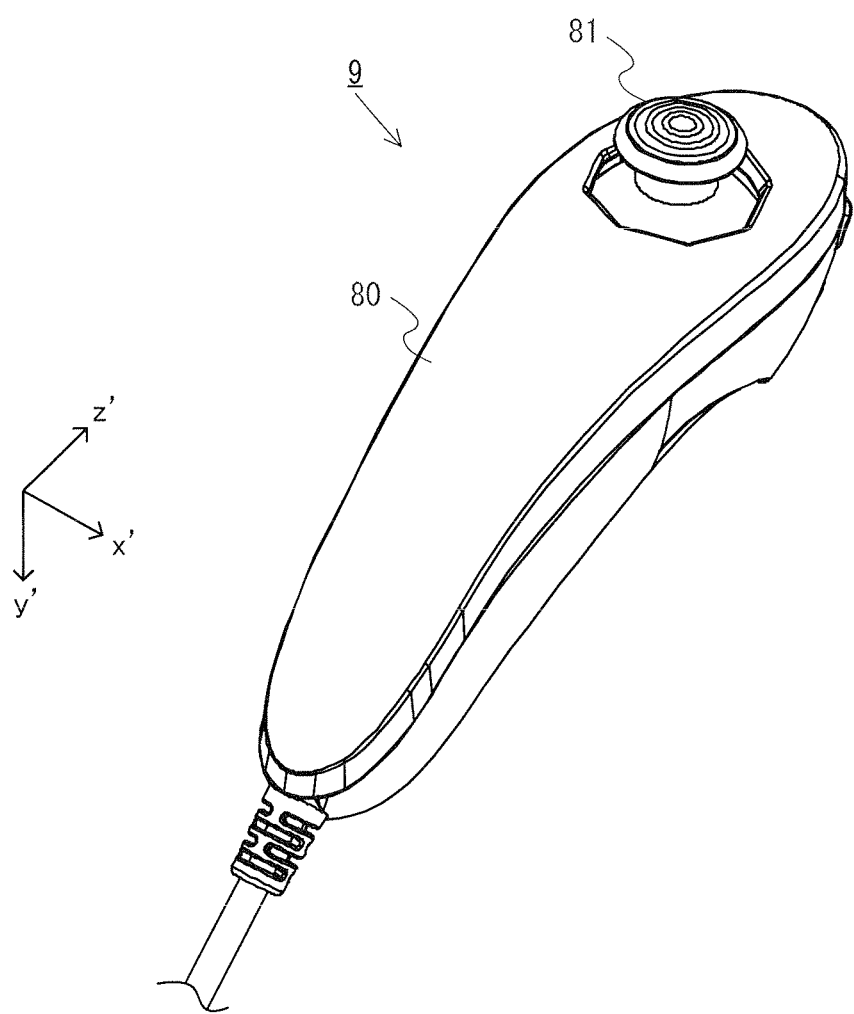
FIG. 7 is a perspective view illustrating an external configuration of an example non-limiting sub-controller 9.

FIG. 7 is a perspective view illustrating an external configuration of the sub-controller 9. The sub-controller 9 includes a housing 80 formed by, for example, plastic molding. As with the main controller 8, the housing 80 is sized as a whole to be held by a hand of an adult or a child. In the case of using the sub-controller 9 also, the player can perform game operations by operating buttons and sticks and changing the position and the direction of the sub-controller.

As shown in FIG. 7, the housing 80 has an analog joy stick 81 provided at the tip side (the z'-axis positive direction side) on the upper surface (the surface on the y'-axis negative direction side). Although not shown, the tip of the housing 80 has a surface slightly inclined backward, and a C button and a Z button are provided at the tip surface so as to be arranged vertically (the y-axis direction shown in FIG. 3). The analog joy stick 81 and these buttons (the C button and the Z button) are appropriately assigned their functions in accordance with game programs to be executed by the game apparatus 3. Note that in some cases, the analog joy stick 81 and these buttons may be collectively referred to as an "operating section 82 (see FIG. 8)".

Although not shown in FIG. 7, the sub-controller 9 also includes an acceleration sensor (acceleration sensor 83 shown in FIG. 8) inside the housing 80. In the present example embodiment, the acceleration sensor 83 is of the same type as the acceleration sensor 37 of the main controller 8. However, the acceleration sensor 83 may be of a different type from the acceleration sensor 37 and may detect acceleration about, for example, a predetermined one axis or two axes.

Furthermore, as shown in FIG. 7, the housing 80 is connected at the rear to one end of a cable. Although not shown in FIG. 7, the other end of the cable is attached to a connector (connector 84 shown in FIG. 8). The connector can be attached to the connector 33 of the main controller 8. That is, by attaching the connector 33 to the connector 84, the main controller 8 is attached to the sub-controller 9.

Note that FIGS. 3 to 7 only show examples of the shapes of the main controller 8 and the sub-controller 9, the shape of each operation button, the number and the positions of acceleration sensors and vibrators, and so on, and other shapes, numbers, and positions may be employed. Further, although in the present example embodiment, the imaging direction of the image pickup means of the main controller 8 is the Z-axis positive direction, the imaging direction may be any direction. That is, the imagining information calculation section 35 (the light incident surface 35a through which a light is incident on the imaging information calculation section 35) of the controller 5 may not necessarily be provided on the front surface of the housing 31, but may be provided on any other surface on which a light can be received from the outside of the housing 31.

Figure 8:
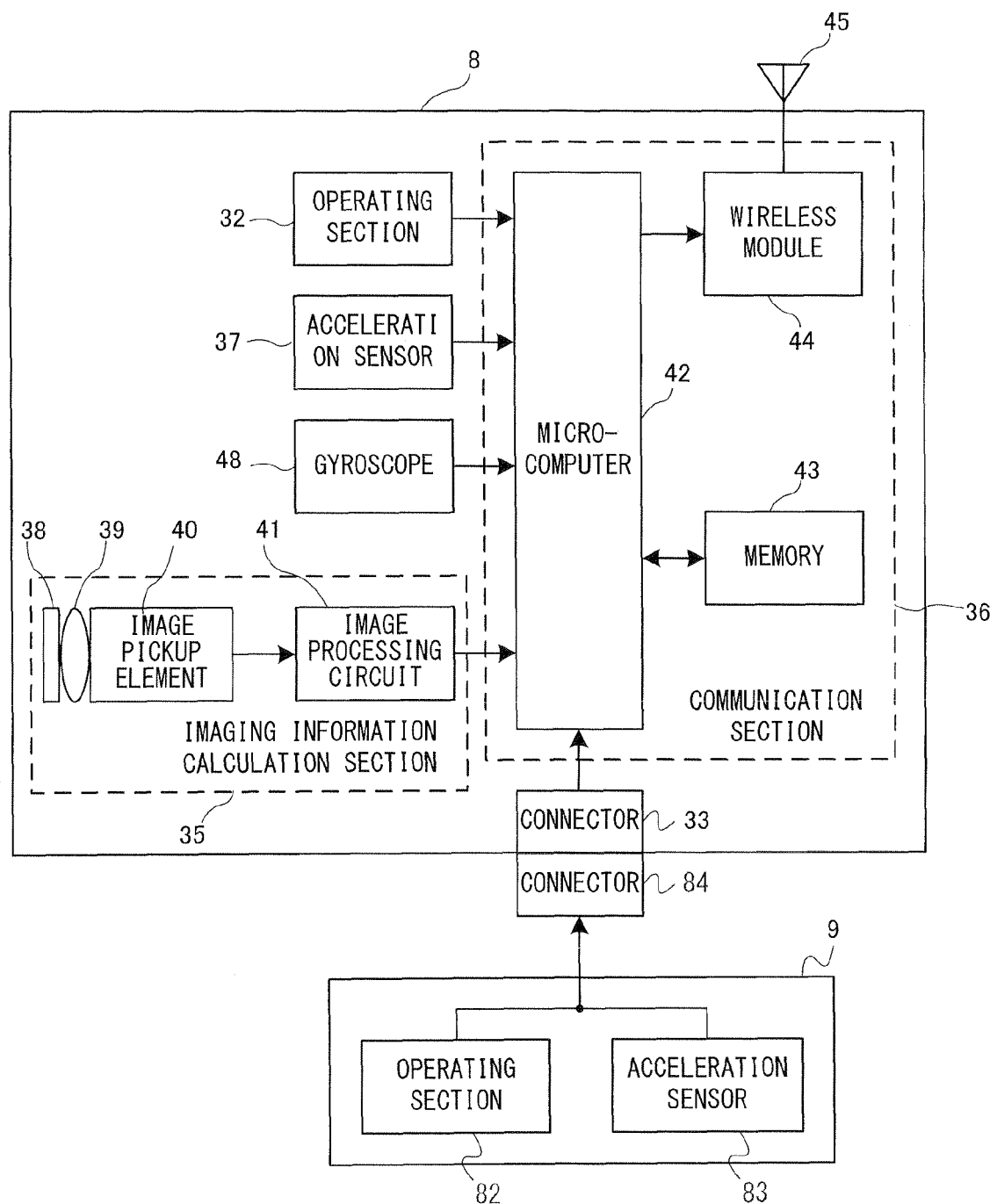
FIG. 8 is a block diagram illustrating a configuration of an example non-limiting controller 5.

FIG. 8 is a block diagram illustrating a configuration of the controller 5. As shown in FIG. 8, the main controller 8 includes an operating section 32 (the operation buttons 32a to 32i), the imaging information calculation section 35, a communication section 36, the acceleration sensor 37, and a gyroscope 48. The sub-controller 9 includes an operating section 82 and an acceleration sensor 83. The controller 5 transmits, as operation data, data representing the content of an operation performed on the controller 5 itself, to the game apparatus 3. Note that hereinafter, in some cases, operation data transmitted by the controller 5 is referred to as "controller operation data", and operation data transmitted by the terminal device 7 is referred to as "terminal operation data".

The operating section 32 includes the operation buttons 32a to 32i described above, and outputs, to the microcomputer 42 of the communication section 36, operation button data indicating an input state (that is, whether or not each operation button 32a to 32i is pressed) of each operation button 32a to 32i.

The imaging information calculation section 35 is a system for analyzing image data taken by the image pickup means and calculating, for example, the centroid and the size of an area having a high brightness in the image data. The imaging information calculation section 35 has a maximum sampling period of, for example, about 200 frames/sec., and therefore can trace and analyze even a relatively fast motion of the controller 5.

The imaging information calculation section 35 includes the infrared filter 38, the lens 39, the image pickup element 40 and the image processing circuit 41. The infrared filter 38 transmits therethrough only infrared light included in the light incident on the front surface of the controller 5. The lens 39 collects the infrared light transmitted through the infrared filter 38 so as to be incident on the image pickup element 40. The image pickup element 40 is a solid-state imaging device such as, for example, a CMOS sensor or a CCD sensor, which receives the infrared light collected by the lens 39, and outputs an image signal. The marker section 55 of the terminal device 7 and the marker device 6, which are subjects to be imaged, include markers for outputting infrared light. Therefore, the infrared filter 38 enables the image pickup element 40 to receive only the infrared light transmitted through the infrared filter 38 and generate image data, so that an image of each subject to be imaged (the marker section 55 and/or the marker device 6) can be taken with enhanced accuracy. Hereinafter, the image taken by the image pickup element 40 is referred to as a pickup image. The image data generated by the image pickup element 40 is processed by the image processing circuit 41. The image processing circuit 41 calculates, in the pickup image, the positions of subjects to be imaged. The image processing circuit 41 outputs data representing coordinate points of the calculated positions, to the microcomputer 42 of the communication section 36. The data representing the coordinate points is transmitted as operation data to the game apparatus 3 by the microcomputer 42. Hereinafter, the coordinate points are referred to as "marker coordinate points". The marker coordinate point changes depending on the attitude (angle of tilt) and/or the position of the controller 5 itself, and therefore the game apparatus 3 is allowed to calculate the attitude and the position of the controller 5 using the marker coordinate point.

In another example embodiment, the controller 5 may not necessarily include the image processing circuit 41, and the controller 5 may transmit the pickup image as it is to the game apparatus 3. At this time, the game apparatus 3 may have a circuit or a program, having the same function as the image processing circuit 41, for calculating the marker coordinate point.

The acceleration sensor 37 detects accelerations (including a gravitational acceleration) of the controller 5, that is, force (including gravity) applied to the controller 5. The acceleration sensor 37 detects a value of an acceleration (linear acceleration) applied to a detection section of the acceleration sensor 37 in the straight line direction along the sensing axis direction, among all accelerations applied to a detection section of the acceleration sensor 37. For example, a multiaxial acceleration sensor having two or more axes detects an acceleration of a component for each axis, as the acceleration applied to the detection section of the acceleration sensor. The acceleration sensor 37 is, for example, a capacitive MEMS (Micro-Electro Mechanical System) acceleration sensor. However, another type of acceleration sensor may be used.

In the present example embodiment, the acceleration sensor 37 detects a linear acceleration in each of three axis directions, i.e., the up/down direction (Y-axis direction shown in FIG. 3), the left/right direction (the X-axis direction shown in FIG. 3), and the forward/backward direction (the Z-axis direction shown in FIG. 3), relative to the controller 5. The acceleration sensor 37 detects acceleration in the straight line direction along each axis, and an output from the acceleration sensor 37 represents a value of the linear acceleration for each of the three axes. In other words, the detected acceleration is represented as a three-dimensional vector in an XYZ-coordinate system (controller coordinate system) defined relative to the controller 5.

Data (acceleration data) representing the acceleration detected by the acceleration sensor 37 is outputted to the communication section 36. The acceleration detected by the acceleration sensor 37 changes depending on the attitude (angle of tilt) and the movement of the controller 5, and therefore the game apparatus 3 is allowed to calculate the attitude and the movement of the controller 5 using the acquired acceleration data. In the present example embodiment, the game apparatus 3 calculates the attitude, angle of tilt, etc., of the controller 5 based on the acquired acceleration data.

When a computer such as a processor (e.g., the CPU 10) of the game apparatus 3 or a processor (e.g., the microcomputer 42) of the controller 5 processes an acceleration signal outputted by the acceleration sensor 37 (or similarly from an acceleration sensor 63 to be described later), additional information relating to the controller 5 can be inferred or calculated (determined), as one skilled in the art will readily understand from the description herein. For example, in the case where the computer performs processing on the premise that the controller 5 including the acceleration sensor 37 is in static state (that is, in the case where processing is performed on the premise that the acceleration to be detected by the acceleration sensor includes only the gravitational acceleration), when the controller 5 is actually in static state, it is possible to determine whether or not, or how much the controller 5 tilts relative to the direction of gravity, based on the acceleration having been detected. Specifically, when the state where the detection axis of the acceleration sensor 37 faces vertically downward is set as a reference, whether or not the controller 5 tilts relative to the reference can be determined based on whether or not 1G (gravitational acceleration) is applied to the detection axis, and the degree to which the controller 5 tilts relative to the reference can be determined based on the magnitude of the gravitational acceleration. Further, the multiaxial acceleration sensor 37 processes the acceleration signals having been detected for the respective axes so as to more specifically determine the degree to which the controller 5 tilts relative to the direction of gravity. In this case, the processor may calculate, based on the output from the acceleration sensor 37, the angle at which the controller 5 tilts, or the direction in which the controller 5 tilts without calculating the angle of tilt. Thus, the acceleration sensor 37 is used in combination with the processor, making it possible to determine the angle of tilt or the attitude of the controller 5.

On the other hand, when it is premised that the controller 5 is in dynamic state (where the controller 5 is being moved), the acceleration sensor 37 detects the acceleration based on the movement of the controller 5, in addition to the gravitational acceleration. Therefore, when the gravitational acceleration component is eliminated from the detected acceleration through a predetermined process, it is possible to determine the direction in which the controller 5 moves. Even when it is premised that the controller 5 is in dynamic state, the acceleration component based on the movement of the acceleration sensor is eliminated from the detected acceleration through a predetermined process, whereby it is possible to determine the tilt of the controller 5 relative to the direction of gravity. In another example embodiment, the acceleration sensor 37 may include an embedded processor or another type of dedicated processor for performing any desired processing on an acceleration signal detected by the acceleration detection means incorporated therein before outputting to the microcomputer 42. For example, when the acceleration sensor 37 is intended to detect static acceleration (for example, gravitational acceleration), the embedded or dedicated processor could convert the acceleration signal to a corresponding angle of tilt (or another appropriate parameter).

The gyroscope 48 detects angular rates about three axes (in the present example embodiment, the X-, Y-, and Z-axes). In the present specification, the directions of rotation about the X-axis, the Y-axis, and the Z-axis relative to the imaging direction (the Z-axis positive direction) of the controller 5 are referred to as a pitch direction, a yaw direction, and a roll direction, respectively. So long as the gyroscope 48 can detect the angular rates about the three axes, any number thereof may be used, and also any combination of sensors may be included therein. That is, the two-axis gyroscope 55 detects angular rates in the pitch direction (the direction of rotation about the X-axis) and the roll direction (the direction of rotation about the Z-axis), and the one-axis gyroscope 56 detects an angular rate in the yaw direction (the direction of rotation about the Y-axis). For example, the gyroscope 48 may be a three-axis gyroscope or may include a combination of a two-axis gyroscope and a one-axis gyroscope to detect the angular rates about the three axes. Data representing the angular rates detected by the gyroscope 48 is outputted to the communication section 36. Alternatively, the gyroscope 48 may simply detect an angular rate about one axis or angular rates about two axes.

Furthermore, the operating section 82 of the sub-controller 9 includes the analog joy stick 81, the C button, and the Z button. The operating section 82 outputs stick data and operation button data to the main controller 8 via the connector 84, and the particular stick data and operation button data (referred to as "sub stick data" and "sub operation button data", respectively) outputted by the operating section 82 represent the direction and the amount of tilt of the analog stick 81 and the state of input with each button (as to whether the button has been pressed or not).

Furthermore, the acceleration sensor 83 of the sub-controller 9 is of the same type as the acceleration sensor 37 of the main controller 8, and detects accelerations (including a gravitational acceleration) of the sub-controller 9, i.e., force (including gravity) applied to the sub-controller 9. Among all accelerations applied to a detection section of the acceleration sensor 38, the acceleration sensor 83 detects values for accelerations (linear accelerations) linearly applied along three predetermined axial directions. Data representing the detected accelerations (referred to as "sub acceleration data") is outputted to the main controller 8 via the connector 84.

In this manner, the sub-controller 9 outputs sub-controller data, including the sub stick data, the sub operation button data, and the sub acceleration data, to the main controller 8.

The communication section 36 of the main controller 8 includes the microcomputer 42, memory 43, the wireless module 44 and the antenna 45. The microcomputer 42 controls the wireless module 44 for wirelessly transmitting, to the game apparatus 3, data acquired by the microcomputer 42 while using the memory 43 as a storage area in the process.

The sub-controller data from the sub-controller 9 is inputted to the microcomputer 42 and temporarily stored to the memory 43. In addition, data outputted by the operating section 32, the imaging information calculation section 35, the acceleration sensor 37, and the gyroscope 48 to the microcomputer 42 (referred to as "main controller data") is temporarily stored to the memory 43. Both the main controller and the sub-controller data are transmitted to the game apparatus 3 as operation data (controller operation data). Specifically, at the time of the transmission to the controller communication module 19 of the game apparatus 3, the microcomputer 42 outputs the operation data stored in the memory 43 to the wireless module 44. The wireless module 44 uses, for example, the Bluetooth (registered trademark) technology to modulate the operation data onto a carrier wave of a predetermined frequency, and radiates the low power radio wave signal from the antenna 45. That is, the operation data is modulated onto the low power radio wave signal by the wireless module 44 and transmitted from the controller 5. The controller communication module 19 of the game apparatus 3 receives the low power radio wave signal. The game apparatus 3 demodulates or decodes the received low power radio wave signal to acquire the operation data. The CPU 10 of the game apparatus 3 performs the game process using the operation data acquired from the controller 5. The wireless transmission from the communication section 36 to the controller communication module 19 is sequentially performed at a predetermined time interval. Since the game process is generally performed at a cycle of 1/60 sec. (corresponding to one frame time), data may be transmitted at a cycle of a shorter time period. The communication section 36 of the controller 5 outputs, to the controller communication module 19 of the game apparatus 3, the operation data at intervals of 1/200 seconds, for example.

As described above, the main controller 8 can transmit marker coordinate data, acceleration data, angular rate data, and operation button data as operation data representing operations performed thereon. The sub-controller 9 can transmit acceleration data, stick data, and operation button data as operation data representing operations performed thereon. In addition, the game apparatus 3 executes the game process using the operation data as game inputs. Accordingly, by using the controller 5, the user can perform the game operation of moving the controller 5 itself, in addition to conventionally general game operations of pressing operation buttons. For example, it is possible to perform the operations of tilting the main controller 8 and/or the sub-controller 9 to arbitrary attitudes, pointing the main controller 8 to arbitrary positions on the screen, and moving the main controller 8 and/or the sub-controller 9.

Also, in the present example embodiment, the controller 5 is not provided with any display means for displaying game images, but the controller 5 may be provided with a display means for displaying an image or suchlike to indicate, for example, a remaining battery level.

[4. Configuration of the Terminal Device 7]

Figure 9:
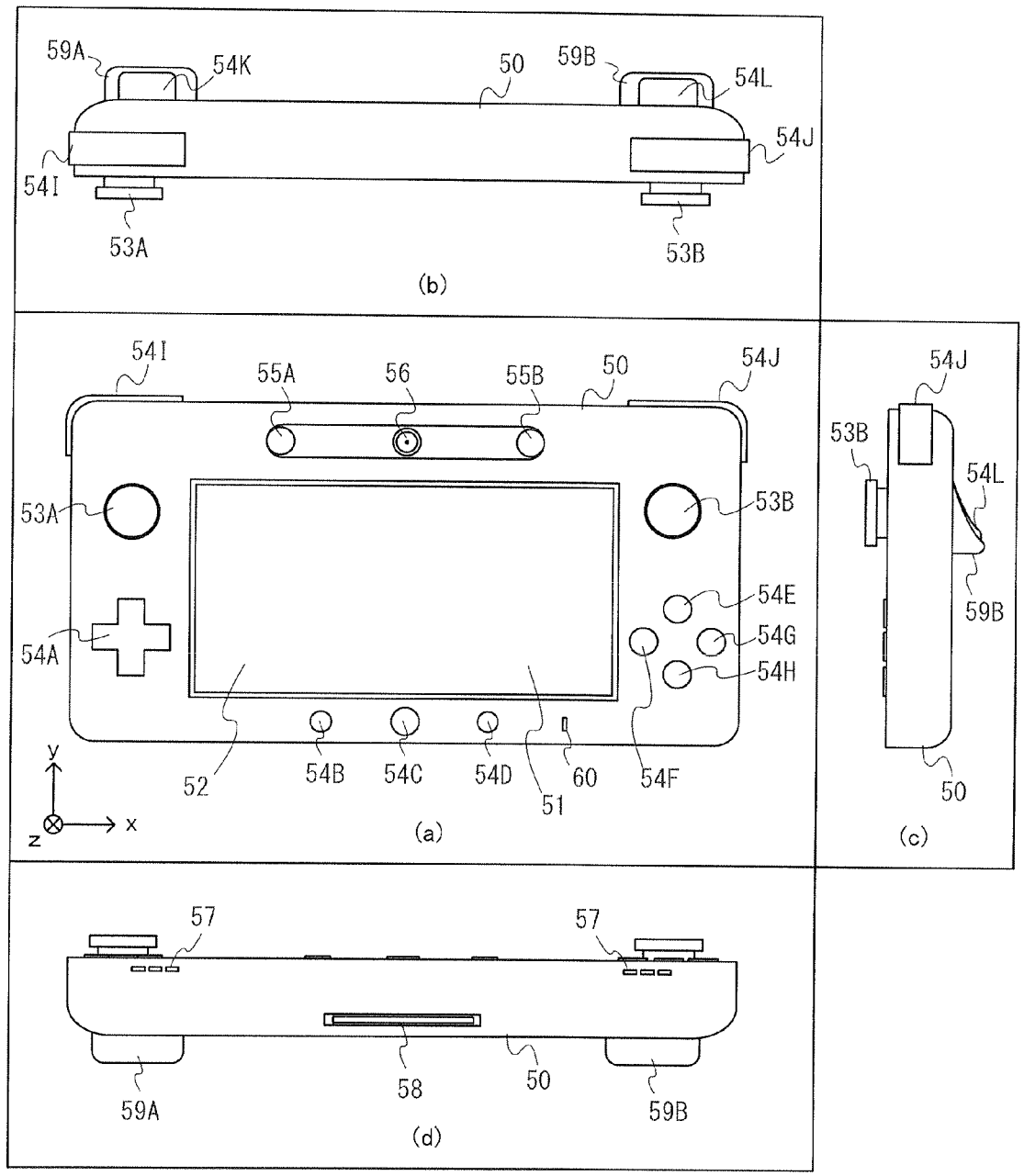
FIG. 9 is a diagram illustrating an external configuration of an example non-limiting terminal device 7.
Figure 10:
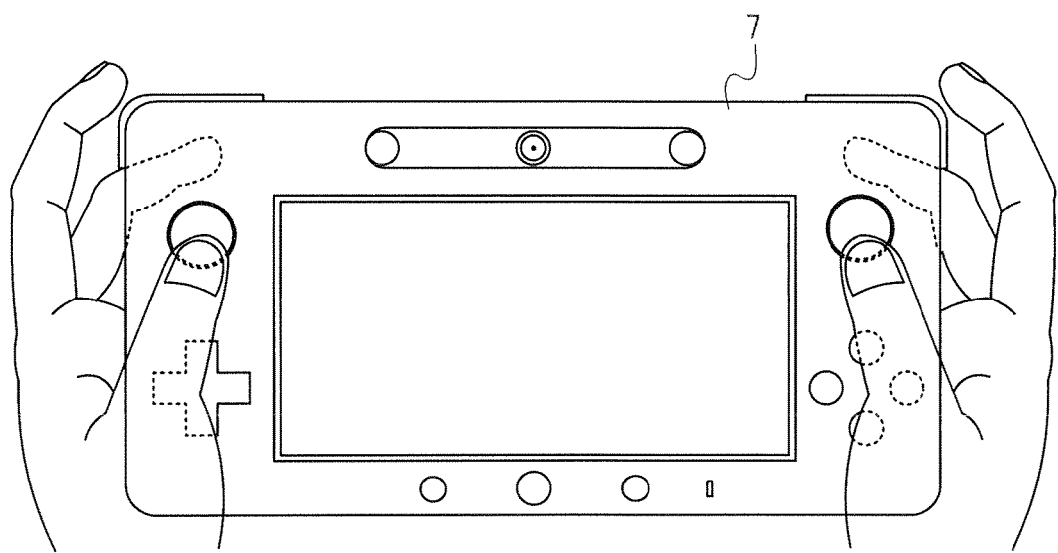
FIG. 10 is a diagram illustrating the example non-limiting terminal device 7 being held by the user.
Figure 11:
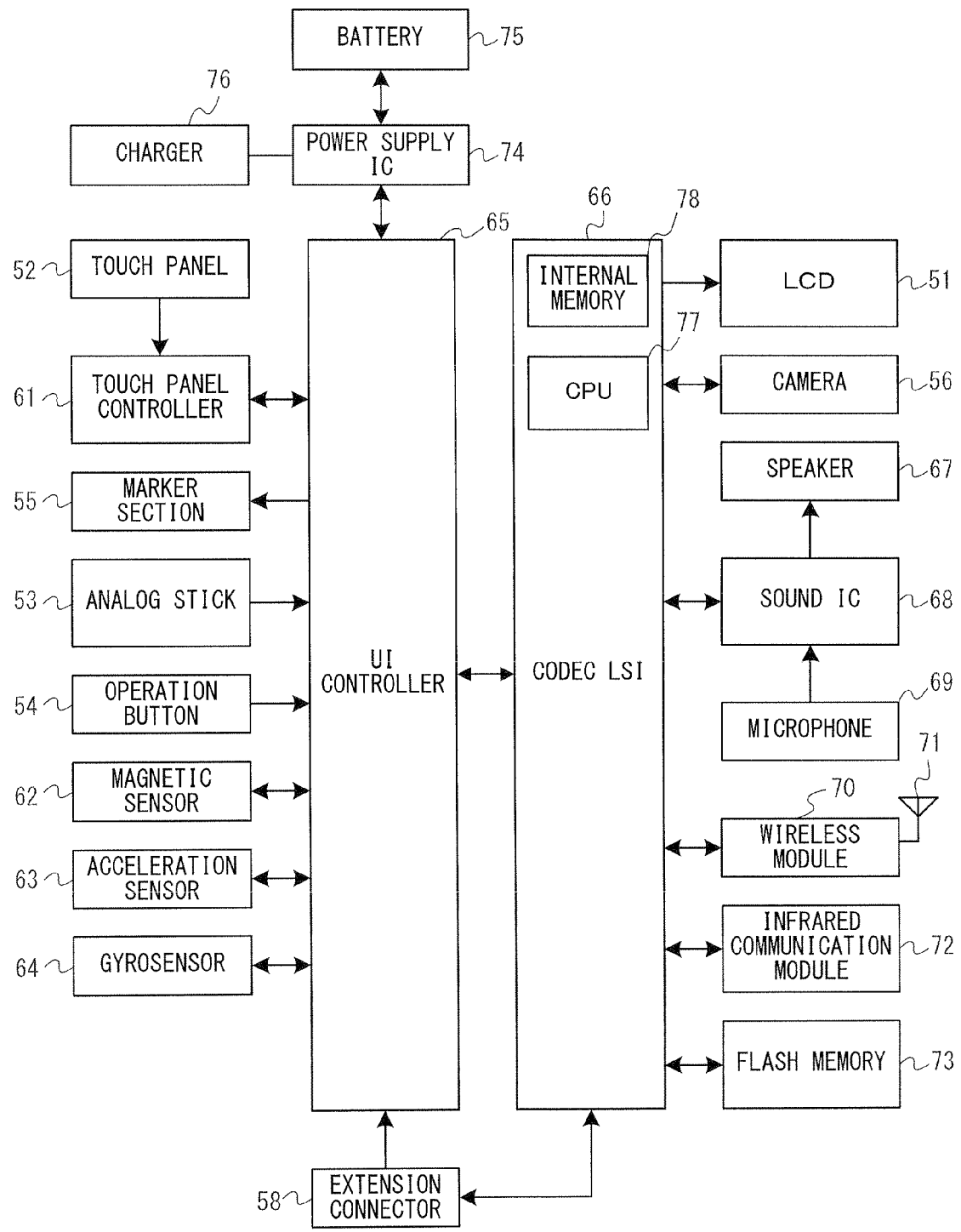
FIG. 11 is a block diagram illustrating an internal configuration of the example non-limiting terminal device 7.

Next, referring to FIGS. 9 to 11, the configuration of the terminal device 7 will be described. FIG. 9 provides views illustrating an external configuration of the terminal device 7. In FIG. 9, parts (a), (b), (c), and (d) are a front view, a top view, a right side view, and a bottom view, respectively, of the terminal device 7. FIG. 10 is a diagram illustrating the terminal device 7 being held by the user.

As shown in FIG. 9, the terminal device 7 has a housing 50 roughly shaped in the form of a horizontally rectangular plate. The housing 50 is sized to be held by the user. Thus, the user can hold and move the terminal device 7, and can change the position of the terminal device 7.

The terminal device 7 includes an LCD 51 on the front surface of the housing 50. The LCD 51 is provided approximately at the center of the surface of the housing 50. Therefore, the user can hold and move the terminal device while viewing the screen of the LCD 51 by holding the housing 50 by edges to the left and right of the LCD 51, as shown in FIG. 10. While FIG. 10 shows an example where the user holds the terminal device 7 horizontal (horizontally long) by holding the housing 50 by edges to the left and right of the LCD 51, the user can hold the terminal device 7 vertical (vertically long).

As shown in FIG. 9(a), the terminal device 7 includes a touch panel 52 on the screen of the LCD 51 as an operating means. In the present example embodiment, the touch panel 52 is a resistive touch panel. However, the touch panel is not limited to the resistive type, and may be of any type such as capacitive. The touch panel 52 may be single-touch or multi-touch. In the present example embodiment, a touch panel having the same resolution (detection precision) as the LCD 51 is used as the touch panel 52. However, the touch panel 52 and the LCD 51 do not have to be equal in resolution. While a stylus is usually used for providing input to the touch panel 52, input to the touch panel 52 can be provided not only by the stylus but also by the user's finger. Note that the housing 50 may be provided with an accommodation hole for accommodating the stylus used for performing operations on the touch panel 52. In this manner, the terminal device 7 includes the touch panel 52, and the user can operate the touch panel 52 while moving the terminal device 7. Specifically, the user can provide input directly to the screen of the LCD 51 (from the touch panel 52) while moving the screen.

As shown in FIG. 9, the terminal device 7 includes two analog sticks 53A and 53B and a plurality of buttons 54A to 54L, as operating means. The analog sticks 53A and 53B are devices capable of directing courses. Each of the analog sticks 53A and 53B is configured such that its stick portion to be operated with the user's finger is slidable (or tiltable) in an arbitrary direction (at an arbitrary angle in any of the up, down, left, right, and oblique directions) with respect to the surface of the housing 50. Moreover, the left analog stick 53A and the right analog stick 53B are provided to the left and the right, respectively, of the screen of the LCD 51. Accordingly, the user can provide an input for course direction using the analog stick with either the left or the right hand. In addition, as shown in FIG. 10, the analog sticks 53A and 53B are positioned so as to allow the user to manipulate them while holding the terminal device 7 at its left and right edges, and therefore the user can readily manipulate the analog sticks 53A and 53B while moving the terminal device 7 by hand.

The buttons 54A to 54L are operating means for providing predetermined input. As will be discussed below, the buttons 54A to 54L are positioned so as to allow the user to manipulate them while holding the terminal device 7 at its left and right edges (see FIG. 10). Therefore the user can readily manipulate the operating means while moving the terminal device 7 by hand.

As shown in FIG. 9(a), of all the operation buttons 54A to 54L, the cross button (direction input button) 54A and the buttons 54B to 54H are provided on the front surface of the housing 50. That is, these buttons 54A to 54H are positioned so as to allow the user to manipulate them with his/her thumbs (see FIG. 10).

The cross button 54A is provided to the left of the LCD 51 and below the left analog stick 53A. That is, the cross button 54A is positioned so as to allow the user to manipulate it with his/her left hand. The cross button 54A is a cross-shaped button which makes it possible to specify at least up, down, left and right directions. Also, the buttons 54B to 54D are provided below the LCD 51. These three buttons 54B to 54D are positioned so as to allow the user to manipulate them with either hand. Moreover, the four buttons 54E to 54H are provided to the right of the LCD 51 and below the right analog stick 53B. That is, the four buttons 54E to 54H are positioned so as to allow the user to manipulate them with the right hand. In addition, the four buttons 54E to 54H are positioned above, to the left of, to the right of, and below the central position among them. Therefore, the four buttons 54E to 54H of the terminal device 7 can be used to function as buttons for allowing the user to specify the up, down, left and right directions.

Furthermore, as shown in FIGS. 9(a), 9(b) and 9(c), the first L button 54I and the first R button 54J are provided at the upper (left and right) corners of the housing 50. Specifically, the first L button 54I is provided at the left edge of the top surface of the plate-like housing 50 so as to be exposed both from the top surface and the left-side surface. The first R button 54J is provided at the right edge of the top surface of the housing 50 so as to be exposed both from the top surface and the right-side surface. Thus, the first L button 54I is positioned so as to allow the user to manipulate it with the left index finger, and the first R button 54J is positioned so as to allow user to manipulate it with the right index finger (see FIG. 10).

Also, as shown in FIGS. 9(b) and 9(c), the second L button 54K and the second R button 54L are positioned at stands 59A and 59B, respectively, which are provided on the back surface of the plate-like housing 50 (i.e., the plane opposite to the surface where the LCD 51 is provided). The second L button 54K is provided at a comparatively high position on the right side of the back surface of the housing 50 (i.e., the left side as viewed from the front surface side), and the second R button 54L is provided at a comparatively high position on the left side of the back surface of the housing 50 (i.e., the right side as viewed from the front surface side). In other words, the second L button 54K is provided at a position approximately opposite to the left analog stick 53A provided on the front surface, and the second R button 54L is provided at a position approximately opposite to the right analog stick 53B provided on the front surface. Thus, the second L button 54K is positioned so as to allow the user to manipulate it with the left middle finger, and the second R button 54L is positioned so as to allow the user to manipulate it with the right middle finger (see FIG. 10). In addition, the second L button 54K and the second R button 54L are provided on the surfaces of the stands 59A and 59B that are directed obliquely upward, as shown in FIG. 9(c), and therefore, the second L button 54K and the second R button 54L have button faces directed obliquely upward. When the user holds the terminal device 7, the middle fingers will probably be able to move in the up/down direction, and therefore the button faces directed upward will allow the user to readily press the second L button 54K and the second R button 54L. Moreover, providing the stands on the back surface of the housing 50 allows the user to readily hold the housing 50, and furthermore, providing the buttons on the stands allows the user to readily manipulate the buttons while holding the housing 50.

Note that the terminal device 7 shown in FIG. 9 has the second L button 54K and the second R button 54L provided at the back surface, and therefore when the terminal device 7 is placed with the screen of the LCD 51 (the front surface of the housing 50) facing up, the screen might not be completely horizontal. Accordingly, in another example embodiment, three or more stands may be formed on the back surface of the housing 50. As a result, when the terminal device 7 is placed on the floor with the screen of the LCD 51 facing upward, all the stands contact the floor, so that the screen can be horizontal. Alternatively, the terminal device 7 may be placed horizontally by adding a detachable stand.

The buttons 54A to 54L are each appropriately assigned a function in accordance with the game program. For example, the cross button 54A and the buttons 54E to 54H may be used for direction-specifying operations, selection operations, etc., whereas the buttons 54B to 54E may be used for setting operations, cancellation operations, etc.

Although not shown in the figures, the terminal device 7 includes a power button for turning ON/OFF the terminal device 7. Moreover, the terminal device 7 may also include buttons for turning ON/OFF the screen of the LCD 51, performing a connection setting (pairing) with the game apparatus 3, and controlling the volume of speakers (speakers 67 shown in FIG. 11).

As shown in FIG. 9(a), the terminal device 7 has a marker section (a marker section 55 shown in FIG. 11), including markers 55A and 55B, provided on the front surface of the housing 50. The marker section 55 is provided in the upper portion of the LCD 51. The markers 55A and 55B are each formed by one or more infrared LEDs, as are the markers 6R and 6L of the marker device 6. The marker section 55 is used for the game apparatus 3 to calculate the movement, etc., of the controller 5 (the main controller 8), as is the marker device 6 described above. In addition, the game apparatus 3 can control the lighting of the infrared LEDs included in the marker section 55.

The terminal device 7 includes the camera 56 which is an image pickup means. The camera 56 includes an image pickup element (e.g., a CCD image sensor, a CMOS image sensor, or the like) having a predetermined resolution, and a lens. As shown in FIG. 8, in the present example embodiment, the camera 56 is provided on the front surface of the housing 50. Therefore, the camera 56 can pick up an image of the face of the user holding the terminal device 7, and can pick up an image of the user playing a game while viewing the LCD 51, for example.

Note that the terminal device 7 includes a microphone (a microphone 69 shown in FIG. 11) which is a sound input means. A microphone hole 60 is provided in the front surface of the housing 50. The microphone 69 is provided inside the housing 50 behind the microphone hole 60. The microphone detects sounds around the terminal device 7 such as the voice of the user.

The terminal device 7 includes speakers (speakers 67 shown in FIG. 11) which are sound output means. As shown in FIG. 9(d), speaker holes 57 are provided in the bottom surface of the housing 50. Sound emitted by the speakers 67 is outputted from the speaker holes 57. In the present example embodiment, the terminal device 7 includes two speakers, and the speaker holes 57 are provided at positions corresponding to the left and right speakers.

Also, the terminal device 7 includes an expansion connector 58 for connecting another device to the terminal device 7. In the present example embodiment, the expansion connector 58 is provided at the bottom surface of the housing 50, as shown in FIG. 9(d). Any additional device may be connected to the expansion connector 58, including, for example, a game-specific controller (a gun-shaped controller or suchlike) or an input device such as a keyboard. The expansion connector 58 may be omitted if there is no need to connect any additional devices to terminal device 7.

Note that as for the terminal device 7 shown in FIG. 9, the shapes of the operation buttons and the housing 50, the number and arrangement of components, etc., are merely illustrative, and other shapes, numbers, and arrangements may be employed.

Next, an internal configuration of the terminal device 7 will be described with reference to FIG. 11. FIG. 11 is a block diagram illustrating the internal configuration of the terminal device 7. As shown in FIG. 11, in addition to the components shown in FIG. 9, the terminal device 7 includes a touch panel controller 61, a magnetic sensor 62, the acceleration sensor 63, the gyroscope 64, a user interface controller (UI controller) 65, a codec LSI 66, the speakers 67, a sound IC 68, the microphone 69, a wireless module 70, an antenna 71, an infrared communication module 72, flash memory 73, a power supply IC 74, and a battery 75. These electronic components are mounted on an electronic circuit board and accommodated in the housing 50.

The UI controller 65 is a circuit for controlling the input/output of data to/from various input/output sections. The UI controller 65 is connected to the touch panel controller 61, an analog stick section 53 (including the analog sticks 53A and 53B), an operation button group 54 (including the operation buttons 54A to 54L), the marker section 55, the magnetic sensor 62, the acceleration sensor 63, the gyroscope 64. The UI controller 65 is connected to the codec LSI 66 and the expansion connector 58. The power supply IC 74 is connected to the UI controller 65, and power is supplied to various sections via the UI controller 65. The built-in battery 75 is connected to the power supply IC 74 to supply power. A charger 76 or a cable with which power can be obtained from an external power source can be connected to the power supply IC 74 via a charging connector, and the terminal device 7 can be charged with power supplied from an external power source using the charger 76 or the cable. Note that the terminal device 7 can be charged by being placed in an unillustrated cradle having a charging function.

The touch panel controller 61 is a circuit connected to the touch panel 52 for controlling the touch panel 52. The touch panel controller 61 generates touch position data in a predetermined format based on signals from the touch panel 52, and outputs it to the UI controller 65. The touch position data represents, for example, the coordinates of a position on the input surface of the touch panel 52 at which an input has been made. The touch panel controller 61 reads a signal from the touch panel 52 and generates touch position data once per a predetermined period of time. Various control instructions for the touch panel 52 are outputted by the UI controller 65 to the touch panel controller 61.

The analog stick section 53 outputs, to the UI controller 65, stick data representing the direction and the amount of sliding (or tilting) of the stick portion operated with the user's finger. The operation button group 54 outputs, to the UI controller 65, operation button data representing the input status of each of the operation buttons 54A to 54L (regarding whether it has been pressed).

The magnetic sensor 62 detects an azimuthal direction by sensing the magnitude and the direction of a magnetic field. Azimuthal direction data representing the detected azimuthal direction is outputted to the UI controller 65. Control instructions for the magnetic sensor 62 are outputted by the UI controller 65 to the magnetic sensor 62. While there are sensors using, for example, an MI (magnetic impedance) element, a fluxgate sensor, a Hall element, a GMR (giant magnetoresistance) element, a TMR (tunnel magnetoresistance) element, or an AMR (anisotropic magnetoresistance) element, the magnetic sensor 62 may be of any type so long as it is possible to detect the azimuthal direction. Strictly speaking, in a place where there is a magnetic field in addition to the geomagnetic field, the obtained azimuthal direction data does not represent the azimuthal direction. Nevertheless, if the terminal device 7 moves, the azimuthal direction data changes, and it is therefore possible to calculate the change in the attitude of the terminal device 7.

The acceleration sensor 63 is provided inside the housing 50 for detecting the magnitude of linear acceleration along each direction of three axes (the x-, y- and z-axes shown in FIG. 9(a)). Specifically, the acceleration sensor 63 detects the magnitude of linear acceleration along each axis, where the longitudinal direction of the housing 50 is taken as the x-axis, the width direction of the housing 50 as the y-axis, and a direction perpendicular to the front surface of the housing 50 as the z-axis. Acceleration data representing the detected acceleration is outputted to the UI controller 65. Also, control instructions for the acceleration sensor 63 are outputted by the UI controller 65 to the acceleration sensor 63. In the present example embodiment, the acceleration sensor 63 is assumed to be, for example, a capacitive MEMS acceleration sensor, but in another example embodiment, an acceleration sensor of another type may be employed. The acceleration sensor 63 may be an acceleration sensor for detection in one axial direction or two axial directions.

The gyroscope 64 is provided inside the housing 50 for detecting angular rates about the three axes, i.e., the x-, y-, and z-axes. Angular rate data representing the detected angular rates is outputted to the UI controller 65. Also, control instructions for the gyroscope 64 are outputted by the UI controller 65 to the gyroscope 64. Note that any number and combination of gyroscopes may be used for detecting angular rates about the three axes, and similar to the gyroscope 48, the gyroscope 64 may include a two-axis gyroscope and a one-axis gyroscope. Alternatively, the gyroscope 64 may be a gyroscope for detection in one axial direction or two axial directions.

The UI controller 65 outputs operation data to the codec LSI 66, including touch position data, stick data, operation button data, azimuthal direction data, acceleration data, and angular rate data received from various components described above. If another device is connected to the terminal device 7 via the expansion connector 58, data representing an operation performed on that device may be further included in the operation data.

The codec LSI 66 is a circuit for performing a compression process on data to be transmitted to the game apparatus 3, and a decompression process on data transmitted from the game apparatus 3. The LCD 51, the camera 56, the sound IC 68, the wireless module 70, the flash memory 73, and the infrared communication module 72 are connected to the codec LSI 66. The codec LSI 66 includes a CPU 77 and internal memory 78. While the terminal device 7 does not perform any game process itself, the terminal device 7 executes a minimal set of programs for its own management and communication purposes. Upon power-on, the CPU 77 executes a program loaded into the internal memory 78 from the flash memory 73, thereby starting up the terminal device 7. Also, some area of the internal memory 78 is used as VRAM for the LCD 51.

The camera 56 picks up an image in response to an instruction from the game apparatus 3, and outputs data for the pick-up image to the codec LSI 66. Also, control instructions for the camera 56, such as an image pickup instruction, are outputted by the codec LSI 66 to the camera 56. Note that the camera 56 can also record video. Specifically, the camera 56 can repeatedly pick up images and repeatedly output image data to the codec LSI 66.

The sound IC 68 is a circuit connected to the speakers 67 and the microphone 69 for controlling input/output of sound data to/from the speakers 67 and the microphone 69. Specifically, when sound data is received from the codec LSI 66, the sound IC 68 outputs to the speakers 67 a sound signal obtained by performing D/A conversion on the sound data so that sound is outputted by the speakers 67. The microphone 69 senses sound propagated to the terminal device 7 (e.g., the user's voice), and outputs a sound signal representing the sound to the sound IC 68. The sound IC 68 performs A/D conversion on the sound signal from the microphone 69 to output sound data in a predetermined format to the codec LSI 66.

The codec LSI 66 transmits, as terminal operation data, image data from the camera 56, sound data from the microphone 69 and operation data from the UI controller 65 to the game apparatus 3 via the wireless module 70. In the present example embodiment, the codec LSI 66 subjects the image data and the sound data to a compression process as the codec LSI 27 does. The terminal operation data, along with the compressed image data and sound data, is outputted to the wireless module 70 as transmission data. The antenna 71 is connected to the wireless module 70, and the wireless module 70 transmits the transmission data to the game apparatus 3 via the antenna 71. The wireless module 70 has a similar function to that of the terminal communication module 28 of the game apparatus 3. Specifically, the wireless module 70 has a function of connecting to a wireless LAN by a scheme in conformity with the IEEE 802.11n standard, for example. Data to be transmitted may or may not be encrypted depending on the situation.

As described above, the transmission data to be transmitted from the terminal device 7 to the game apparatus 3 includes operation data (terminal operation data), image data, and sound data. In the case where another device is connected to the terminal device 7 via the expansion connector 58, data received from that device may be further included in the transmission data. In addition, the infrared communication module 72 performs infrared communication with another device in accordance with, for example, the IRDA standard. Where appropriate, data received via infrared communication may be included in the transmission data to be transmitted to the game apparatus 3 by the codec LSI 66.

As described above, compressed image data and sound data are transmitted from the game apparatus 3 to the terminal device 7. These data items are received by the codec LSI 66 via the antenna 71 and the wireless module 70. The codec LSI 66 decompresses the received image data and sound data. The decompressed image data is outputted to the LCD 51, and images are displayed on the LCD 51. The decompressed sound data is outputted to the sound IC 68, and the sound IC 68 outputs sound from the speakers 67.

Also, in the case where control data is included in the data received from the game apparatus 3, the codec LSI 66 and the UI controller 65 give control instructions to various sections in accordance with the control data. As described above, the control data is data representing control instructions for the components of the terminal device 7 (in the present example embodiment, the camera 56, the touch panel controller 61, the marker section 55, the sensors 62 to 64, and the infrared communication module 72). In the present example embodiment, the control instructions represented by the control data are conceivably instructions to activate or deactivate (suspend) the components. Specifically, any components that are not used in a game may be deactivated in order to reduce power consumption, and in such a case, data from the deactivated components is not included in the transmission data to be transmitted from the terminal device 7 to the game apparatus 3. Note that the marker section 55 is configured by infrared LEDs, and therefore is simply controlled for power supply to be ON/OFF.

While the terminal device 7 includes operating means such as the touch panel 52, the analog sticks 53 and the operation button group 54, as described above, in another example embodiment, other operating means may be included in place of or in addition to these operating means.

Also, while the terminal device 7 includes the magnetic sensor 62, the acceleration sensor 63 and the gyroscope 64 as sensors for calculating the movement of the terminal device 7 (including its position and attitude or changes in its position and attitude), in another example embodiment, only one or two of the sensors may be included. Furthermore, in another example embodiment, any other sensor may be included in place of or in addition to these sensors.

Also, while the terminal device 7 includes the camera 56 and the microphone 69, in another example embodiment, the terminal device 7 may or may not include the camera 56 and the microphone 69 or it may include only one of them.

Also, while the terminal device 7 includes the marker section 55 as a feature for calculating the positional relationship between the terminal device 7 and the main controller 8 (e.g., the position and/or the attitude of the terminal device 7 as seen from the main controller 8), in another example embodiment, it may not include the marker section 55. Furthermore, in another example embodiment, the terminal device 7 may include another means as the aforementioned feature for calculating the positional relationship. For example, in another example embodiment, the main controller 8 may include a marker section, and the terminal device 7 may include an image pickup element. Moreover, in such a case, the marker device 6 may include an image pickup element in place of an infrared LED.

[5. Outline of the Game Process]

Next, the game process to be performed in the game system 1 of the present example embodiment will be outlined. The game to be performed by the present game process is a game for a plurality of players to play against each other using a terminal device 7 and a plurality of controllers 5 as operating devices. Note that the present example embodiment will be described with respect to the case where the game system 1 includes four controllers 5, and all of the four controllers 5 are used. Specifically, in the present example embodiment, the game is played by a total of five players, including one player manipulating the terminal device 7, and four other players manipulating their respective controllers 5. Note that in another example embodiment, the number of controllers 5 may be arbitrarily determined.

(Outline of the Game)

The game to be executed by the game process is a "tag" game. Specifically, the game to be played with the game system 1 is a game in which an object which is an operation target of the player using the terminal device 7 catches objects which are operation targets of the players using the controllers 5. Hereinafter, the players using the controllers 5 will be referred to as the "first players", and the operation targets of the first players will be referred to as the "first objects". In addition, the player using the terminal device 7 will be described as the "second player", and the operation target of the second player will be referred to as the "second object". The present game is played by the second player moving the second object to catch any of the first objects, and the first players moving their first objects away from the second object.

Figure 12:
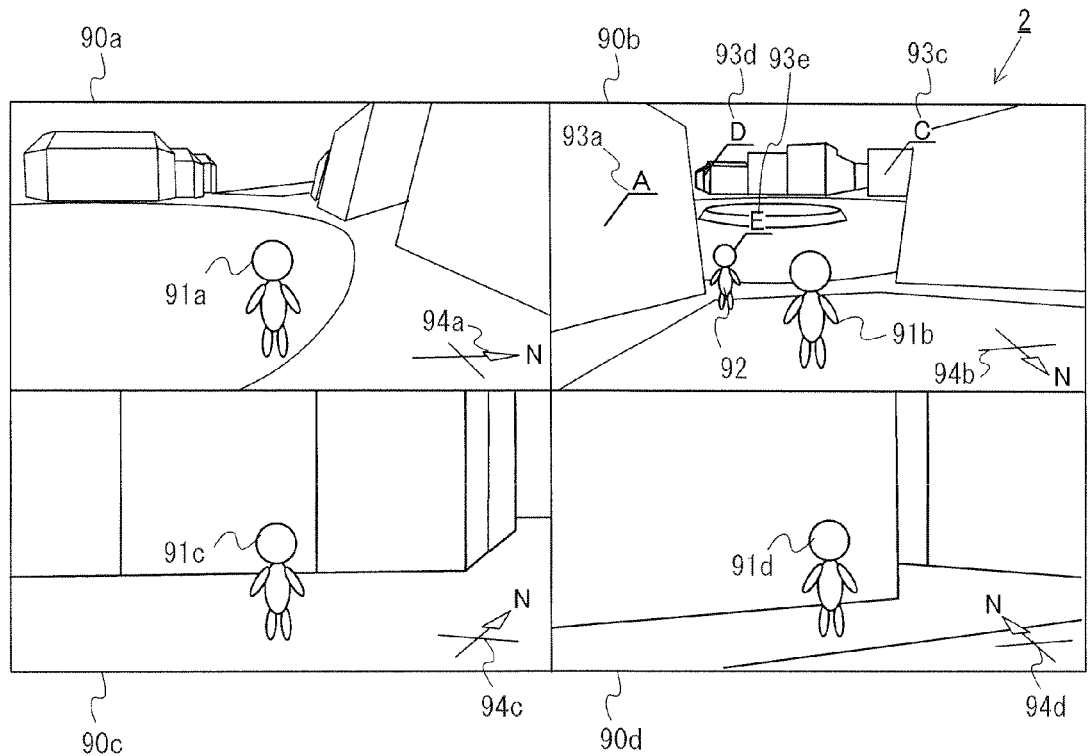
FIG. 12 is a diagram illustrating an example television game image in an example embodiment.

FIG. 12 is a diagram illustrating examples of the television game image in the present example embodiment. As shown in FIG. 12, the screen of the television 2 is divided into the same number as the number of controllers 5 (i.e., the number of first players; here, four), and a game image is displayed on each of the divisions. The four divided areas 90a to 90d are associated with four first objects 91a to 91d, respectively, and each of the areas 90a to 90d displays a game space image including the first object corresponding to that area. As shown in FIG. 12, in the present example embodiment, the game space image displayed on each of the areas 90a to 90d includes the first object corresponding to that area as viewed from behind. Moreover, in the present example embodiment, the game images displayed on the areas 90a to 90d are generated using virtual cameras being set in the game space. Hereinafter, the virtual cameras being set for generating the television game image will be referred to as the "first virtual cameras". In the present example embodiment, four first virtual cameras are set in the game space.

Figure 13:
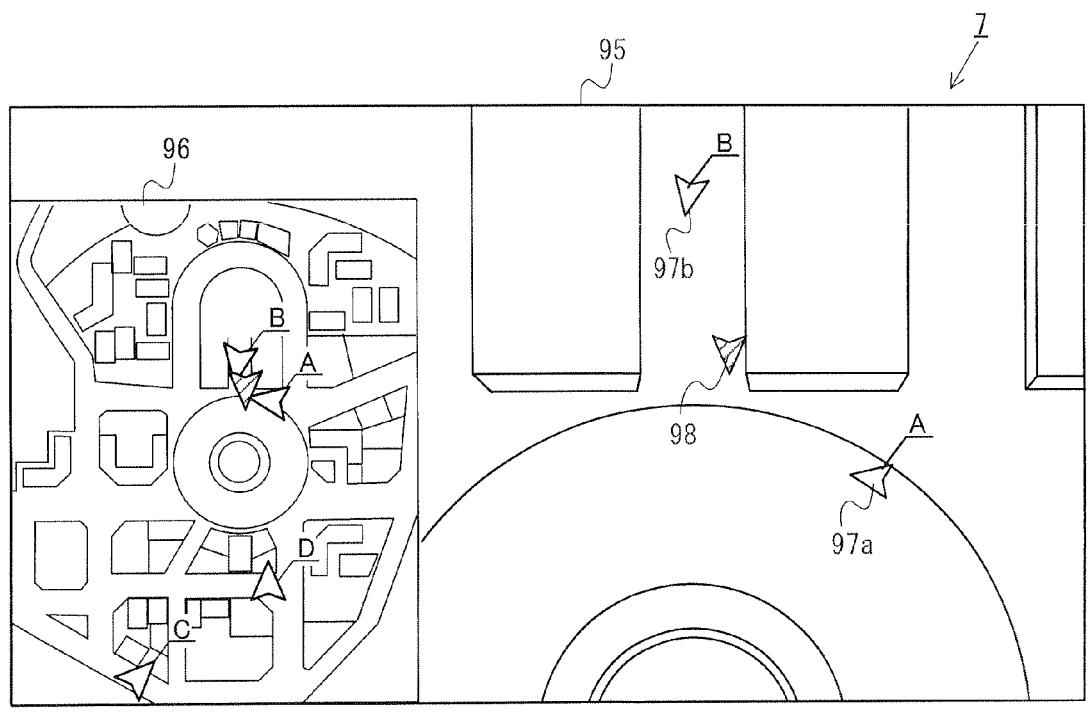
FIG. 13 is a diagram illustrating an example terminal game image in the example embodiment.

FIG. 13 is a diagram illustrating an example of the terminal game image in the present example embodiment. As shown in FIG. 13, a terminal game image including a narrow-area image 95 and a wide-area image 96 is displayed on the screen of the terminal device. The narrow-area image 95 is an image representing a predetermined range of the game space with respect to the second object. The wide-area image 96 is an image representing a wider area than the narrow-area image 95. In the present example embodiment, the wide-area image 96 represents the entire area in which the objects (the first and second objects) can move, but in another example embodiment, the wide-area image 96 may only partially represent the area. Moreover, as shown in FIG. 13, both the narrow-area image 95 and the wide-area image 96 are top-view images of the game space. In the present example embodiment, the narrow-area image 95 and the wide-area image 96 are generated using virtual cameras being set in the game space. Hereinafter, the virtual camera being set for generating the narrow-area image 95 is referred to as the "second virtual camera". In the present example embodiment, a total of two virtual cameras are used for generating the terminal game image, which are the second virtual camera for generating the narrow-area image 95, and the virtual camera for generating the wide-area image 96.

Figure 14:
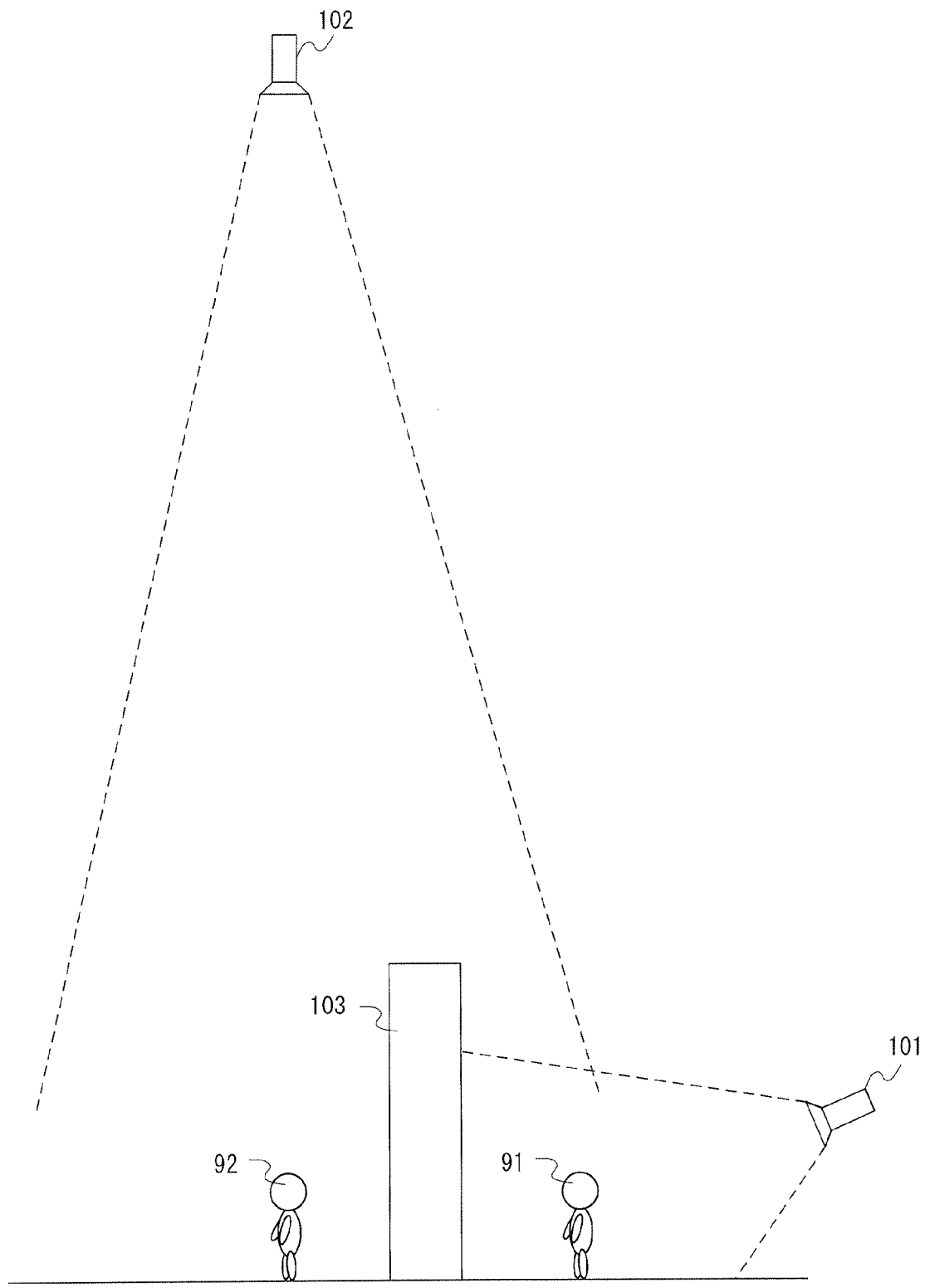
FIG. 14 is a diagram illustrating an example arrangement of a first virtual camera and a second virtual camera.

FIG. 14 is a diagram illustrating an arrangement of the first virtual camera and the second virtual camera. As shown in FIG. 14, the first virtual camera 101 is set such that its corresponding first object 91 (in some cases, simply referred to below as the "first object 91" where the four first objects are not specifically distinguished from one another) is viewed from behind. Concretely, the first virtual camera 101 is set behind the first object 91 at a predetermined position slightly higher than the first object 91. Note that in the present example embodiment, the first virtual camera 101 is set at a position lower than an obstacle object 103 such as a wall or building being set on the ground (field object) of the game space. In addition, the first virtual camera 101 is set so as to take an attitude directed toward the first object 91. Specifically, the line-of-sight direction of the first virtual camera 101 is set to be the same direction as the first object 91 in terms of the rightward and leftward directions (the directions of rotation about the vertical direction of the game space) and is directed slightly downward compared to the horizontal direction. However, in the case where any operation to abruptly change the direction of the first object 91 is possible, if the direction of the first virtual camera 101 is abruptly changed in accordance with the direction of the first object 91, the user might feel the display of the game image to be unnatural, and therefore the direction of the first virtual camera 101 is changed so as to gradually follow the direction of the first object 91 to provide natural display. Alternatively, only the direction of the first virtual camera 101 may be changed by the first player's operation, without changing the direction of the first object 91. Although FIG. 14 shows only one first virtual camera 101, first virtual cameras corresponding to four first objects are set in a manner as described above.

On the other hand, the second virtual camera 102 for generating the narrow-area image 95 is set in such a line-of-sight direction as to view the corresponding second object 92 from above. Concretely, as shown in FIG. 14, the second virtual camera 102 is set at a position directly above the second object 92 so as to take an attitude directed toward the second object 92 (i.e., vertically downward). Note that in the present example embodiment, the second virtual camera 102 is set at a position considerably higher than the obstacle object 103. As shown in FIG. 14, by setting the second virtual camera 102 at a high position so as to have a narrow angle of view, it is possible to reduce an area blinded by the obstacle object 103. Note that in another example embodiment, a virtual camera of an orthographic projection type may be used for the narrow-area image 95 (i.e., the narrow-area image 95 is generated by orthographic projection conversion). In addition, the virtual camera for generating the wide-area image 96 is set at a fixed position and with a fixed attitude such that its field-of-view range includes the entire area where the objects (the first and second objects) can move.

As described above, in the present example embodiment, when compared to the first virtual camera 101, the second virtual camera 102 is set to a greater angle of depression with respect to a predetermined plane (ground) on which the objects can move. In addition, the second virtual camera 102 is set at a higher elevation from the predetermined plane when compared to the first virtual camera 101. As a result, any area which is obstructed by the obstacle object 103 and cannot be seen with the first virtual camera 101 can be seen with the second virtual camera 102 (see FIG. 14). Specifically, in any television game image based on the first virtual camera 101 (FIG. 12), other objects present around the first object are blocked by obstacle objects 103 and therefore cannot be seen, but in any terminal game image based on the second virtual camera 102, it is possible to recognize the positions of other objects. Moreover, the terminal game image can be seen only by the second player manipulating the terminal device 7, and therefore only the second player can recognize the positions of the objects.

Here, the present game is a one-against-many game in which one second player is matched against a plurality (four) of first players, and therefore equalizing all conditions for the first players and the second player is disadvantageous to the second player. On the other hand, in the present example embodiment, the display range is set to vary between the game images to be viewed by the first player and those to be viewed by the second player, thereby bringing no disadvantage to the second player. Specifically, the terminal game image displaying the position of each object can be viewed and therefore recognized only by the second player, which is advantageous to the second player. The second player strategically performs a game operation taking advantage of knowing the position of each object, thereby offsetting the disadvantage of being one against many. For example, the second player can catch any first object 91 by performing a strategic game operation such as hiding behind an obstacle and catching any first object 91 coming close without knowing the position of the second object 92.

On the other hand, the first players have difficulty in individually recognizing the position of the second object, but can cooperate with one another to recognize (estimate) the position of the second object. Specifically, the first players can estimate and recognize the position of the second object by any first player who found the second object orally telling the position of the second object to the other first players or by viewing game images in which first objects manipulated by other first players are displayed. For example, in the situation shown in FIG. 12, the first player manipulating the first object 91b may tell the position of the second object to other first players, so that the first players can estimate the position of the second object. In this manner, in the present game, whether or not information can be accurately conveyed to one another is important for the first players to advantageously proceed with the game, which makes it possible to render the present game more strategic and highly enjoyable.

As described above, in the present example embodiment, two types of game images with different display ranges are generated, such that game images (terminal game images) of one type can be viewed only by selected players. Thus, it is possible to offer a highly enjoyable multiplayer game with enhanced strategy. Specifically, the second player manipulating the terminal device 7 can strategically play the game by taking advantage of only he/she knowing the position of each object from the terminal game image. Moreover, the first players manipulating their respective controllers 5 can strategically play the game by exchanging information among them and estimating the position of the second object.

(Display of the Position Indication Image)

In the present example embodiment, the television game image areas 90a to 90d may display first position indication images representing the positions of other first objects. For example, in FIG. 12, the area 90b displays three first position indication images 93a, 93c, and 93d. The first position indication images represent the positions of first objects on the screen and information for identifying the first objects (e.g., player names; in FIG. 12, shown as "A", "C", and "D"). Here, in the present example embodiment, the first position indication image is displayed in the case where another first object is included within the field-of-view range of the first virtual camera. Herein, the wording "an object is included within the field-of-view range of a virtual camera" is intended to mean that the object is included within a predetermined range defined by the angle of view of the virtual camera, regardless of whether that object and the virtual camera are intervened by another object (e.g., an obstacle object). That is, even in the case where another first object is positioned behind an obstacle object as viewed from the first virtual camera, if that first object is included within the field-of-view range of the first virtual camera, a first position indication image is displayed.

The first position indication image allows the first player to know the position of a first object (associate) other than his/her own operation target, and even if another first object is present at a position that cannot be seen from the position of the first virtual camera, an approximate position of that object can be known. Thus, any first player can accurately convey information about a second object to other first players. For example, in the situation shown in FIG. 12, the first player manipulating the first object 91b may tell the first player manipulating the first object 91a which is represented by the first position indication image 93a that the second object 92 is nearby. In addition, the first players manipulating the first objects 91c and 91d which are represented by the first position indication images 93c and 93d, respectively, may be told of an approximate position of the second object 92 and prompted to move away from that position. In this manner, the first position indication image allows the first player to convey an appropriate instruction for each other first player in accordance with the position of the first object, making it possible to further enhance the strategic aspect of the game.

Note that in some cases, the television game image areas 90a to 90d might display second position indication images representing the position of the second object 92. For example, in FIG. 12, the area 90b displays a second position indication image 93e. The second position indication image indicates the position of the second object 92 on the screen and information for identifying the second object 92 (e.g., a player name; in FIG. 12, shown as "E"). The second position indication image is displayed when the second object 92 is displayed on the screen. That is, in the case where the second object 92 is positioned behind an obstacle object as viewed from the first virtual camera, the second position indication image is not displayed. For example, the area 90a shown in FIG. 12 does not display the second position indication image because the second object 92 is positioned behind a wall though it is within the field-of-view range of the first virtual camera. In this manner, in the present example embodiment, by displaying the second position indication image only when the second object 92 is actually displayed, it is possible to prevent any first player from readily knowing the position of the second object 92, thereby preventing excessive disadvantage to the second player.

Note that, as shown in FIG. 12, the television game image areas 90a to 90d display azimuth images 94a to 94d. The azimuth images 94a to 94d indicate azimuths in the game space (predetermined directions in the game space). Accordingly, by the azimuth images 94a to 94d, the first players can recognize the directions in which their operation targets, i.e., the first objects 91, and the first virtual camera 101 face or move. In the present example embodiment, the first players cannot view the entire configuration of the game space, but can recognize/estimate an approximate configuration of the game space from the azimuth images 94a to 94d.

(Display of the Direction Indication Image)

Furthermore, as shown in FIG. 13, the narrow-area image 95 in the terminal game image displays first direction indication images 97a to 97d at the positions of the first objects, indicating the line-of-sight directions of the first virtual cameras, and also displays a second direction indication image 98 at the position of the second object, indicating the direction of the second object. The direction indication images 97a to 97d and 98 are images indicating the positions and the directions of the virtual cameras and the object. In addition, the first direction indication images 97a to 97d indicate the line-of-sight directions of the virtual cameras for the opponents (the first players), thereby allowing the second player to perform an operation without being found by the opponents. Note that the first direction indication images 97a to 97d are assigned images for identifying the first objects (e.g., character information representing the names of the players). Moreover, in the present example embodiment, as with the narrow-area image 95, the wide-area image 96 displays direction indication images as well.

Here, the terminal game images are images of the game space as viewed from directly above, and therefore the position of each object is displayed but each object is displayed in small size, which might cause any difficulty in recognizing the position and the direction of each object. On the other hand, in the present example embodiment, the direction indication images are displayed to enable the position and the direction of each object to be readily recognized.

(Display of the Magnified Image)

Figure 15:
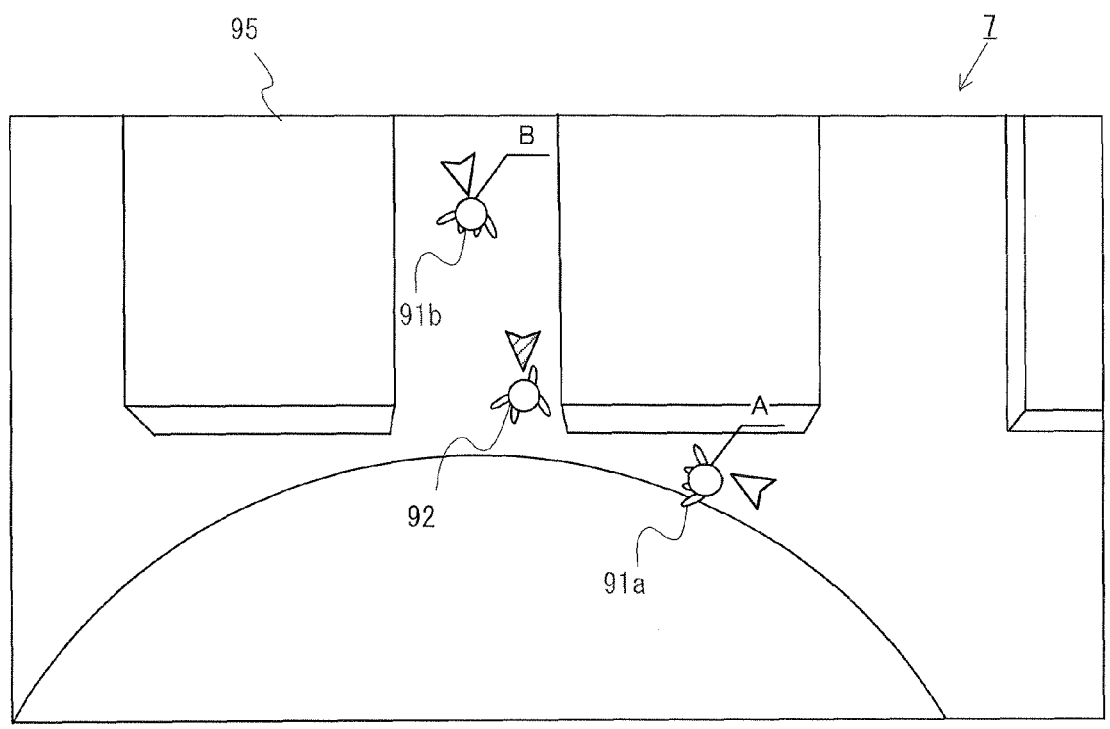
FIG. 15 is a diagram illustrating an example magnified image.

Furthermore, in the present example embodiment, when the second object 92 approaches any first object 91 so that they are within a predetermined distance from each other, a magnified version of the narrow-area image 95 is displayed. FIG. 15 is a diagram illustrating an example of the magnified image. As shown in FIG. 15, the magnified image is a game image showing the game space around the second object 92 at a higher magnification than in the narrow-area image 95. Although not shown in FIG. 15, the wide-area image 96 may be displayed in another example embodiment.

The ranges of the game space displayed in the narrow-area image 95 and the wide-area image 96 are sufficiently wide to indicate the positions of objects, but the objects are displayed in small size. Accordingly, the second player, who plays the game while viewing the narrow-area image 95 and the wide-area image 96, might have difficulty in controlling detailed action of the second object 92. Moreover, the second player might have the feeling of simply manipulating a small mark (direction indication image) displayed on the screen, which renders the game less exciting and realistic. Accordingly, in the present example embodiment, when the first object 91 and the second object 92 are placed within a predetermined distance from each other, the game apparatus 3 magnifies and displays the terminal game image. Thus, the game space is displayed in more detail on the terminal device 7, resulting in an exciting game image allowing the second player to readily perform game operations.

Note that the condition on which to display the magnified image is not limited to the above. For example, in another example embodiment, the game apparatus 3 may display a magnified image in response to the second player performing a predetermined operation or in response to the second object 92 coming in view of the first object 91 (i.e., the second object 92 being included in the television game image). Moreover, in another example embodiment, no magnified image may be displayed.

[6. Details of the Game Process]

Figure 16:
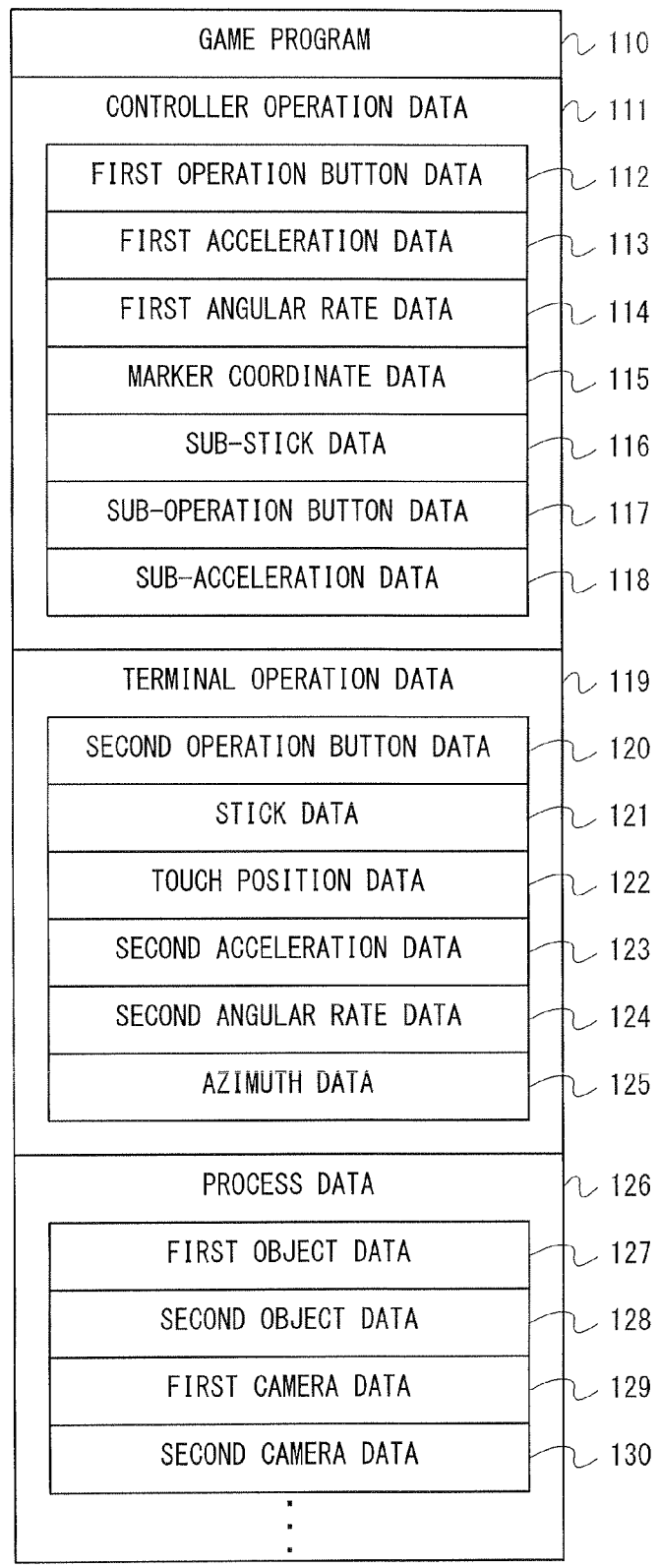
FIG. 16 is a diagram illustrating various types of data for use in a game process.

Next, the game process to be executed in the present game system will be described in detail. First, various types of data for use in the game process will be described. FIG. 16 is a diagram illustrating the data for use in the game process. In FIG. 16, main data stored in the main memory (the external main memory 12 or the internal main memory 11e) of the game apparatus 3 is shown. As shown in FIG. 16, the main memory of the game apparatus 3 has stored therein a game program 110, controller operation data 111, terminal operation data 119, and process data 126. Note that in addition to the data shown in FIG. 16, the main memory has stored therein data to be used in the game such as image data for various objects appearing in the game and sound data.

The game program 110 is partially or entirely read from the optical disc 4 at an appropriate time after the power-on of the game apparatus 3, and then stored to the main memory. Note that the game program 110 may be acquired from the flash memory 17 or a device external to the game apparatus 3 (e.g., via the Internet), rather than from the optical disc 4. Also, a portion of the game program 110 (e.g., a program for calculating the attitude of the controller 5 and/or the attitude of the terminal device 7) may be prestored in the game apparatus 3.

The controller operation data 111 is data representing the user's (player's) operation on the controller 5. The controller operation data 111 is transmitted by the controller 5, acquired by the game apparatus 3, and then stored to the main memory. The controller operation data 111 includes first operation button data 112, first acceleration data 113, first angular rate data 114, marker coordinate data 115, sub-stick data 116, sub-operation button data 117, and sub-acceleration data 118. Note that the main memory may have stored therein the controller operation data up to a predetermined number of pieces counted from the latest piece (the last acquired piece).

The first operation button data 112 is data representing an input state of each of the operation buttons 32a to 32i provided on the controller 5. Concretely, the first operation button data 112 represents whether the operation buttons 32a to 32i have been pressed or not.

The first acceleration data 113 is data representing acceleration (acceleration vector) detected by the acceleration sensor 37 of the controller 5. Here, the first acceleration data 113 represents three-dimensional acceleration whose components are acceleration values associated with the directions of three axes, X-, Y-, and Z-axes, shown in FIG. 3, but in another example embodiment, the data may represent acceleration associated with any one or more directions.

The first angular rate data 114 is data representing angular rates detected by the gyroscope 48 of the controller 5. Here, the first angular rate data 114 represents angular rates about three axes, X-, Y-, and Z-axes, shown in FIG. 3, but in another embodiment, the data may represent an angular rate about each of any one or more axes.

The marker coordinate data 115 is data representing a coordinate point calculated by the image processing circuit 41 of the imaging information calculation section 35, i.e., the data represents the marker coordinate point. The marker coordinate point is expressed by a two-dimensional coordinate system for representing a position in a plane that corresponds to a pickup image, and the marker coordinate data 115 represents coordinate values in the two-dimensional coordinate system.

The sub-stick data 116 is data representing an operation on the analog joy stick 81 of the sub-controller 9. Concretely, the sub-stick data 116 represents the direction and the amount of tilt with respect to the analog stick 81.

The sub-operation button data 117 is data representing an input state of each of the operation buttons provided on the sub-controller 9. Concretely, the sub-operation button data 117 represents whether the operation buttons have been pressed or not.

The sub-acceleration data 118 is data representing acceleration (acceleration vector) detected by the acceleration sensor 83 of the sub-controller 9. Here, the sub-acceleration data 118 represents three-dimensional acceleration whose components are acceleration values associated with the directions of three axes, x'-, y'-, and z'-axes, shown in FIG. 7, but in another example embodiment, the data may represent acceleration associated with any one or more directions.

Note that the controller operation data 111 may include only part of the data items 112 to 118 so long as the operation by the user manipulating the controller 5 can be represented. Also, when the controller 5 includes other input means (e.g., a touch panel, an analog stick, etc.), the controller operation data 111 may include data representing operations on those other input means. Note that in the case where the movement of the controller 5 itself is used as a game operation as in the present example embodiment, the controller operation data 111 includes data whose value changes in accordance with the movement of the controller 5, as in the case of the first acceleration data 113, the first angular rate data 114, the marker coordinate data 115, and the sub-acceleration data 118.

The terminal operation data 119 is data representing the user's operation on the terminal device 7. The terminal operation data 119 is transmitted by the terminal device 7, acquired by the game apparatus 3, and then stored to the main memory. The terminal operation data 119 includes second operation button data 120, stick data 121, touch position data 122, second acceleration data 123, second angular rate data 124, and azimuth data 125. In addition to the data shown in FIG. 16, the terminal operation data 119 may include data for images picked up by the camera 56 and data for sound detected by the microphone 69. Note that the main memory may have stored therein the terminal operation data up to a predetermined number of pieces counted from the latest piece (the last acquired piece).

The second operation button data 120 is data representing an input state of each of the operation buttons 54A to 54L provided on the terminal device 7. Concretely, the second operation button data 120 represents whether the operation buttons 54A to 54L have been pressed or not.

The stick data 121 is data representing the direction and the amount of sliding (or tilting) of the stick portion of the analog stick section 53 (including the analog sticks 53A and 53B).

The direction and the amount may be represented by, for example, two-dimensional coordinate points or two-dimensional vectors.

The touch position data 122 is data representing a position (touch position) at which an input has been made to the input surface of the touch panel 52. In the present example embodiment, the touch position data 122 represents a coordinate value in a two-dimensional coordinate system, which indicates the position in the input surface. Note that in the case where the touch panel 52 is multi-touch, the touch position data 122 may represent a plurality of touch positions.

The second acceleration data 123 is data representing acceleration (acceleration vector) detected by the acceleration sensor 63. In the present example embodiment, the second acceleration data 123 represents three-dimensional acceleration whose components are acceleration values associated with the directions of three axes, x-, y-, and z-axes, shown in FIG. 8, but in another example embodiment, the data may represent acceleration associated with any one or more directions.

The second angular rate data 124 is data representing angular rates detected by the gyroscope 64. Here, the second angular rate data 124 represents angular rates about three axes, x-, y-, and z-axes, shown in FIG. 8, but in another embodiment, the data may represent an angular rate about each of any one or more axes.

The azimuth data 125 is data representing an azimuth detected by the magnetic sensor 62. In the present example embodiment, the azimuth data 125 represents a predetermined azimuth direction (e.g., north) with respect to the terminal device 7. Note that in a place where there is a magnetic field in addition to the geomagnetic field, the azimuth data 125 does not strictly indicate an absolute azimuth (such as north). However, the azimuth data 125 indicates the direction of the terminal device 7 relative to the direction of the magnetic field in the place, and therefore, even in the case as above, it is possible to calculate the attitude or the change in the attitude of the terminal device 7 based on the azimuth data 125.

Note that the terminal operation data 119 may simply include only one of the data items 117 to 122 so long as the operation by the user manipulating the terminal device 7 can be represented. Also, when the terminal device 7 includes other input means (e.g., a touch pad, the image pickup means of the controller 5, etc.), the terminal operation data 119 may include data representing operations on those other input means. Note that when the movement of the terminal device 7 itself is used as a game operation, as in the present example embodiment, the terminal operation data 119 may include data whose value changes in accordance with the movement of the terminal device 7, as in the case of the second acceleration data 123, the second angular rate data 124, and the azimuth data 125.

Figure 17:
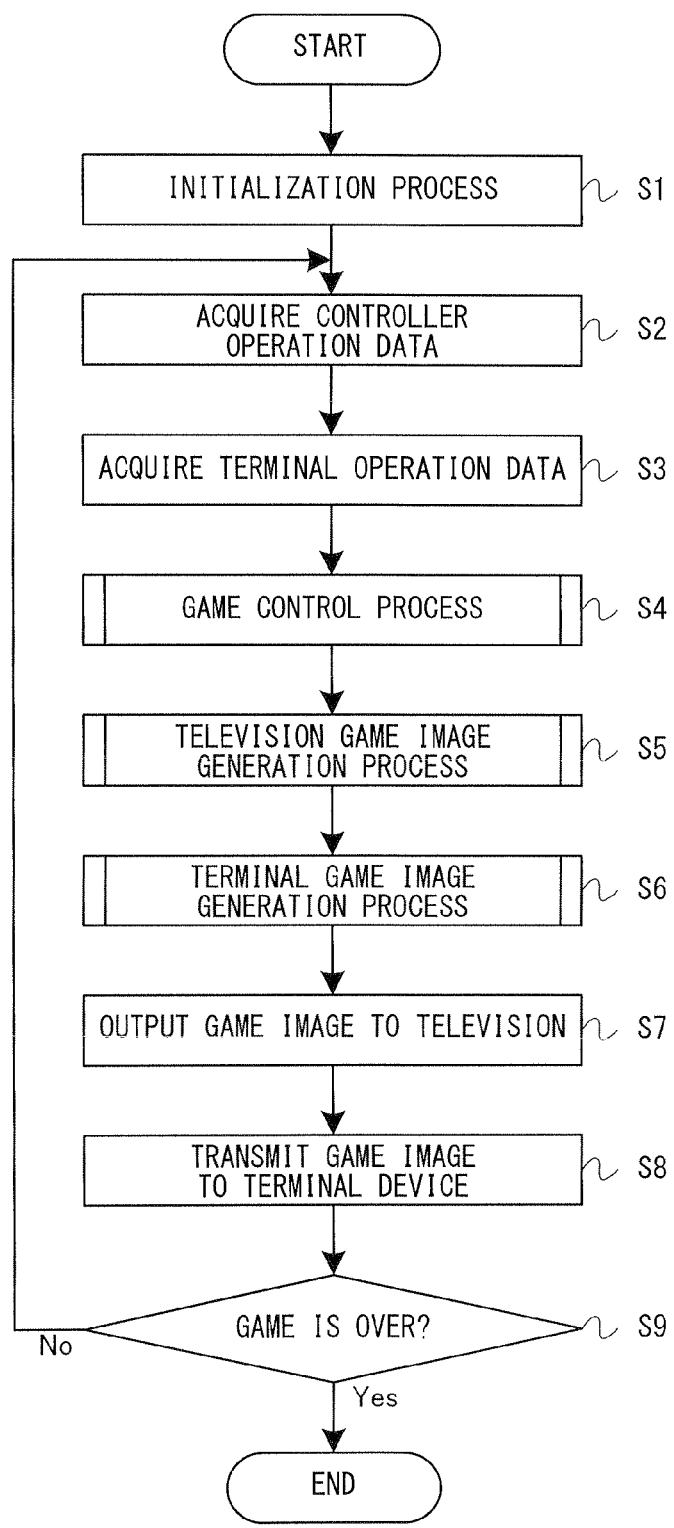
FIG. 17 is a main flowchart illustrating a flow of an example game process to be performed by the example non-limiting game apparatus 3.

The process data 126 is data to be used in the game process to be described later (FIG. 17). The process data 126 includes first object data 127, second object data 128, first camera data 129, and second camera data 130. Note that in addition to the data shown in FIG. 16, the process data 126 includes various types of data to be used in the game process, e.g., data representing various parameters being set for various objects appearing in the game.

The first object data 127 is data representing the position and the direction of the first object in the game space.

In the present example embodiment, since four first objects appear in the game, the first object data 127 is stored to the main memory for each first object. The second object data 128 is data representing the position and the direction of the second object in the game space.

The first camera data 129 is data representing the position and attitude of the first virtual camera being set in the game space. In the present example embodiment, four first virtual cameras are set, the first camera data 129 is stored to the main memory for each first virtual camera. The second camera data 130 is data representing the position and attitude of the second virtual camera being set in the game space.

Next, the process to be performed by the game apparatus 3 will be described in detail with reference to FIGS. 17 to 20. FIG. 17 is a main flowchart illustrating a flow of the process to be performed by the game apparatus 3. When the game apparatus 3 is powered on, the CPU 10 of the game apparatus 3 executes a boot program stored in an unillustrated boot ROM, thereby initializing each unit, including the main memory. The game program stored in the optical disc 4 is loaded to the main memory, and the CPU 10 starts executing the game program. The flowchart shown in FIG. 17 illustrates a process to be performed after completion of the process described above. Note that the game apparatus 3 may be configured such that the game program is executed immediately after the power-on or such that an internal program for displaying a predetermined menu screen is initially executed after the power-on and then the game program is executed when the user provides an instruction to start the game.

Note that processing in each step of the flowcharts shown in FIGS. 17 to 20 is merely illustrative, and if similar results can be achieved, the processing order of the steps may be changed. In addition, values of variables and thresholds to be used in determination steps are also merely illustrative, and other values may be used appropriately. Furthermore, while the present example embodiment is described on the premise that the CPU 10 performs processing in each step of the flowcharts, part of the steps in the flowcharts may be performed by a processor other than the CPU 10 or by specialized circuits.

First, in step S1, the CPU 10 performs an initialization process. The initialization process is, for example, a process of constructing a virtual game space, placing objects appearing in the game space at their initial positions, and setting initial values of various parameters to be used in the game process. Note that in the present example embodiment, the objects 91 and 92 are arranged at predetermined positions and in predetermined directions. Specifically, data representing the position and the direction of the first object 91 is stored to the main memory as first object data 127, and data representing the position and the direction of the second object 92 is stored to the main memory as second object data 128. In addition, the virtual cameras (the first and second virtual cameras) 101 and 102 are set in initial positions and initial attitudes in accordance with the positions and the directions of the objects 91 and 92, respectively. Data representing the initial position and the initial attitude of the first virtual camera 101 is stored to the main memory as first camera data 129, and data representing the initial position and the initial attitude of the second virtual camera 102 is stored to the main memory as second camera data 130. Following step S1, the process of step S2 is performed. Thereafter, a process loop including a series of processing in steps S2 to S9 is repeatedly performed once per a predetermined period of time (e.g., one frame period or 1/60 seconds).

In step S2, the CPU 10 acquires controller operation data from the four controllers 5. Here, each of the controllers 5 repeats transmitting the controller operation data to the game apparatus 3, and therefore the controller communication module 19 of the game apparatus 3 sequentially receives the controller operation data, and the received controller operation data is sequentially stored to the main memory by the input/output processor 11a. The controllers 5 and the game apparatus 3 may transmit/receive the data at intervals of, for example, 1/200 seconds, which is shorter than time periods taken for processing in the game. In step S2, the CPU 10 reads the latest controller operation data 111 from the main memory. Following step S2, the process of step S3 is performed.

In step S3, the CPU 10 acquires terminal operation data transmitted by the terminal device 7. The terminal device 7 repeatedly transmits the terminal operation data to the game apparatus 3, and the game apparatus 3 sequentially receives the terminal operation data. In the game apparatus 3, the terminal communication module 28 sequentially receives the terminal operation data, and the input/output processor 11a sequentially stores the terminal operation data to the main memory. In step S3, the CPU 10 reads the latest terminal operation data 119 from the main memory. Following step S3, the process of step S4 is performed.

In step S4, the CPU 10 performs a game control process. The game control process is a process for causing the game to progress by performing, for example, the processing of moving objects in the game space in accordance with the players' game operations. Concretely, in the game control process of the present example embodiment, for example, the movement of the objects 91 and 92 is controlled and the virtual cameras 101 and 102 are controlled. Hereinafter, referring to FIG. 18, the game control process will be described in detail.

Figure 18:
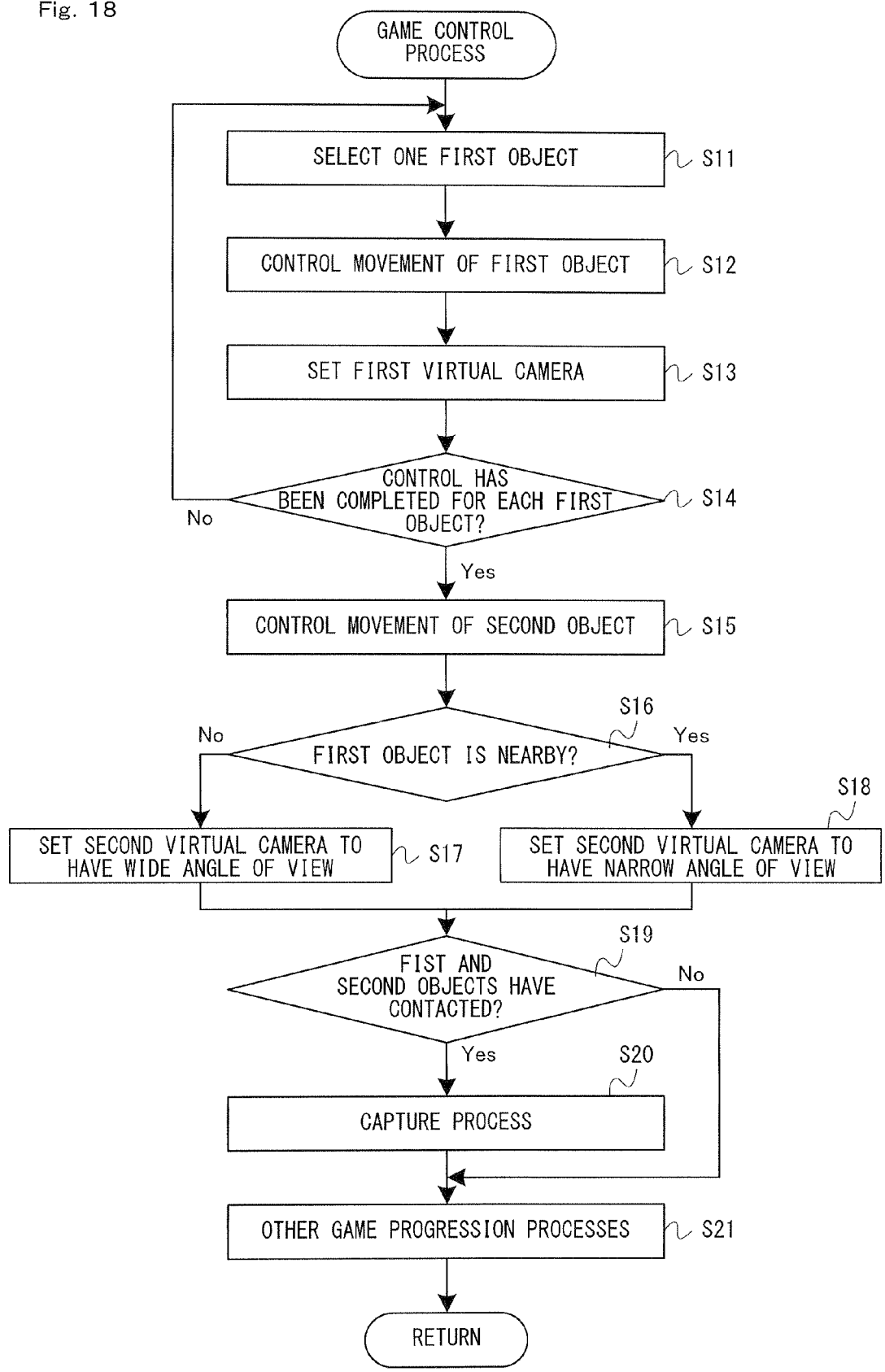
FIG. 18 is a flowchart illustrating a detailed flow of an example game control process (step S4) shown in FIG. 17.

FIG. 18 is a flowchart illustrating a detailed flow of the game control process (step S4) shown in FIG. 17. In the game control process, the CPU 10 initially in step S11 selects one first object 91. The first object 91 to be selected here has not yet been selected in a process loop of steps S11 to S14. Following step S11, the process of step S12 is performed.

In step S12, the CPU 10 controls the movement of the first object 91 selected in step S11. The movement of the first object 91 may be controlled in any manner so long as it is controlled based on the controller operation data 111. In the present example embodiment, for example, the CPU 10 calculates a post-movement position of the first object 91 in accordance with an input of a direction with the analog stick 81 of the sub-controller 9. Specifically, the first object 91 is moved by an amount of movement corresponding to an amount of manipulation (an amount of tilting) of the analog stick 81 in a direction corresponding to a direction of the manipulation (a direction of the tilting). Concretely, in the process of step S12, the CPU 10 reads from the main memory the first object data 127 that represents the position and the direction of the first object 91 that has not yet been moved, and calculates the post-movement position and direction based on the pre-movement position and direction and the sub-stick data 116 that has been read in step S2. Thereafter, data representing the calculated post-movement position and direction is stored to the main memory as new first object data 127. Following step S12, the process of step S13 is performed.

In step S13, the CPU 10 sets the first virtual camera 101 corresponding to the first object 91 based on the position and the direction of the first object 91 that has been moved in step S12. In the present example embodiment, the first virtual camera 101 is set such that the corresponding first object 91 is included in any game image to be generated by the first virtual camera 101. Concretely, the first virtual camera 101 is set at a predetermined position behind and slightly higher than the first object 91, and in an attitude directed toward the first object 91 (see FIG. 14). Note that in another example embodiment, the first virtual camera 101 may be set at the position of the first object 91. In this case, the game image is a so-called "first-person point-of-view" game image. Concretely, in the process of step S13, the CPU 10 reads the first object data 127 from the main memory, and calculates the position and the direction of the first virtual camera 101 based on the first object data 127. Thereafter, data representing the calculated position and direction is stored to the main memory as first camera data 129. Following step S13, the process of step S14 is performed.

Note that in step S13, the first virtual camera 101 is controlled based on the position and the direction of the first object 91. Here, the first virtual camera 101 may be set so as to correspond to the first object 91, e.g., the first virtual camera 101 may be controlled to move in accordance with the movement of the first object 91. For example, in another example embodiment, the first virtual camera 101 may be controlled based on the controller operation data 111 in addition to the position of the first object 91. Concretely, the CPU 10 may change the direction of the first virtual camera 101 in accordance with an input of a direction with the cross button 32a of the main controller 8. In this case, the CPU 10 may move the first virtual camera 101 along a spherical surface centering on the position of the first object 91, and may also control the attitude of the first virtual camera 101 to be directed toward the center. As a result, by using the cross button 32a, the first player can move the first virtual camera 101 to look around the first object 91. Moreover, in another example embodiment, the CPU 10 may control the first object 91 and the first virtual camera 101 by the methods as described in conjunction with steps S12 and S13 only when a predetermined button (e.g., the Z button of the sub-controller 9) has not been pressed. In the case where the predetermined button has been pressed, the position and the direction of the first virtual camera 101 may be changed in accordance with an input of a direction with the analog stick 81, without moving the first object 91.

In step S14, the CPU 10 determines whether or not movement control has been completed for each first object 91, i.e., whether or not all first objects 91 have been selected in step S11. When the determination result of step S14 is affirmative, the process of step S15 is performed. On the other hand, when the determination result of step S14 is negative, the process of step S11 is performed again. In this manner, the processes of steps S11 to S14 are performed on all first objects 91, so that the first objects 91 are moved.

In step S15, the CPU 10 controls the movement of the second object 92. The movement of the second object 92 may be controlled in any manner so long as it is controlled based on the terminal operation data 119. In the present example embodiment, for example, the CPU 10 calculates a post-movement position of the second object 92 in accordance with an input of a direction with the left analog stick 53A of the terminal device 7. Specifically, the second object 92 is moved by an amount of movement corresponding to an amount of manipulation of the left analog stick 53A in a direction corresponding to a direction of the manipulation. Moreover, in the present example embodiment, the movement speed of the second object 92 is the same as the movement speed of each first object 91. As a result, the second object 92 cannot catch any first object 91 by simply following it, and the game needs to be strategically played, for example, hiding in ambush behind an obstacle object, which renders the game more enjoyable. Note that in another example embodiment, the moving speed of each object may change in response to a predetermined condition being met (e.g., in response to a predetermined item arranged in the game space being acquired).

Concretely, in the process of step S15, the CPU 10 reads from the main memory the second object data 128 that represents the position and the direction of the second object 92 that has not been moved, and calculates the post-movement position and direction based on the pre-movement position and direction and the stick data 121 that has been read in step S3. Thereafter, data representing the calculated post-movement position and direction is stored to the main memory as new second object data 128. Following step S15, the process of step S16 is performed.

Note that in the present example embodiment, the second object 92 is controlled for its movement in accordance with an input of a direction with a direction input section (analog stick 53) which allows inputs to be made in at least four directions, including up, down, right, and left. Here, in another example embodiment, the second object 92 may be controlled for its movement based on an input on the touch panel 52. For example, in step S15, the CPU 10 may read the touch position data 122 from the main memory, and move the second object 92 toward a position in the game space that corresponds to a touch position. Besides the above, the second object 92 may be controlled in any manner so long as it is controlled based on an operation on the terminal device 7.

In step S16, the CPU 10 determines whether or not there is any first object 91 close to the second object 92. Concretely, the CPU 10 reads the first object data 127 and the second object data 128 from the main memory, and determines whether or not there is any first object within a predetermined distance from the second object 92. When the determination result of step S16 is negative, the process of step S17 is performed. On the other hand, when the determination result of step S16 is affirmative, the process of step S18 is performed.

In step S17, the CPU 10 sets the second virtual camera 102 to have a wide angle of view based on the position of the second object 92. In the present example embodiment, the second virtual camera 102 is set to take a predetermined attitude at a position in accordance with the position of the second object 92. Concretely, the second virtual camera 102 is set to take an attitude directed toward the second object 92 at a position directly above the second object 92 (see FIG. 14). Note that the angle of view of the second virtual camera 102 is set to be relatively wider in step S17 than in step S18 to be described later. Concretely, in the process of step S17, the CPU 10 reads the second object data 128 from the main memory, and calculates the position of the second virtual camera 102 based on the second object data 128. Thereafter, data representing the calculated position and the predetermined attitude is stored to the main memory as second camera data 130. Following step S17, the process of step S19 is performed.

Note that in step S17, the second virtual camera 102 may be set such that its field-of-view range includes the second object 92, but the second virtual camera 102 is not always moved in response to the movement of the second object 92. For example, in another example embodiment, as with the virtual camera for generating the wide-area image 96, the second virtual camera 102 may be set at a fixed position such that its field-of-view range includes the entire game space where objects can move. Note that in this case, the wide-area image is neither generated nor displayed.

In step S18, the CPU 10 sets the second virtual camera 102 to have narrow angle of view based on the position of the second object 92. Here, the position and the attitude of the second virtual camera 102 to be set in step S18 are the same as those to be set in step S17. However, the angle of view of the second virtual camera 102 is set to be relatively narrower in step S18 than in step S17. As a result, by step S18, the game image to be generated using the second virtual camera 102 is magnified when compared to the case where the process of step S17 is performed, so that the aforementioned magnified image (FIG. 15) can be generated. Following step S18, the process of step S19 is performed.

While the angle of view of the second virtual camera 102 is set to be narrower in step S18 than in step S17, the second virtual camera 102 may be set arbitrarily so long as the magnified image can be generated. For example, in another example embodiment, the CPU 10 may set the second virtual camera 102 at a lower height in step S18 than in step S17.

In step S19, the CPU 10 determines whether any first object 91 has been caught by the second object 92 or not. Specifically, the CPU 10 reads the first object data 127 and the second object data 128 from the main memory, and determines whether each first object 91 has contacted the second object 92 or not. In another example embodiment where the game is played to keep the second object away from the first objects, if the second object has contacted any first object, it means that the second object has been caught. When the determination result of step S19 is affirmative, the process of step S20 is performed. On the other hand, when the determination result of step S19 is negative, the process of step S20 is skipped, and the process of step S21 is performed again.

In step S20, the CPU 10 performs a predetermined capture process. The capture process is a process to be performed when the second object 92 has caught any first object 91, whereby a predetermined game effect is added. In the capture process, for example, the caught first object 91 disappears from the game space or has its stamina parameter reduced, or the second object 92 gains points. Note that the content of the capture process may be arbitrary so long as some game effect is added (specifically, the values of various parameters used in the game process are changed). Following step S20, the process of step S21 is performed.

In step S21, the CPU 10 performs other game progression processes. The other game progression processes include processes to be performed in the game control process of step S4, excluding the processes of steps S11 to S20. Possible examples of the other game progression processes include processes for controlling objects other than the objects being manipulated by the players, processes related to items arranged in the game space, and a process for counting to a time limit. In addition the above processes, any process for game progression is appropriately performed in step S21. Following step S21, the CPU 10 ends the game control process.

Returning to the description of FIG. 17, the process of step S5 is performed after the game control process of step S4. In step S5, a television game image generation process is performed. In the television game image generation process, an image is generated representing the game space as viewed from a predetermined position behind the first objects 91. Hereinafter, referring to FIG. 19, the television game image generation process will be described in detail.

Figure 19:
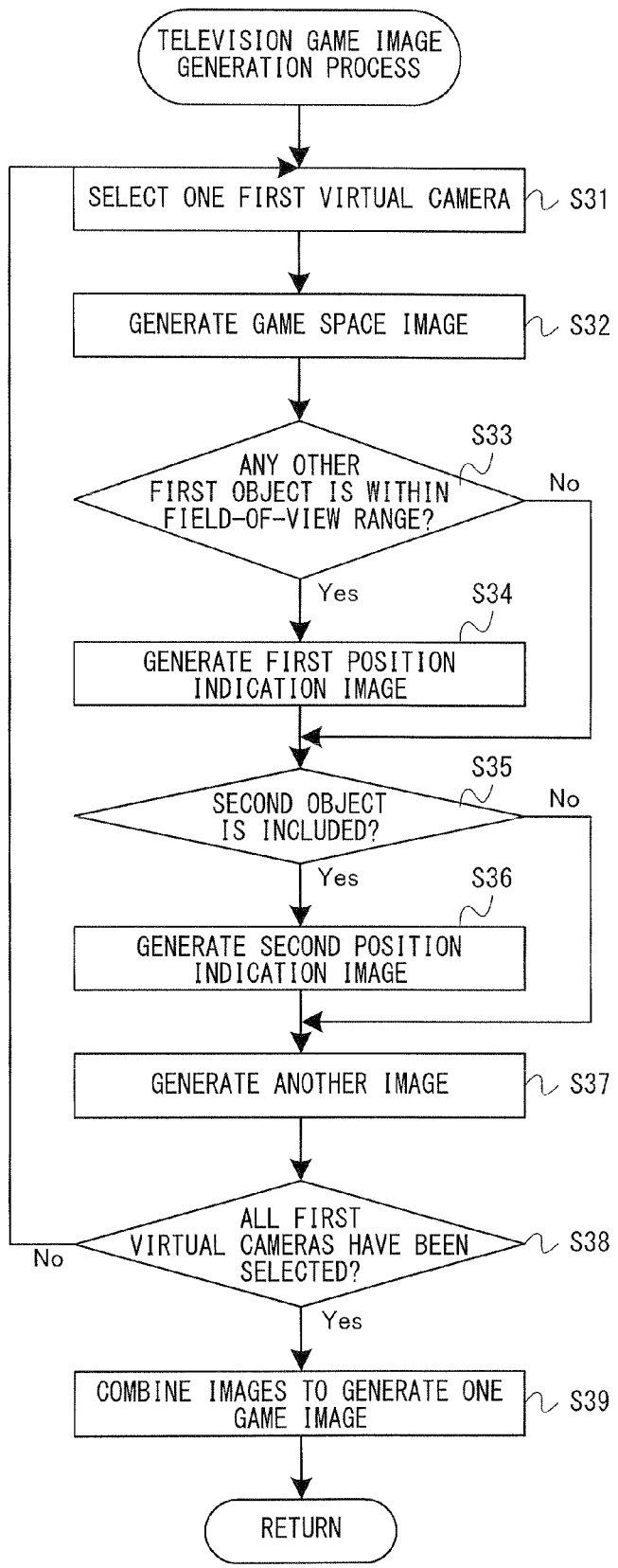
FIG. 19 is a flowchart illustrating a detailed flow of an example television game image generation process (step S5) shown in FIG. 17.

FIG. 19 is a flowchart illustrating a detailed flow of the television game image generation process (step S5) shown in FIG. 17. In the television game image generation process, the CPU 10 initially in step S31 selects one of the four first virtual cameras 101. The first virtual camera 101 selected here has not yet been selected in a process loop of steps S31 to S38. In the following steps S32 to S37, processes are performed using the first virtual camera 101 selected in step S31. Following step S31, the process of step S32 is performed.

In step S32, the CPU 10 and GPU lib collaborate to generate an image of the game space as viewed from the first virtual camera 101. Specifically, the CPU 10 and the GPU lib collaborate to read data representing the result for the game control process of step S4 from the main memory, and also read data to be used for generating the game image from the VRAM 11d, thereby generating the game image. The generated game image is stored to the VRAM 11d. Note that the "data representing the result for the game control process" includes the first object data 127 and the first camera data 129. Following step S32, the process of step S33 is performed.

In step S33, the CPU 10 determines whether or not there is any other first object within the field-of-view range of the first virtual camera 101. The "other first object" here refers to any first object other than the first object corresponding to the first virtual camera 101 selected in step S31. Concretely, the CPU 10 reads the first object data 127 and the first camera data 129 from the main memory, and determines whether or not the position of that other first object is included within the field-of-view range of the first virtual camera 101. Note that as described above, there is a possibility that the aforementioned other first object might be included within the field-of-view range even if it is not included in the game image generated in step S32. When the determination result of step S33 is affirmative, the process of step S34 is performed. On the other hand, when the determination result of step S33 is negative, the process of step S34 is skipped, and the process of step S35 is performed.

In step S34, the CPU 10 and the GPU 11b collaborate to generate a first position indication image representing any other first object included within the field-of-view range of the first virtual camera 101. As described above, the first position indication image is an image indicating the position of the aforementioned other first object and representing information for identifying that object (see FIG. 12). In addition, the first position indication image is rendered at a predetermined position on the game image generated in step S32 so as to indicate the position of the first object. Concretely, the CPU 10 and the GPU 11b collaborate to read image data representing the first position indication image from the VRAM 11d, and have the first position indication image added at the predetermined position on the game image generated and stored to the VRAM 11d in step S32. Following step S34, the process of step S35 is performed.

In step S35, the CPU 10 determines whether or not an image of the second object 92 is included in the game image generated in step S32. Note that, as described above, even if the second object 92 is within the field-of-view range of the first virtual camera 101, when the second object 92 is blocked by an obstacle object or suchlike and therefore cannot be viewed from the position of the first virtual camera 101, the determination result of step S35 is negative. When the determination result of step S35 is affirmative, the process of step S36 is performed. On the other hand, when the determination result of step S35 is negative, the process of step S36 is skipped, and the process of step S37 is performed.

In step S36, the CPU 10 and the GPU 11b collaborate to generate a second position indication image representing the position of the second object. The second position indication image is rendered at a predetermined position on the game image generated in step S32 so as to indicate the position of the second object. Concretely, the CPU 10 and the GPU lib collaborate to read image data representing the second position indication image from the VRAM 11d, and have the second position indication image added at the predetermined position on the game image generated and stored to the VRAM 11d in step S32. Following step S36, the process of step S37 is performed.

In step S37, an image other than the position indication image is added to the game image generated in step S32. In the present example embodiment, the image to be added is the azimuth image 94 (see FIG. 12). Note that in another example embodiment, for example, an image representing a time limit being set for the game or an image representing the distance from the first object 91 to the second object 92 may be added in step S37. Concretely, in the process of step S37, the CPU 10 and the GPU lib collaborate to read image data representing the image to be added from the VRAM 11d, and add the image to the game image generated and stored to the VRAM 11d in step S32. Following step S37, the process of step S38 is performed.

In step S38, the CPU 10 determines whether or not all first virtual cameras 101 have been selected in step S31 above. When the determination result of step S38 is affirmative, the process of step S39 is performed. On the other hand, when the determination result of step S38 is negative, the process of step S31 is performed again. Accordingly, the processes of steps S31 to S37 are performed on each first virtual camera 101, so that a game image is generated for each first virtual camera 101. In the present example embodiment, by the processes of steps S31 to S38, four game images are generated, and data for each game image is stored to the VRAM 11d.

In step S39, the CPU 10 and the GPU 11b collaborate to generate a game image by combining the plurality (four) of game images generated in steps S31 to S38. Concretely, data for the four game images generated in steps S31 to S38 is read from the VRAM 11d to generate a game image made up of the four game images (see FIG. 12). The generated game image is stored to the VRAM 11d, and thereafter displayed by the process of step S7 to be described later as a television game image. In this manner, in the present example embodiment, an area for the first game image is divided into a plurality, and a plurality of images representing a virtual space as viewed from a plurality of first virtual cameras are arranged in the divided areas. Note that in the present example embodiment, the screen of the television 2 is halved both vertically and horizontally, thereby dividing the screen into four areas, and a television game image is generated by four game images corresponding to the four divided areas. Here, the screen may be divided arbitrarily, and in another example embodiment, the screen may be divided into, for example, four either vertically or horizontally. After step S39, the CPU 10 ends the television game image generation process.

Returning to the description of FIG. 17, the process of step S6 is performed after the television game image generation process of step S5. In step S6, a terminal game image generation process is performed. In the terminal game image generation process, an image of the game space as viewed from a position above the second object 92 is generated. Hereinafter, referring to FIG. 20, the terminal game image generation process will be described in detail.

Figure 20:
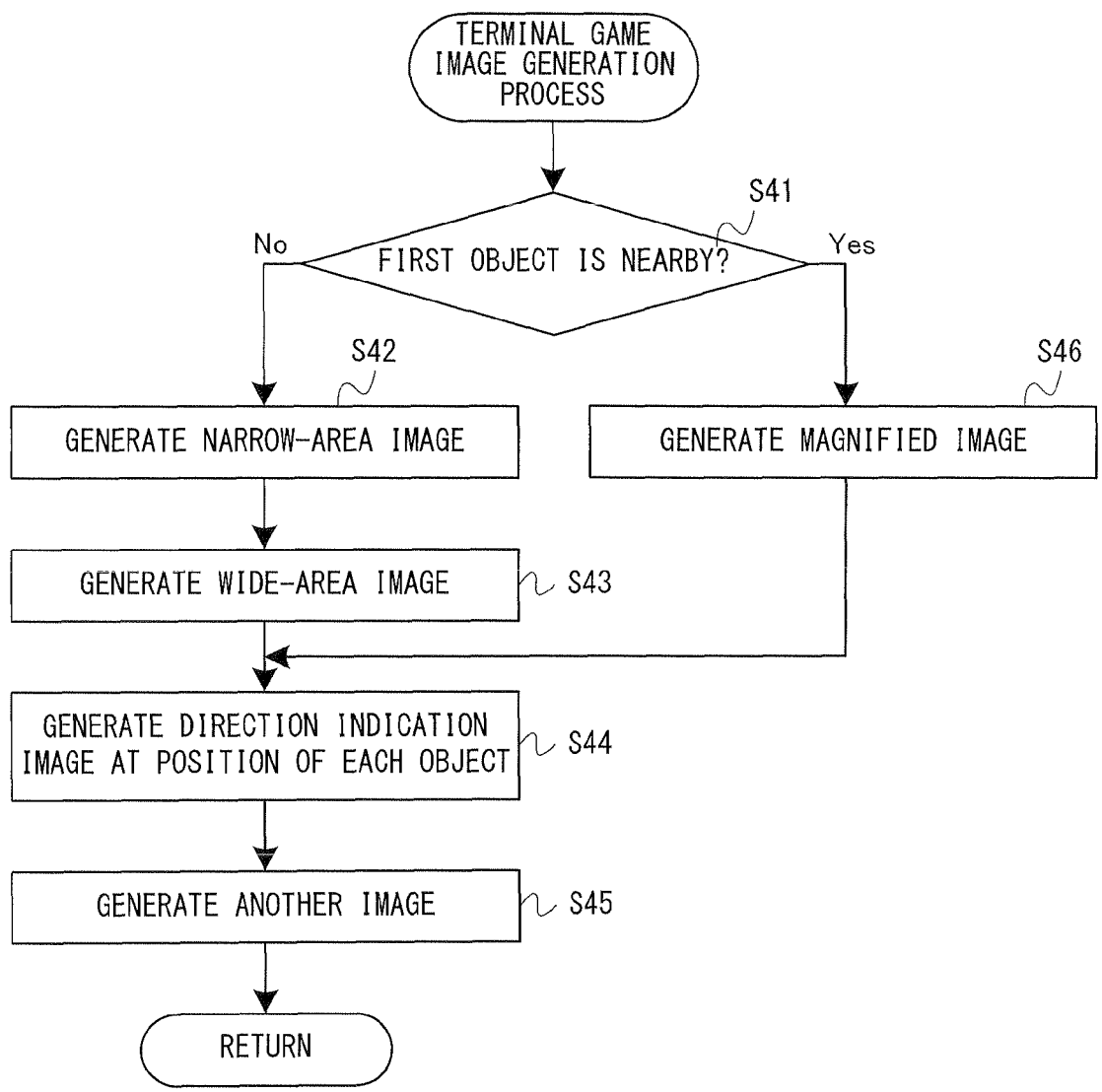
FIG. 20 is a flowchart illustrating a detailed flow of an example terminal game image generation process (step S6) shown in FIG. 17.

FIG. 20 is a flowchart illustrating a detailed flow of the terminal game image generation process (step S6) shown in FIG. 17. In the terminal game image generation process, the CPU 10 initially in step S41 determines whether or not there is any first object 91 close to the second object 92. The process of step S41 is the same as the process of step S16. When the determination result of step S41 is negative, the process of step S42 is performed. On the other hand, when the determination result of step S41 is affirmative, the process of step S46 to be described later is performed.

In step S42, the CPU 10 and the GPU 11b collaborate to generate a narrow-area image as mentioned above which represents the game space as viewed from the second virtual camera 102. Specifically, the CPU 10 and the GPU lib collaborate to read data representing the result for the game control process of step S4 from the main memory and data to be used for generating a game image from the VRAM 11d, and generate the game image. The generated game image is stored to the VRAM 11d. Note that the "data representing the result for the game control process" includes the first object data 127 and the second camera data 130. Following step S42, the process of step S43 is performed.

In step S43, the CPU 10 and the GPU 11b collaborate to generate a wide-area image representing a wider area of the game space than the narrow-area image. Note that the process of step S43 can be performed in the same manner as the process of step S42, except that a different virtual camera is used for generating the image. In the present example embodiment, the image of the game space is generated using a virtual camera being set in a fixed position such that its field-of-view range includes the entire area where objects (first and second objects) can move. The generated wide-area image is arranged at a predetermined position on the narrow-area image (see FIG. 13). Specifically, the CPU 10 and the GPU 11b collaborate to read image data representing the narrow-area image from the VRAM 11d, and add the wide-area image at the predetermined position on the narrow-area image. Following step S43, the process of step S44 is performed.

In step S44, the CPU 10 and the GPU 11b collaborate to generate direction indication images (first and second direction indication images) representing the directions of the virtual cameras. The direction indication images are arranged at the positions of the objects on the narrow-area image (alternatively, at positions near the objects or at the positions of the virtual cameras), and directed so as to exhibit horizontal correspondence to the virtual cameras (see FIG. 13; note that the second direction indication image is directed in the same direction as the second object). Note that in the present example embodiment, the direction indication images are arrow-shaped images displayed at the positions of the objects, but any images can be employed so long as they represent the positions or directions of the objects, or the directions of the virtual cameras corresponding to the objects. For example, in another example embodiment, the first direction indication images may represent the directions of the first objects, rather than the directions of the first virtual cameras. Concretely, in the process of step S44, the CPU 10 and the GPU 11b collaborate to read image data representing direction indication images from the VRAM 11d, and add the direction indication images at the positions of objects on the game images generated and stored to the VRAM 11d in steps S42 and S43. Moreover, in the present example embodiment, direction indication images are added to the wide-area image in the same manner as in the case of the narrow-area image. Following step S44, the process of step S45 is performed.

In step S45, images other than the narrow-area image, the wide-area image, and the direction indication images are generated. In the present example embodiment, the images generated here are added to the first direction indication images to identify the first objects (see FIG. 13). Note that in another example embodiment, for example, an image representing a time limit that is set for the game may be added in step S45. Concretely, in the process of step S45, the CPU 10 and the GPU 11b collaborate to read image data representing images as mentioned above from the VRAM 11d, and add the images to the narrow-area image (and the wide-area image) stored in the VRAM 11d. In the present example embodiment, by the process of step S45, game images stored in the VRAM 11d are used as terminal game images. After step S45, the CPU 10 ends the terminal game image generation process.

On the other hand, in step S46, the CPU 10 and the GPU 11b collaborate to generate a magnified image as mentioned above. The method for generating the magnified image is the same as the method for generating the narrow-area image in step S42. However, in the case where step S46 is performed, since the angle of view of the second virtual camera 102 has been set to be narrow by the process of step S18, an image is generated at a higher magnification than in step S42. The generated image is stored to the VRAM 11d.

Following step S46, the process of step S44 is performed. Accordingly, in the present example embodiment, when the magnified image is generated, no wide-area image is either generated or added to the magnified image. However, in another example embodiment, the wide-area image may be added to the magnified image. Moreover, in the above example embodiment, when the magnified image is generated, the direction indication images and other images are added in steps S44 and S45, but these images are not necessarily added. Note that the direction indication images to be added to the magnified image may be positioned in the same manner as in the narrow-area image 95 generated in step S42 or may be positioned slightly off from objects so that the objects can be displayed in a more visible manner. After step S46, the CPU 10 ends the terminal game image generation process.

Returning to the description of FIG. 17, the process of step S7 is performed after the terminal game image generation process (step S6). Specifically, in step S7, the CPU 10 outputs a game image to the television 2. Concretely, the CPU 10 transfers data for a television game image stored in the VRAM 11d to the AV-IC 15. In response to this, the AV-IC 15 outputs the data for the television game image to the television 2 via the AV connector 16. As a result, the television game image is displayed on the television 2. In addition, in step S7, game sound data, along with game image data, may be outputted to the television 2, so that game sound may be outputted by the speakers 2a of the television 2. Following step S7, the process of step S8 is performed.

In step S8, the CPU 10 transmits the game image to the terminal device 7. Concretely, the image data for the terminal game image stored in the VRAM 11d is transferred to the codec LSI 27 by the CPU 10, and subjected to a predetermined compression process by the codec LSI 27. Furthermore, the terminal communication module 28 transmits the image data subjected to the compression process to the terminal device 7 via the antenna 29. The image data transmitted by the game apparatus 3 is received by the wireless module 70 of the terminal device 7, and subjected to a predetermined decompression process by the codec LSI 66. The image data subjected to the decompression process is outputted to the LCD 51. As a result, the terminal game image is displayed on the LCD 51. Note that in step S8, game sound data, along with game image data, may be outputted to the terminal device 7, so that game sound may be outputted by the speakers 67 of the terminal device 7. Moreover, when the game apparatus 3 generates control data as mentioned above, the control data, along with the image data, may be transmitted to the terminal device 7 in step S8. Following step S8, the process of step S9 is performed.

In step S9, the CPU 10 determines whether or not to end the game. The determination of step S9 is made based on, for example, whether or not the time limit for the game has passed, whether or not the game is over or the player has provided an instruction to cancel the game. When the determination result of step S9 is negative, the process of step S2 is performed again. On the other hand, when the determination result of step S9 is affirmative, the CPU 10 ends the game process shown in FIG. 17. Thereafter, a series of processes of steps S2 to S9 are repeated until a determination to end the game is made in step S9.

As described above, in the present example embodiment, the viewpoints of first virtual cameras corresponding to first objects, which are operation targets of a plurality of first players, and the viewpoint of a second virtual camera corresponding to a second object, which is an operation target of a second player, are set at different positions (steps S13 and S17). Then, a television game image, which is generated using the first virtual cameras, is displayed on the television 2 (steps S5 and S7), while a terminal game image, which is generated using the second virtual camera, is displayed on the terminal device 7 (steps S6 and S8). As a result, a game space, which is not displayed as a television game image, is displayed on the terminal device 7 as a terminal game image, and therefore the second player can obtain information only he/she can know (e.g., the position of each object) from the terminal game image. Then, the second player can successfully utilize the information to proceed with the game, thereby strategically playing the game. In addition, each first player can view game images for other first players, or exchange information with other first players, thereby estimating information only the second player knows, so that the first players can strategically play the game. Thus, the present example embodiment makes it possible to enhance the strategic aspect of a multiplayer game and render the game highly enjoyable.

Furthermore, in the present example embodiment, the second game image is generated so as to represent a wider range of the game space than the range of the game space represented by an image in each area of the first game image (see FIGS. 12 to 14). Thus, even in the case of a game for a plurality of first players and one second player to play against each other as in the present example embodiment, excessive disadvantage is not brought to the second player, which makes it possible to provide a highly enjoyable game.

[7. Variants]

The above example embodiment is merely illustrative, and in another example embodiment, a game system can be carried out with, for example, a configuration as will be described below.

(Variant Related to the Game Images)

In the above example embodiment, the television game image is a game image with the game space being viewed in a line-of-sight direction corresponding to the direction of the first operation target, and the terminal game image is a game image with a predetermined plane on which each object can move (the ground of the game space) being viewed in a line-of-sight direction from above (FIG. 14). Here, in another example embodiment, the television game image and the terminal game image may be generated arbitrarily so long as the terminal game image includes some area of the game space that is not included in the television game image. Hereinafter, variants related to generation of the game images will be described.

(First Variant)

Figure 21:
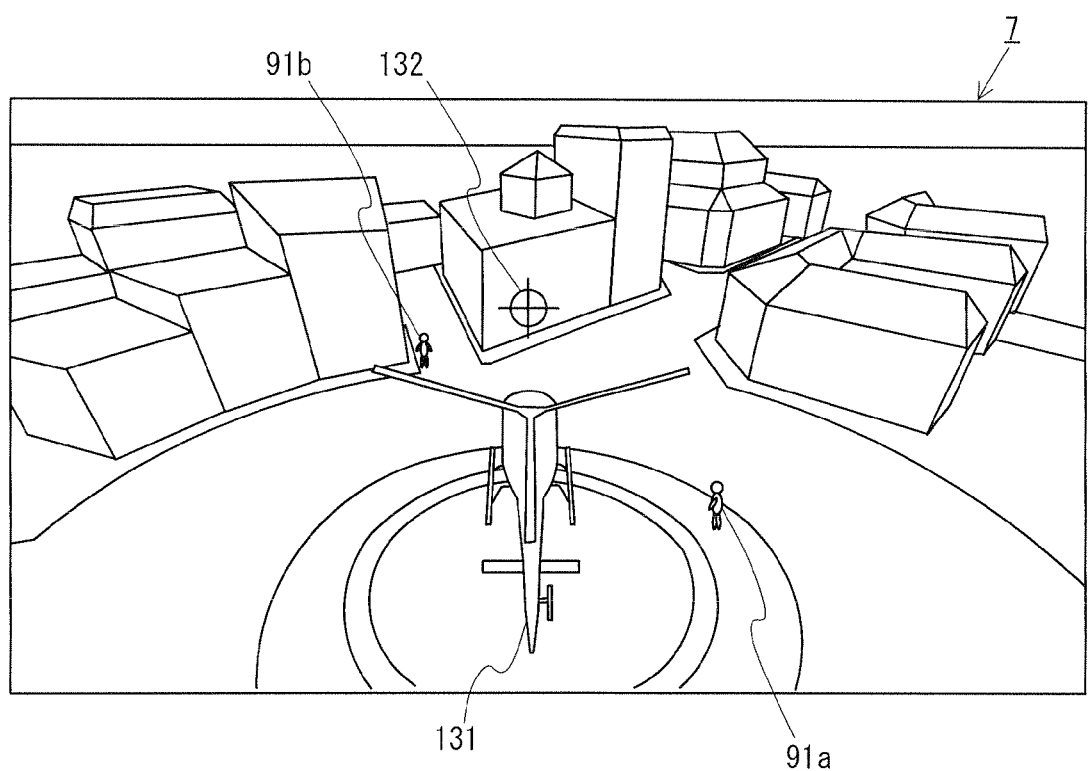
FIG. 21 is a diagram illustrating an example terminal game image in a first variant.

Hereinafter, referring to FIGS. 21 and 22, a first variant will be described. FIG. 21 is a diagram illustrating an example of the terminal game image in the first variant. As shown in FIG. 21, a game space image including a helicopter (object) 131 is displayed on the terminal device 7. In the first variant, the second object, which is an operation target of the second player, is the helicopter (object) 131. Note that, as in the above example embodiment, an operation target of each first player is a first object 91, which moves on a predetermined plane (ground) of the game space.

The game in the first variant is a shooting game in which the first objects and the second object shoot bullets at each other. Specifically, the game apparatus 3 causes the first objects to perform moving and shooting actions on the predetermined plane in accordance with the first players' manipulation. In addition, the game apparatus 3 causes the helicopter 131 to perform moving and shooting actions in a space above the predetermined plane in accordance with the second player's manipulation. Note that the moving and shooting actions of each first object may be performed arbitrarily so long as they are performed based on manipulation of the controller 5. Likewise, the moving and shooting actions of the second object may be performed arbitrarily so long as they are performed based on manipulation of the terminal device 7.

The television game image in the first variant is the same as in the above example embodiment, and the method for setting the first virtual camera is also the same as in the above example embodiment. On the other hand, the second virtual camera in the first variant is controlled based on the attitude of the terminal device 7. Concretely, the attitude of the second virtual camera is controlled to correspond to the attitude of the terminal device 7 in the real space, and the position of the second virtual camera is controlled such that the helicopter 131 is included within the field-of-view range (the range of imaging) of the second virtual camera.

Figure 22:
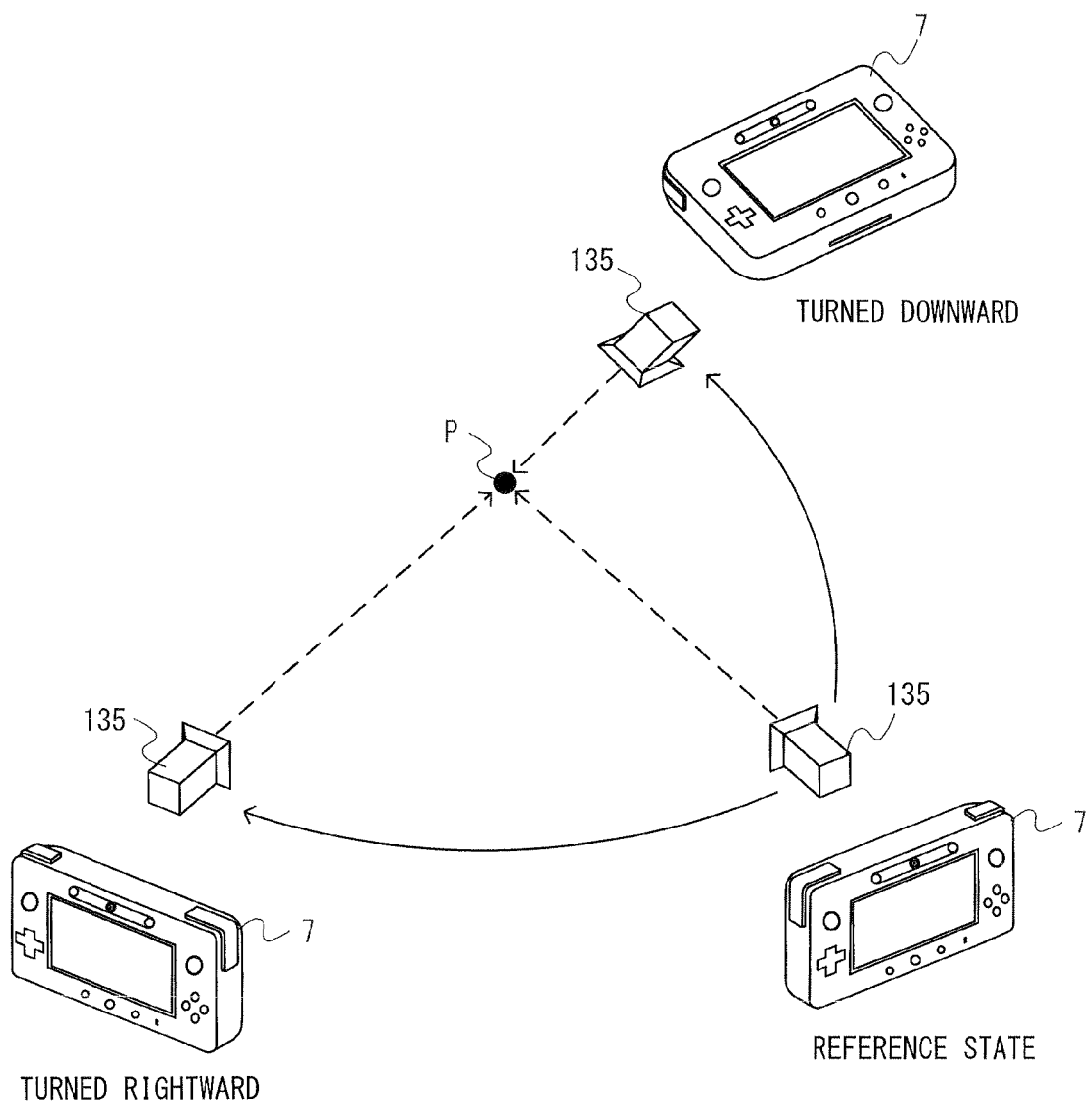
FIG. 22 is a diagram illustrating an example of the correspondence between the attitude of the example non-limiting terminal device 7 and the attitude of the second virtual camera.

FIG. 22 is a diagram illustrating the correspondence between the attitude of the terminal device 7 and the attitude of the second virtual camera. In FIG. 22, when the terminal device 7 is in a predetermined reference state with the z-axis thereof being parallel to the horizontal direction, a second virtual camera 135 takes a predetermined reference attitude parallel to the horizontal direction of a virtual space. Here, the second virtual camera 135 is controlled to take an attitude rotated from the reference attitude in a direction and an amount corresponding to a rotation of the terminal device 7 from the reference state. For example, when the terminal device 7 is rotated rightward (in the yaw direction) from the reference attitude, the second virtual camera 135 turns rightward (in the yaw direction) from the reference attitude. Moreover, when the terminal device 7 is rotated downward (in the pitch direction) from the reference attitude, the second virtual camera 135 turns downward (in the pitch direction) from the reference attitude. Furthermore, although not shown, when the terminal device 7 is rotated from the reference attitude about an axis perpendicular to the screen (in the roll direction), the second virtual camera 135 turns about an axis in the line-of-sight direction (in the roll direction). In this manner, in the present example embodiment, the attitude of the terminal device 7 in the real space is controlled to correspond to the attitude of the second virtual camera 135 in the virtual game space. Thus, the player can change the line-of-sight direction of the terminal game image by an easy and intuitive operation using the terminal device 7.

Furthermore, the position of the second virtual camera 135 is controlled such that the helicopter 131 is included within the field-of-view range of the second virtual camera 135. Concretely, the second virtual camera 135 is set at a predetermined distance from the position P of the helicopter 131 so as be directed toward the position P. Accordingly, when the terminal device 7 is rotated rightward from the reference attitude, the second virtual camera 135 moves leftward from the reference attitude, and when the terminal device 7 is rotated downward from the reference attitude, the second virtual camera 135 moves upward from the reference attitude (see FIG. 22). Note that in another example embodiment, the second virtual camera 135 may be set at the position of the helicopter 131. That is, a so-called "first-person point-of-view" game image may be displayed on the terminal device 7.

Note that the attitude of the terminal device 7 may be calculated arbitrarily, but in the first variant, the attitude of the terminal device 7 is calculated based on outputs from inertial sensors (the acceleration sensor 63 and the gyroscope 64) of the terminal device 7. The gyroscope 64 detects an angular rate of the terminal device 7, and therefore the attitude of the terminal device 7 can be calculated based on the detected angular rate. In addition, the acceleration sensor 63 detects an acceleration on the terminal device 7, and when the terminal device 7 is in almost static state, the acceleration applied to the terminal device 7 corresponds to a gravitational acceleration. Accordingly, the direction of the gravitational acceleration (the direction of gravity) on the terminal device 7 can be calculated using an output from the acceleration sensor 63, and therefore the direction (attitude) of the terminal device 7 with respect to the direction of gravity can be calculated. The game apparatus 3 calculates the attitude of the terminal device 7 using the attitude calculated based on an output from the gyroscope 64 and the attitude calculated based on an output from the acceleration sensor 63. Concretely, the attitude based on an output from the gyroscope 64 is corrected with the attitude based on an output from the acceleration sensor 63, thereby calculating the attitude of the terminal device 7. In this manner, in the first variant, the second virtual camera 135 is set based on outputs from the inertial sensors (the acceleration sensor 63 and the gyroscope 64) of the terminal device 7.

As described above, in the first variant, the second virtual camera 135 is set at a position around the helicopter 131 (the position being at a predetermined distance from the helicopter 131) so as to take an attitude corresponding to the attitude of the terminal device 7. Here, the helicopter 131 moves in a space above the predetermined plane where the first objects can move, and therefore the second virtual camera 135 is set at a higher position than the first virtual camera. Consequently, as in the above example embodiment, the terminal game image can represent a wider range of the game space than the television game image, making it easy to recognize the position of each first object. For example, in FIG. 21, the terminal game image is a game image with the ground of the game space being viewed from the sky, so that the positions of the first objects 91a and 91b can be readily recognized and some positions can be visually recognized even if they are blocked in part by an obstacle (building). Accordingly, as with the above example embodiment, the first variant makes it possible to enhance the strategic aspect of a multiplayer game and render the game highly enjoyable.

Note that in the case where the second virtual camera is set at a higher position than the first virtual camera, the second virtual camera may be positioned higher than any obstacle within a predetermined range of height and the first virtual camera may be positioned lower than such an obstacle. As a result, the second virtual camera can pick up an image of a position behind such an obstacle, and therefore make it easy to recognize the position of each first object in the terminal game image.

Furthermore, in the first variant, the second virtual camera 135 may be positioned lower than the first virtual camera depending on the combination of the position of the helicopter 131 and the attitude of the terminal device 7. Specifically, if the second player can perform an operation to set the second virtual camera 135 at a higher position than the first virtual camera, the second virtual camera 135 is not always necessarily positioned higher than the first virtual camera. Thus, the terminal game image does not always provide a more advantageous viewpoint than the television game image.

As described above in conjunction with the above example embodiment or the first variant, when any obstacle object is arranged on a predetermined plane of the game space, or when any field object arranged on the predetermined plane has an uneven surface, the second virtual camera may be arranged higher than the first virtual camera, or the second virtual camera may be set to have a greater angle of depression than the first virtual camera. Thus, it is rendered possible to readily recognize the position of each object on the predetermined plane in the terminal game image.

(Second Variant)

Figure 23:
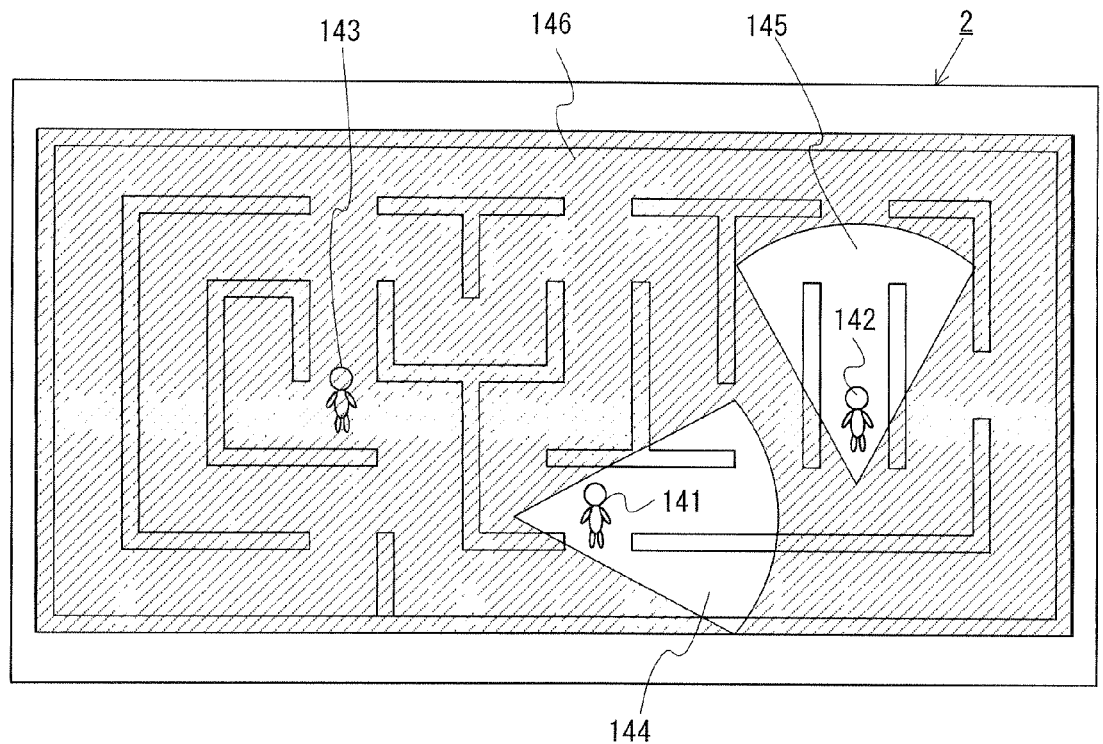
FIG. 23 is a diagram illustrating an example television game image in a second variant.
Figure 24:
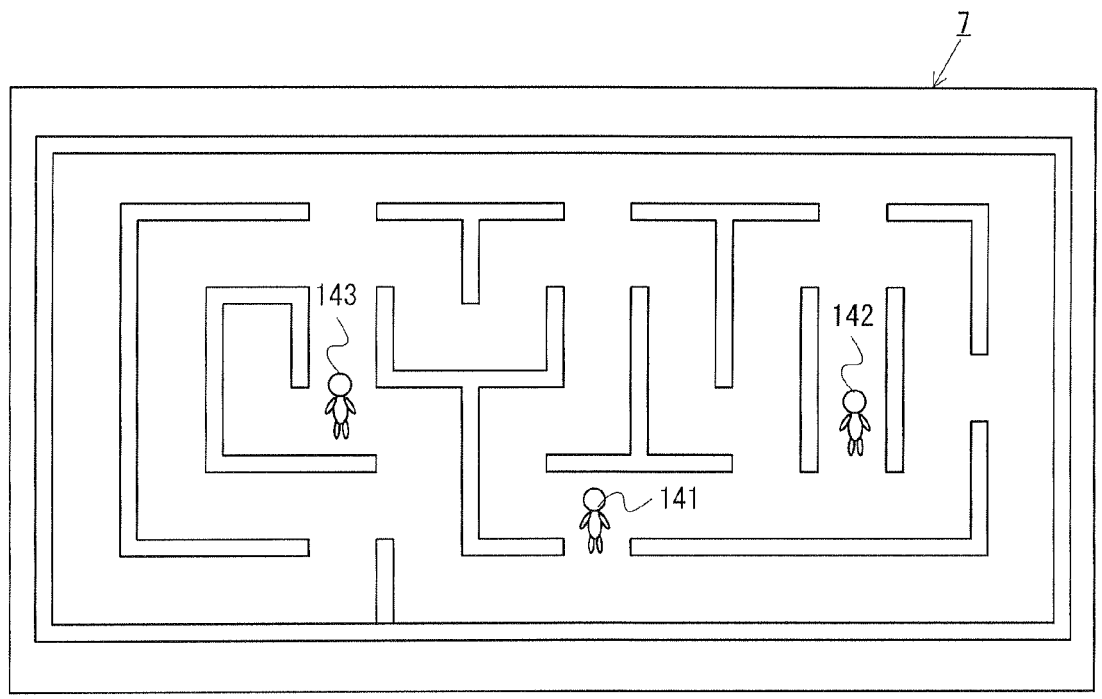
FIG. 24 is a diagram illustrating an example terminal game image in the second variant.

Hereinafter, referring to FIGS. 23 and 24, a second variant will be described. FIG. 23 is a diagram illustrating an example of the television game image in the second variant. FIG. 24 is a diagram illustrating an example of the terminal game image in the second variant. As shown in FIGS. 23 and 24, a plurality (here, two) of first objects 141 and 142 and a second object 143 appear in the game space. As in the above example embodiment, the game in the second variant is a game in which the second object 143 catches the first objects 141 and 142.

As shown in FIG. 23, the television game image is displayed such that only areas 144 and 145 around the first objects 141 and 142 are visually recognizable in a predetermined area of the game space. Note that an area 146 hatched in FIG. 23 is shown as being visually recognizable in FIG. 23 for the purpose of representing the game space in a readily recognizable manner, but in actuality, the area 146 is displayed in an unrecognizable manner. Concretely, the hatched area 146 is displayed as blacked out or blurry. In this manner, in the second variant, the television game image is generated such that only some portions within a predetermined range of the game space that are determined in accordance with the positions of the first objects can be visually recognized. As a result, the first players play the game while mainly viewing only the areas 144 and 145 around the first objects 141 and 142.

On the other hand, as shown in FIG. 24, the terminal game image is displayed such that the aforementioned predetermined area of the game space is represented (the entire predetermined area is visually recognizable). Accordingly, the second player can readily recognize the positions of the objects 141 to 143.

As described above, in the second variant, as in the above example embodiment, the television game image is generated with a limited display range of the game space, and the terminal game image is generated so as to represent a wider range of the game space than the television game image. Thus, as in the example embodiment, the players can strategically play the game, which makes the game highly enjoyable. Moreover, in the second variant, as in the above example embodiment, the terminal game image to be viewed by the second player is rendered more advantageous than the television game image to be viewed by the first players, thereby preventing excessive disadvantage to the second player in a one-against-many game, which makes the game highly enjoyable.

(Variant Related to the Game Image Generation Method)

In the above example embodiment, the game images (the television game image and the terminal game image) are generated using the virtual cameras. Here, in another example embodiment, the game images may be generated by any arbitrary method. For example, in the above example embodiment, as for the terminal game image, the narrow-area image 95 and/or the wide-area image 96 may be generated using a two-dimensional map image. Note that data for the map image is prepared in the game program 110, and stored to, for example, the main memory at any appropriate time beforehand. In this manner, by using the prepared image data for game image generation, it is rendered possible to generate game images at higher speed compared to the method using the virtual camera. Moreover, in the second variant, both the television game image and the terminal game image may be generated using prepared two-dimensional map images, for example.

(Variant Related to the Content of the Game)

The above example embodiment has been described taking a tag game or a shooting game as an example of the game to be simultaneously played by a plurality of players, but in another example embodiment, the content of the game may be arbitrarily determined. For example, in another example embodiment, the game may be such that first objects manipulated by first players attempt to catch a second player manipulated by a second player. In addition, the game system 1 of the above example embodiment is particularly useful for one-against-many games for a plurality of first players to play against one second player, but the content of the game is not limited to the one-against-many type. For example, in another example embodiment, the game may be a competition among individual players, e.g., the players compete against one another to obtain predetermined items arranged in a game space.

(Variant Related to the Configuration of the Game System 1)

In the above example embodiment, the game system 1 includes a plurality of controllers 5, one terminal device 7, and one game apparatus 3 for performing game processes. Here, the game system may be configured arbitrarily so long as the aforementioned components are included. For example, in another example embodiment, the game system 1 may be configured to include more then one terminal device 7. In this case, the game to be executed in the game system 1 may be played by a plurality of second players in cooperation with or against each other.

(Variant Related to the Information Processing Apparatus for Performing the Game Process)

In the above example embodiment, a series of game processes to be performed in the game system 1 are performed by the game apparatus 3, but the series of game processes may be performed in part by another apparatus. For example, in another example embodiment, a part (e.g., the terminal game image generation process) of the series of game processes may be performed by the terminal device 7. Moreover, in another example embodiment, a series of game processes in a game system including a plurality of information processing apparatus capable of communicating with each other may be shared between the information processing apparatuses.

The systems, devices and apparatuses described herein may include one or more processors, which may be located in one place or distributed in a variety of places communicating via one or more networks. Such processor(s) can, for example, use conventional 3D graphics transformations, virtual camera and other techniques to provide appropriate images for display. By way of example and without limitation, the processors can be any of: a processor that is part of or is a separate component co-located with the stationary display and which communicates remotely (e.g., wirelessly) with the movable display; or a processor that is part of or is a separate component co-located with the movable display and communicates remotely (e.g., wirelessly) with the stationary display or associated equipment; or a distributed processing arrangement some of which is contained within the movable display housing and some of which is co-located with the stationary display, the distributed portions communicating together via a connection such as a wireless or wired network; or a processor(s) located remotely (e.g., in the cloud) from both the stationary and movable displays and communicating with each of them via one or more network connections; or any combination or variation of the above.

The processors can be implemented using one or more general-purpose processors, one or more specialized graphics processors, or combinations of these. These may be supplemented by specifically-designed ASICs (application specific integrated circuits) and/or logic circuitry. In the case of a distributed processor architecture or arrangement, appropriate data exchange and transmission protocols are used to provide low latency and maintain interactivity, as will be understood by those skilled in the art.

Similarly, program instructions, data and other information for implementing the systems and methods described herein may be stored in one or more on-board and/or removable memory devices. Multiple memory devices may be part of the same device or different devices, which are co-located or remotely located with respect to each other.

As described above, the present example embodiment can be applied to, for example, a game system, apparatus, or program for the purpose of, for example, enhancing the strategic aspect of a multiplayer game.

While certain example systems, methods, devices and apparatuses have been described herein, it is to be understood that the appended claims are not to be limited to the systems, methods, devices and apparatuses disclosed, but on the contrary, are intended to cover various modifications and equivalent arrangements included within the spirit and scope of the appended claims.

What is claimed is:

1. A multi-user game system comprising:
 a plurality of operating devices outputting first operation data,
 a transportable display device outputting second operation data, the transportable display device being of a size that allows a user to hold and move the transportable display device and arbitrarily change the position of the transportable display device, and
 a game apparatus,
 wherein:
 the game apparatus includes:
  an operation data acquisition section that acquires the first operation data from the plurality of operating devices and the second operation data from the transportable display device;
  an action control section that controls individual actions of a plurality of first operation targets in a virtual space based on the first operation data, and controls an action of a second operation target in the virtual space based on the second operation data;
  a first camera setting section that sets a plurality of first operation target virtual cameras in the virtual space, each of the plurality of first operation target virtual cameras corresponding to associated ones of the first operation targets;
  a first image generation section that generates a first game image including a plurality of images representing the virtual space as viewed from the first operation target virtual cameras;
  a second camera setting section that sets a virtual camera for the transportable display device in the virtual space, the camera corresponding to the second operation target and having a different viewpoint from any of the first operation target virtual cameras, the different viewpoint being responsive to detected attitude of the transportable display device;

a second image generation section that generates a second game image including an image representing the virtual space as viewed from the virtual camera for the transportable display device;

a first image output section that outputs the first game image to a further display device different from the transportable display device; and a second image output section that wirelessly transmits information representing the second game image to the transportable display device, and the transportable display device includes:

a sensor that detects a sensor value for calculating attitude of the transportable display device, an image reception section that receives the transmitted information representing the second game image, a display operatively coupled to the image reception section that displays the second game image, and wherein a screen of the further display device is divided into at least first and second areas, and a game image including a first operation target is displayed on each of the first and second areas, the first area providing a game image representing the virtual space as viewed from a first virtual camera controlled in accordance with a first of the plurality of operating devices, the second area providing a game image representing the virtual space as viewed from a second virtual camera controlled in accordance with a second of the plurality of operating devices.

2. The game system according to claim 1, wherein, the action control section controls a plurality of first objects arranged in the virtual space to move based on the first operation data as the first operation targets, and
the first camera setting section sets the first virtual cameras such that each of the first objects is included within a field-of-view range of its corresponding one of the first virtual cameras.

3. The game system according to claim 1, wherein, the action control section controls a second object arranged in the virtual space to move based on the second operation data as the second operation target, and
the second camera setting section sets the virtual camera for the transportable display device such that the second object is included within a field-of-view range of the virtual camera for the transportable display device.

4. The game system according to claim 1, wherein the second camera setting section sets the virtual camera for the transportable display device so as to have a greater angle of depression than the first virtual cameras with respect to a predetermined plane of the virtual space on which the first operation targets are movable.

5. The game system according to claim 4, wherein, the first camera setting section sets each of the first virtual cameras such that a direction of that first virtual camera changes in accordance with a direction of the first operation target that corresponds to the first virtual camera, and
the second camera setting section sets the virtual camera for the transportable display device in a direction approximately perpendicular to the predetermined plane.

6. The game system according to claim 1, wherein the second camera setting section sets the virtual camera for the transportable display device so as to be higher than the first virtual cameras with respect to a predetermined plane of the virtual space on which the first operation targets are movable.

7. The game system according to claim 6, wherein, the first camera setting section sets each of the first virtual cameras at a lower position than an obstacle object having a predetermined range of height with respect to the predetermined plane, and
the second camera setting section sets the virtual camera for the transportable display device at a higher position than the obstacle object.

8. The game system according to claim 1, wherein the first image generation section generates as the first game image a game image in which a plurality of images representing the virtual space as viewed from the first virtual cameras are arranged in a plurality of areas into which an entire area of the first game image is divided.

9. The game system according to claim 1, wherein, the transportable display device includes an inertial sensor, and
the action control section sets the virtual camera for the transportable display device based on an output from the inertial sensor.

10. The game system according to claim 1, wherein the second image generation section generates the second game image so as to include images rendered on a game image representing the virtual space, the images representing positions of the first operation targets and the second operation target and directions of the operation targets or virtual cameras.

11. The game system according to claim 1, wherein, the transportable display device further includes a touch panel provided on a screen of the display section, and
the action control section moves the second operation target based on an input to the touch panel.

12. The game system according to claim 1, wherein, the transportable display device further includes a direction input section which allows inputs to be made in at least four directions, including up, down, right, and left, and
the action control section moves the second operation target in accordance with a direction inputted with the direction input section.

13. The game system according to claim 1, wherein, the action control section moves the first operation targets and the second operation target on a predetermined plane being set in the virtual space, and
the game apparatus further includes an effect addition section for adding a game effect in response to the second operation target contacting any of the first operation targets.

14. The game system according to claim 1, wherein the action control section causes the first operation targets to perform moving and shooting actions on a predetermined plane being set in the virtual space, and also causes the second operation target to perform moving and shooting actions in a space above the predetermined plane.

15. The game system according to claim 1, wherein, the game apparatus further includes an image compression section for compressing the second game image,
the second image output section wirelessly transmits the compressed second game image,
the transportable display device further includes an image decompression section for decompressing the compressed second game image received by the image reception section, and
the display section displays the second game image decompressed by the image decompression section.

16. A game system comprising a plurality of operating devices for outputting first operation data, a transportable display device for outputting second operation data, and a game apparatus, wherein, the game apparatus includes:
an operation data acquisition section configured to acquire the first operation data from the operating devices and the second operation data from the transportable display device;
an action control section configured to control individual actions of a plurality of first operation targets in a virtual space based on the first operation data, and an action of a second operation target in the virtual space based on the second operation data;
a first image generation section configured to generate a first game image representing an area within a predetermined range of the virtual space that is determined in accordance with positions of the first operation targets;
a second image generation section configured to generate a second game image representing an area of the virtual space, the area including the second operation target and being wider than the range represented by the first game image;
a first image output section configured to output the first game image to a further display device different from the transportable display device; and
a second image output section configured to wirelessly transmit the second game image to the transportable display device, and the transportable display device being of a size that allows a user to hold and move the transportable display device and arbitrarily change the position of the transportable display device, and which includes:
an image reception section configured to receive the second game image, and
a display section configured to display the second game image responsive to detected attitude of the transportable display device, wherein a screen of the further display device is divided into at least first and second areas, and a game image including a first operation target is displayed on each of the first and second areas, the first area providing a game image representing the virtual space as viewed from a first virtual camera controlled in accordance with a first of the plurality of operating devices, the second area providing a game image representing the virtual space as viewed from a second virtual camera controlled in accordance with a second of the plurality of operating devices.

17. The game system according to claim 16, wherein,
the first image generation section generates the first game image by generating for each of the first operation targets an image representing the virtual space in a line-of-sight direction corresponding to a direction of that first operation target, and
the second image generation section generates as the second game image a game image with a predetermined plane on which the first operation targets are movable being viewed in a line-of-sight direction approximately perpendicular to the predetermined plane.

18. The game system according to claim 16, wherein,
the virtual space has set therein an obstacle object having a predetermined range of height with respect to a predetermined plane on which the first operation targets are movable,
the first image generation section generates the first game image as viewed from a viewpoint lower than the obstacle object, and
the second image generation section generates the second game image as viewed from a viewpoint higher than the obstacle object.

19. The game system according to claim 16, wherein,
the first image generation section generates the first game image such that only some portions within a predetermined range of the virtual space that are determined in accordance with positions of the first operation targets are visually recognizable, and
the second image generation section generates the second game image so as to represent the predetermined range of the virtual space.

20. The game system according to claim 16, wherein,
the first image generation section sets a virtual camera in the virtual space to generate as the first game image an image representing the virtual space as viewed from the virtual camera, and
the second image generation section generates the second game image as an image representing the virtual space using image data that is prestored in a storage accessible by the game apparatus.

21. The game system according to claim 16, wherein the second image generation section generates the second game image so as to include images rendered on a game image representing the virtual space, the images representing positions of the first operation targets and the second operation target and directions of the operation targets or virtual cameras.

22. The game system according to claim 16, wherein,
the transportable display device further includes a touch panel provided on a screen of the display section, and
the action control section moves the second operation target based on an input to the touch panel.

23. The game system according to claim 16, wherein,
the transportable display device further includes a direction input section which allows inputs to be made in at least four directions, including up, down, right, and left, and
the action control section moves the second operation target in accordance with a direction inputted with the direction input section.

24. The game system according to claim 16, wherein,
the action control section moves the first operation targets and the second operation target on a predetermined plane being set in the virtual space, and
the game apparatus further includes an effect addition section for adding a game effect in response to the second operation target contacting any of the first operation targets.

25. The game system according to claim 16, wherein the action control section causes the first operation targets to perform moving and shooting actions on a predetermined plane being set in the virtual space, and also causes the second operation target to perform moving and shooting actions in a space above the predetermined plane.

26. The game system according to claim 16, wherein,
the game apparatus further includes an image compression section for compressing the second game image,
the second image output section wirelessly transmits the compressed second game image,
the transportable display device further includes an image decompression section for decompressing the compressed second game image received by the image reception section, and the display section displays the second game image decompressed by the image decompression section.

27. A game process method to be performed in a game system including a game apparatus, wherein,
the game apparatus performs:
operation data acquisition acquiring first operation data outputted by a plurality of operating devices capable of communicating with the game apparatus, and second operation data outputted by a transportable display device capable of communicating with the game apparatus;
action control controlling individual actions of a plurality of first operation targets in a virtual space based on the first operation data, and an action of a second operation target in the virtual space based on the second operation data;
first camera setting setting a plurality of first operation target virtual cameras in the virtual space, each of the plurality of first operation target virtual cameras corresponding to associated ones of the first operation targets;
first image generation generating a first game image including a plurality of images representing the virtual space as viewed from the first operation target virtual cameras;
second camera setting setting a virtual camera for the transportable display device in the virtual space, the camera corresponding to the second operation target and having a different viewpoint from the first operation target virtual cameras;
second image generation generating a second game image including an image representing the virtual space as viewed from the virtual camera for the transportable display device, the virtual camera for the transportable display device being responsive to detected attitude of the transportable display device;
first image output outputting the first game image to a further display device different from the transportable display device; and
second image output wirelessly transmitting the second game image to the transportable display device, and
the transportable display device being of a size that allows a user to hold and move the transportable display device and arbitrarily change the position of the transportable display device, and which performs:
image reception receiving the second game image, and displaying the second game image,
wherein a screen of the further display device is divided into at least first and second areas, and a game image including a first operation target is displayed on each of the first and second areas, the first area providing a game image representing the virtual space as viewed from a first virtual camera controlled in accordance with a first of the plurality of operating devices, the second area providing a game image representing the virtual space as viewed from a second virtual camera controlled in accordance with a second of the plurality of operating devices.

28. The game process method according to claim 27, wherein,
the action control controls a plurality of first objects arranged in the virtual space to move based on the first operation data as the first operation targets, and
the first camera setting sets the first virtual cameras such that each of the first objects is included within a field-of-view range of its corresponding one of the first virtual cameras.

29. The game process method according to claim 27, wherein,
the action control controls a second object arranged in the virtual space to move based on the second operation data as the second operation target, and
the second camera setting sets the virtual camera for the transportable display device such that the second object is included within a field-of-view range of the virtual camera for the transportable display device.

30. The game process method according to claim 27, wherein the second camera setting sets the virtual camera for the transportable display device so as to have a greater angle of depression than the first virtual cameras with respect to a predetermined plane of the virtual space on which the first operation targets are movable.

31. The game process method according to claim 30, wherein,
the first camera setting sets each of the first virtual cameras such that a direction of that first virtual camera changes in accordance with a direction of the first operation target that corresponds to the first virtual camera, and
the second camera setting sets the virtual camera for the transportable display device in a direction approximately perpendicular to the predetermined plane.

32. The game process method according to claim 27, wherein the second camera setting sets the virtual camera for the transportable display device so as to be higher than the first virtual cameras with respect to a predetermined plane of the virtual space on which the first operation targets are movable.

33. The game process method according to claim 32, wherein,
the first camera setting sets each of the first virtual cameras at a lower position than an obstacle object having a predetermined range of height with respect to the predetermined plane, and
the second camera setting sets the virtual camera for the transportable display device at a higher position than the obstacle object.

34. The game process method according to claim 27, wherein the first image generation generates as the first game image a game image in which a plurality of images representing the virtual space as viewed from the first virtual cameras are arranged in a plurality of areas into which an entire area of the first game image is divided.

35. The game process method according to claim 27, wherein the second image generation generates the second game image so as to include images rendered on a game image representing the virtual space, the images representing positions of the first operation targets and the second operation target and directions of the operation targets or virtual cameras.

36. The game process method according to claim 27, wherein,
the action control moves the first operation targets and the second operation target on a predetermined plane being set in the virtual space, and
the game apparatus further performs effect addition for adding a game effect in response to the second operation target contacting any of the first operation targets.

37. The game process method according to claim 27, wherein the action control causes the first operation targets to perform moving and shooting actions on a predetermined plane being set in the virtual space, and also causes the second operation target to perform moving and shooting actions in a space above the predetermined plane.

* * * * *